US009241137B2

(12) United States Patent
Frisco et al.

(10) Patent No.: US 9,241,137 B2
(45) Date of Patent: Jan. 19, 2016

(54) AIRCRAFT IN-FLIGHT ENTERTAINMENT SYSTEM WITH ENHANCED SEATBACK TRAY PASSENGER CONTROL UNITS AND ASSOCIATED METHODS

(75) Inventors: Jeffrey A. Frisco, Palm Bay, FL (US); Scott Easterling, Malabar, FL (US)

(73) Assignee: LIVETV, LLC, Melbourne, FL (US)

( * ) Notice: Subject to any disclaimer, the term of this patent is extended or adjusted under 35 U.S.C. 154(b) by 1094 days.

(21) Appl. No.: 13/040,436

(22) Filed: Mar. 4, 2011

(65) Prior Publication Data

US 2011/0219409 A1 Sep. 8, 2011

Related U.S. Application Data

(60) Provisional application No. 61/310,564, filed on Mar. 4, 2010.

(51) Int. Cl.
*H04N 7/18* (2006.01)
(52) U.S. Cl.
CPC ...................................... *H04N 7/18* (2013.01)
(58) Field of Classification Search
CPC ........... B64D 11/0015; B60R 11/0264; B60R 11/0235; B60R 2011/0012; B60R 2011/0276; H04N 21/2146; H04N 21/41422; H04N 21/4126
USPC ..................................................... 725/75–77
See application file for complete search history.

(56) References Cited

U.S. PATENT DOCUMENTS

| 6,177,887 | B1 | | 1/2001 | Jerome | 340/945 |
|---|---|---|---|---|---|
| 2003/0184957 | A1 | * | 10/2003 | Stahl et al. | 361/680 |
| 2003/0233659 | A1 | * | 12/2003 | Guerin et al. | 725/77 |
| 2004/0061685 | A1 | * | 4/2004 | Ostergard et al. | 345/169 |
| 2006/0141930 | A1 | * | 6/2006 | Keen et al. | 455/12.1 |
| 2008/0061609 | A1 | * | 3/2008 | Williamson | 297/217.3 |
| 2009/0288123 | A1 | * | 11/2009 | Havlovick et al. | 725/77 |
| 2010/0293462 | A1 | * | 11/2010 | Bull et al. | 715/716 |

FOREIGN PATENT DOCUMENTS

EP 1768354 A1 * 9/2005 ............. H04M 1/23

OTHER PUBLICATIONS

"*Touchpad*" http://en.wikipedia.org/wiki/touchpad.

* cited by examiner

*Primary Examiner* — Mohammed Rahaman
(74) *Attorney, Agent, or Firm* — Allen, Dyer, Doppelt, Milbrath & Gilchrist, P.A.

(57) ABSTRACT

An aircraft in-flight entertainment (IFE) system includes an entertainment source, passenger seatback displays coupled to the entertainment source, and passenger control units (PCUs). Each PCU is associated with a respective seatback display. Each PCU includes an underside PCU input device carried by an underside of a seatback tray to be accessible by a user from the underside of the seatback tray when the seatback tray is in a stored position, and a topside PCU input device carried by a topside of the seatback tray to be accessible by the user from a topside of the seatback tray when the seatback tray is in a down position.

25 Claims, 45 Drawing Sheets

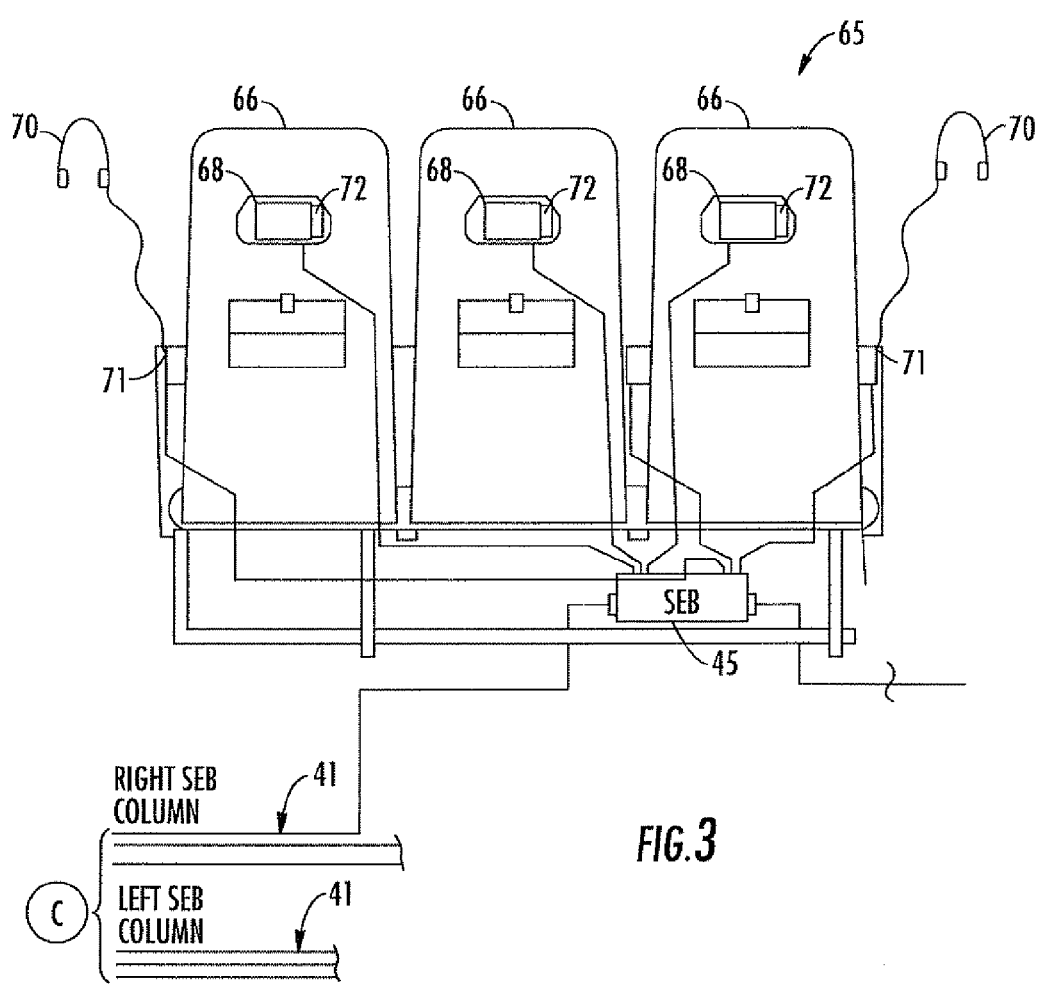

AIRCRAFT IN-FLIGHT ENTERTAINMENT SYSTEM WITH ENHANCED SEATBACK TRAY PASSENGER CONTROL UNITS AND ASSOCIATED METHODS

RELATED APPLICATION

This application claims the benefit of U.S. Provisional Application Ser. No. 61/310,564 filed Mar. 4, 2010, the entire contents of which are incorporated herein by reference.

FIELD OF THE INVENTION

The present invention relates to the field of aircraft in-flight entertainment (IFE) systems, and more particularly, to passenger control units (PCUs) for passenger control of an aircraft IFE system.

BACKGROUND OF THE INVENTION

Commercial aircraft carry millions of passengers each year, and typically include in-flight entertainment (IFE) systems for passenger enjoyment during such flights. Entertainment systems may include individual seatback displays, where movies or other stored video programming are selectable by the passengers. In addition to prerecorded video entertainment, live television broadcasts may be provided via satellite receivers.

Such aircraft IFE systems, however, suffer from several disadvantages. Some passengers find that the aircraft IFE systems are complicated to operate. Selection of the viewing content, for example, can prove difficult due to the awkward placement and operation of the user controls. The user controls are also known as a passenger control unit (PCU).

One approach to address this disadvantage is to provide a PCU that remains tethered to the passenger's seat. This allows the passenger to conveniently position the PCU for operation. Panasonic Avionics Corporation, for example, offers a tethered PCU for aircraft IFE systems.

Another approach to address this disadvantage is to integrate the PCU as part of the seatback tray for controlling the visual display unit (VDU) that is integrated into the passenger seatback. U.S. Pat. No. 6,177,887 discloses input controls on the seatback tray for controlling audio and video channel selection.

Similarly, U.S. published patent application no. 2009/0288123 discloses a PCU integrated as part of the seatback tray. The PCU is configured as a touch pad for controlling a projection display system that is also integrated as part of the seatback tray. The projection display system projects an image onto the rear of the forward seat. The touch pad allows the passenger to move a cursor or arrow across the displayed image to select and control viewing of the entertainment category.

Even in view of the above-described PCU configurations, there is still a need to improve passenger control of an IFE system.

SUMMARY OF THE INVENTION

In view of the foregoing background, it is therefore an object of the present invention to provide an enhanced passenger control unit (PCU) for an IFE system.

This and other objects, advantages and features in accordance with the present invention are provided by an aircraft IFE system comprising at least one entertainment source, a plurality of passenger seatback displays coupled to the at least one entertainment source, and a plurality of PCUs, with each PCU being associated with a respective seatback display.

Each PCU may comprise an underside PCU input device carried by an underside of a seatback tray to be accessible by a user from the underside of the seatback tray when the seatback tray is in a stored position, and a topside PCU input device carried by a topside of the seatback tray to be accessible by the user from a topside of the seatback tray when the seatback tray is in a down position.

The aircraft IFE system may further comprises a respective controller coupled to each of said underside and topside PCU input devices, and wherein each PCU may further comprise a seatback tray position sensor for generating a position signal based on position of the seatback tray so that the controller selectively enables one of the PCU input devices based on the position signal.

Each of the underside and topside PCU input devices may comprise a touchpad. Each touchpad may be configured to recognize multiple simultaneous touch points. Each touchpad may initiate display of different entertainment categories on the respective seatback display associated therewith, with the different entertainment categories being overlaid over a currently displayed image. Each touchpad may advantageously permit the user to change display size of the different entertainment categories being displayed based on recognition of multiple simultaneous touch points by the user.

Alternatively, each of the underside and topside PCU input devices may comprise a plurality of membrane switches.

A respective connector interface may be associated with each passenger seatback display, and comprise an input to receive video and control signals from a user's portable device. The connector interface may comprise a power charging output for interfacing with the user's portable device for charging thereof.

The aircraft in-flight entertainment system may further comprising a plurality of seat electronic boxes (SEBs) coupled to the plurality of passenger seatback displays, and a signal distribution network connecting the at least one entertainment source to the plurality of SEBs. The at least one entertainment source may comprises a satellite TV receiver and/or a direct broadcast (DBS) receiver.

Another aspect of the invention is directed to a method for operating an aircraft IFE system as described above. The method may comprise selectively enabling the underside PCU input device carried by the underside of the seatback tray when the seatback tray is in a stored position, and selectively enabling the topside PCU input device carried by the topside of the seatback tray when the seatback tray is in a down position.

BRIEF DESCRIPTION OF THE DRAWINGS

FIG. 3 is a schematic rear view of a seatgroup of the in-flight entertainment system of the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
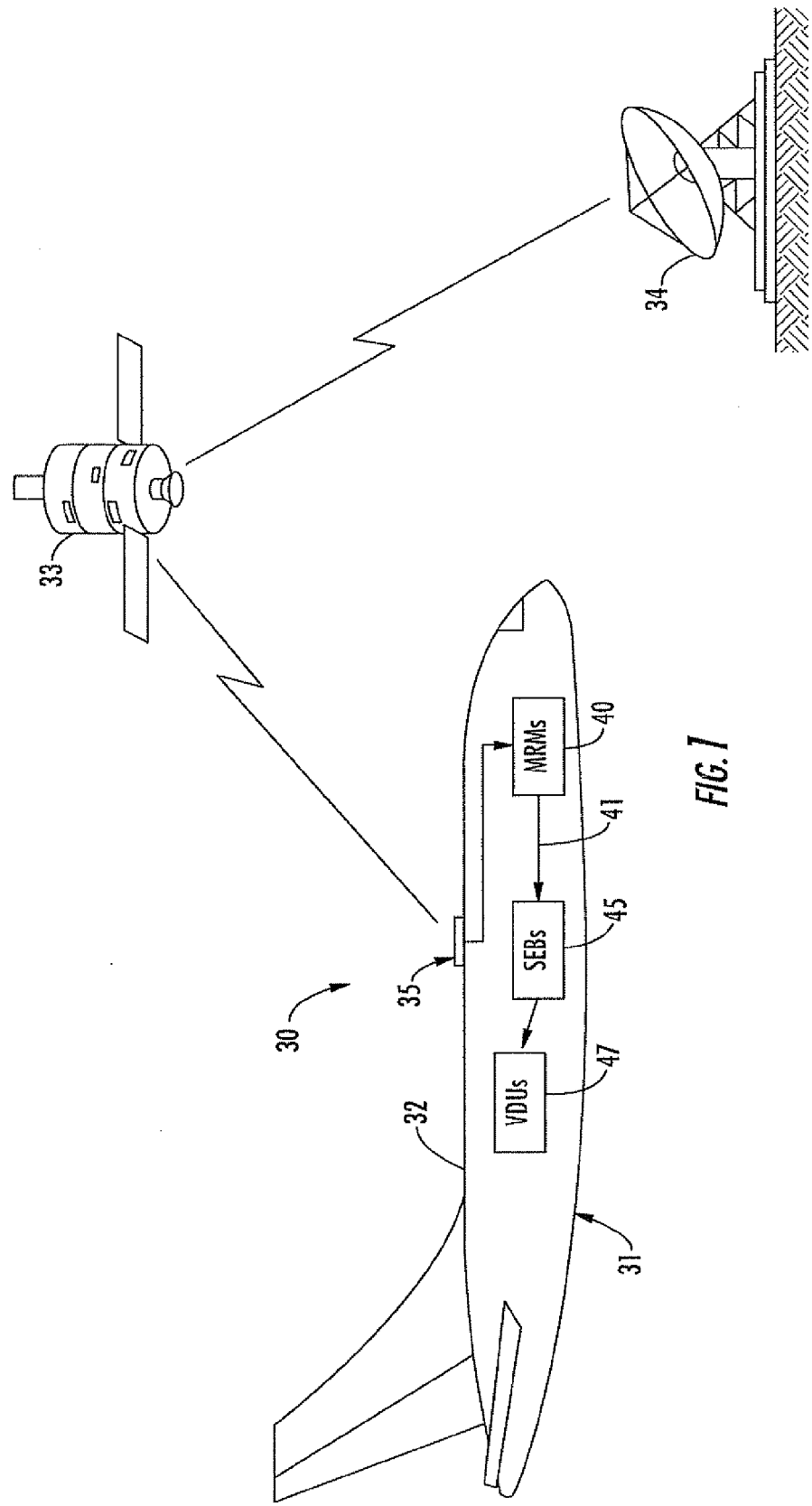
FIG. 1 is a schematic diagram of the overall components of the aircraft in-flight entertainment system in accordance with the present invention.

The major components of an in-flight entertainment system 30 in accordance with the present invention are initially described with reference to FIGS. 1 through 3. The system 30 receives television and/or audio broadcast signals via one or more geostationary satellites 33. The geostationary satellite 33 may be fed programming channels from a terrestrial station 34 as will be appreciated by those skilled in the art.

The in-flight entertainment system 30 includes an antenna system 35 to be mounted on the fuselage 32 of the aircraft 31. In addition, the system 30 also includes one or more multi-channel receiver modulators (MRMs) 40, a cable distribution network 41, a plurality of seat electronic boxes (SEBs) 45 spaced about the aircraft cabin, and video display units (VDUs) 47 for the passengers and which are connected to the SEBs. In the illustrated embodiment, the system 30 receives, distributes, and decodes the DES transmissions from the DES satellite 33. In other embodiments, the system 30 may receive video or TV signals from other classes of satellites as will be readily appreciated by those skilled in the art.

The antenna system 35 delivers DES signals to the MRMs 40 for processing. For example, each MRM 40 may include twelve DES receivers and twelve video/audio RF modulators. The twelve receivers recover the digitally encoded multiplexed data for twelve television programs as will be appreciated by those skilled in the art.

Figure 2A:
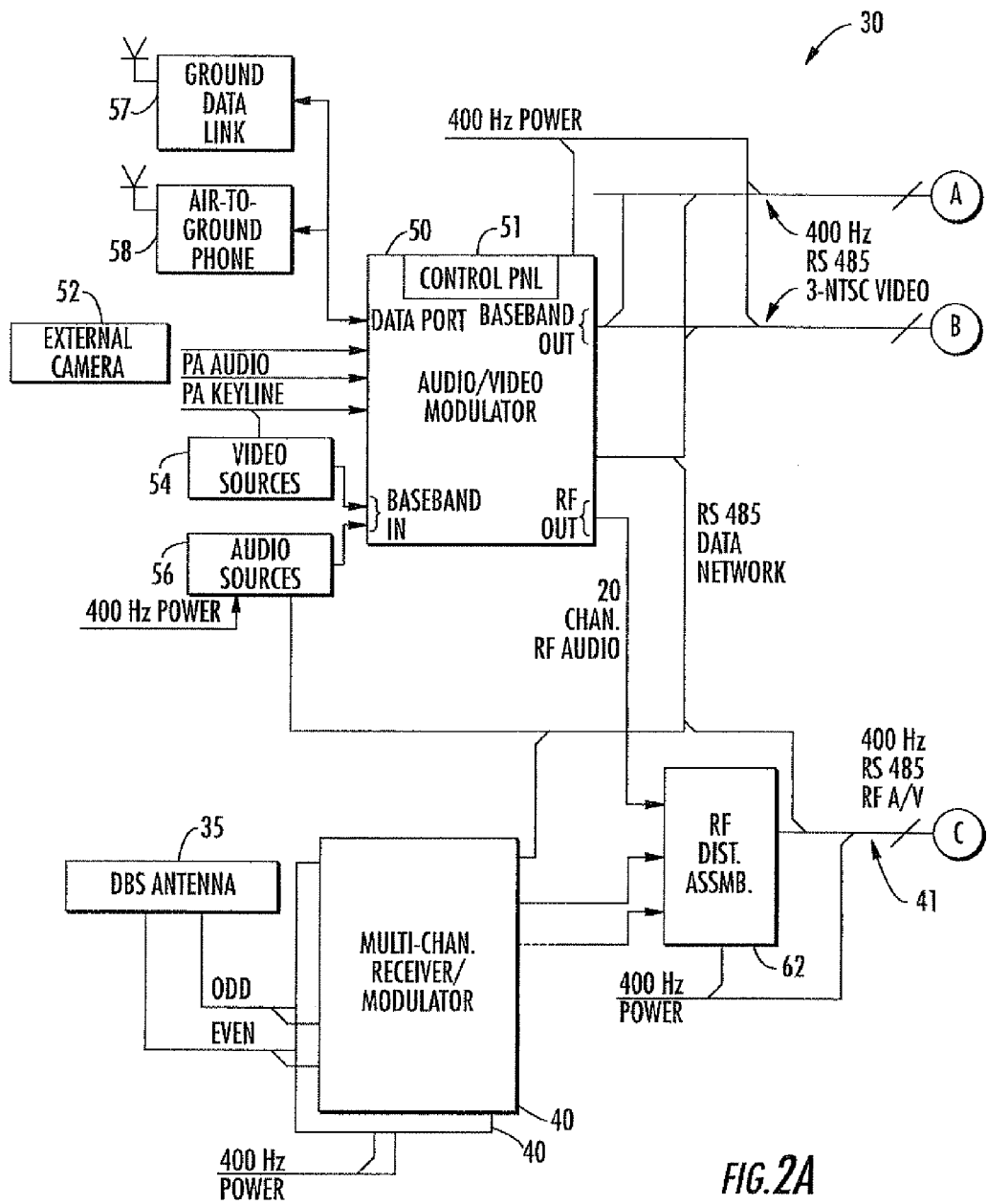
FIGS. 2A and 2B are a more detailed schematic block diagram of an embodiment of the in-flight entertainment system in accordance with the present invention.
Figure 2B:
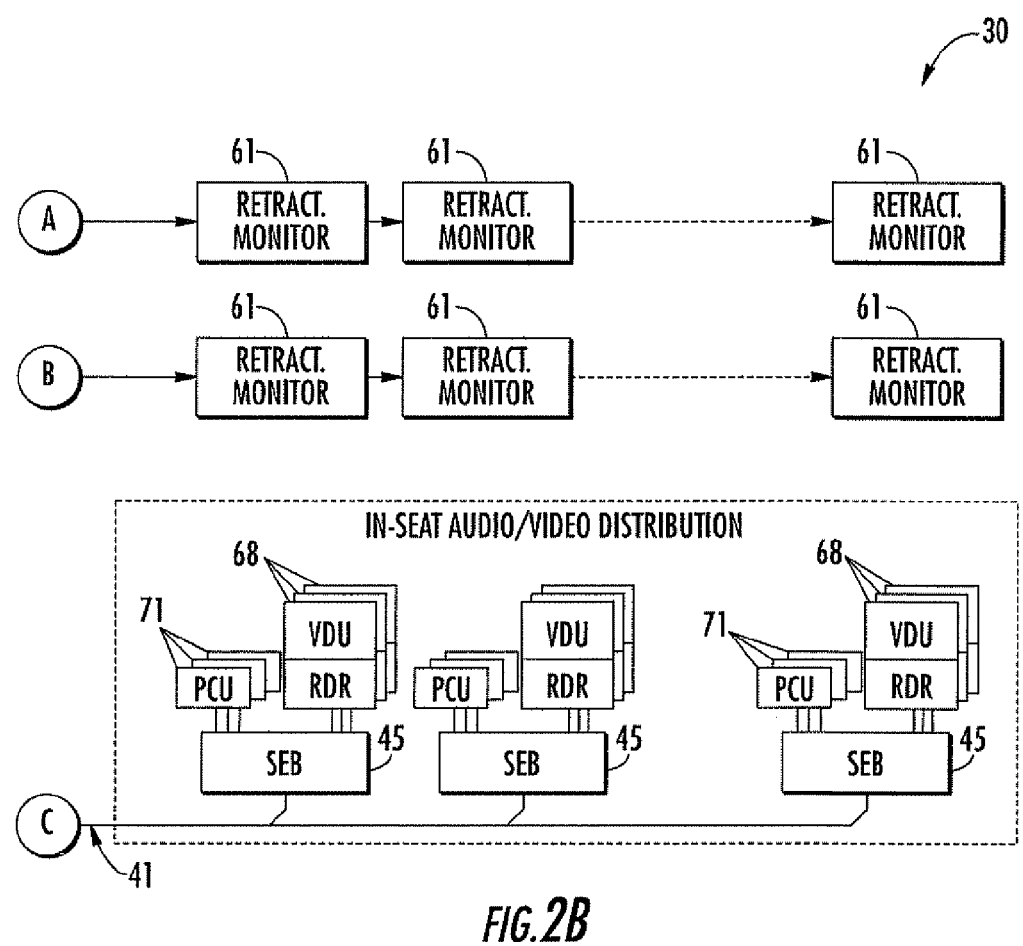

As shown in the more detailed schematic diagram of FIGS. 2A and 2B, an audio video modulator (AVM) 50 is connected to the MRMs 40, as well as a number of other inputs and outputs. The AVM 50 illustratively receives inputs from an external camera 52, as well as one or more other video sources 54, such as videotape sources, and receives signal inputs from one or more audio sources 56 which may also be prerecorded, for example. A PA keyline input and PA audio input are provided for public address and video address override. Audio for any receiver along with an associated keyline are provided as outputs from the MRM so that the audio may be broadcast over the cabin speaker system, for example, as will also be appreciated by those skilled in the art. In the illustrated embodiment, a control panel 51 is provided as part of the AVM 50. The control panel 51 not only permits control of the system, but also displays pertinent system information and permits various diagnostic or maintenance activities to be quickly and easily performed.

The AVM 50 is also illustratively coupled to a ground data link radio transceiver 57, such as for permitting downloading or uploading of data or programming information. The AVM 50 is also illustratively interfaced to an air-to-ground telephone system 58 as will be appreciated by those skilled in the art.

The AVM 50 illustratively generates a number of NTSC video outputs which may be fed to one or more retractable monitors 61 spaced throughout the cabin. Power is preferably provided by the aircraft 400 Hz AC power supply as will also be appreciated by those skilled in the art. Of course, in some embodiments, the retractable monitors may not be needed.

The MRMs 40 may perform system control, and status monitoring. An RF distribution assembly (RDA) 62 can be provided to combine signals from a number of MRMs, such as four, for example. The RDA 62 combines the MRM RF outputs to create a single RF signal comprising up to 48 audio/video channels, for example. The RDA 62 amplifies and distributes the composite RF signal to a predetermined number of zone cable outputs. Eight zones are typical for a typical narrow-body single-aisle aircraft 31. Depending on the aircraft, not all eight outputs may be used. Each cable will serve a zone of seatgroups 65 in the passenger cabin.

Referring now more specifically to the lower portion of FIG. 2B and also to FIG. 3, distribution of the RF signals and display of video to the passengers is now further described. Each zone cable 41 feeds the RF signal to a group of contiguous seatgroups 65 along either the right or lefthand side of the passenger aisle. In the illustrated embodiment, the seatgroup 65 includes three side-by-side seats 66, although this number may also be two for other types of conventional narrow-body aircraft.

The distribution cables 41 are connected to the first SEB 45 in each respective right or left zone. The other SEBs 45 are daisy-chained together with seat-to-seat cables. The zone feed, and seat-to-seat cables preferably comprise an RF audio-video coaxial cable, a 400 cycle power cable, and RS 485 data wiring.

For each seat 66 in the group 65, the SEE 45 tunes to and demodulates one of the RF modulated audio/video channels. The audio and video are output to the passenger video display units (VDUs) 68 and headphones 70, respectively. The tuner channels are under control of the passenger control unit (PCU) 71, typically mounted in the armrest of the seat 66, and which also carries a volume control.

Each VDU 68 may be a flat panel color display mounted in the seatback. The VDU 68 may also be mounted in the aircraft bulkhead in other configurations as will be appreciated by those skilled in the art. The VDU 68 will also typically include associated therewith a user payment card reader 72. The payment card reader 72 may be a credit card reader, for example, of the type that reads magnetically encoded information from a stripe carried by the card as the user swipes the card through a slot in the reader as will be appreciated by those skilled in the art. In some embodiments, the credit card data may be processed on the aircraft to make certain processing decisions relating to validity, such as whether the card is expired, for example. As described in greater detail below, the payment card reader 72 may also be used as the single input required to activate the system for enhanced user convenience.

Having now generally described the major components of the in-flight entertainment system 30 and their overall operation, the description now is directed to several important features and capabilities of the system in greater detail. One such feature relates to flexibility or upgradability of the system as may be highly desirable for many airline carriers. In particular, the system 30 is relatively compact and relatively inexpensive so that it can be used on narrow-body aircraft 31, that is, single-aisle aircraft. Such narrow-body aircraft 31 are in sharp contrast to wide-body aircraft typically used on longer overseas flights and which can typically carry greater volumes and weight. The narrow-body aircraft 31 are commonly used on shorter domestic flights The system 30, for example, can be first installed to provide only audio. In addition, the first class passengers may be equipped with seat back VDUs 68, while the coach section includes only aisle mounted video screens. The important aspect that permits upgradability is that the full cable distribution system is installed initially to thereby have the capacity to handle the upgrades. In other words, the present invention permits upgrading and provides reconfiguration options to the air carrier for an in-flight entertainment system and while reducing downtime for such changes.

The cable distribution system is modeled after a conventional ground based cable TV system in terms of signal modulation, cabling, drops, etc. Certain changes are made to allocate the available channels, such as forty-eight, so as not to cause potential interference problems with other equipment aboard the aircraft 31 as will be appreciated by those skilled in the art. In addition, there are basically no active components along the cable distribution path that may fail, for example. The cable distribution system also includes zones of seatgroups 66. The zones provide greater robustness in the event of a failure. The zones can also be added, such as to provide full service throughout the cabin.

Figure 4:
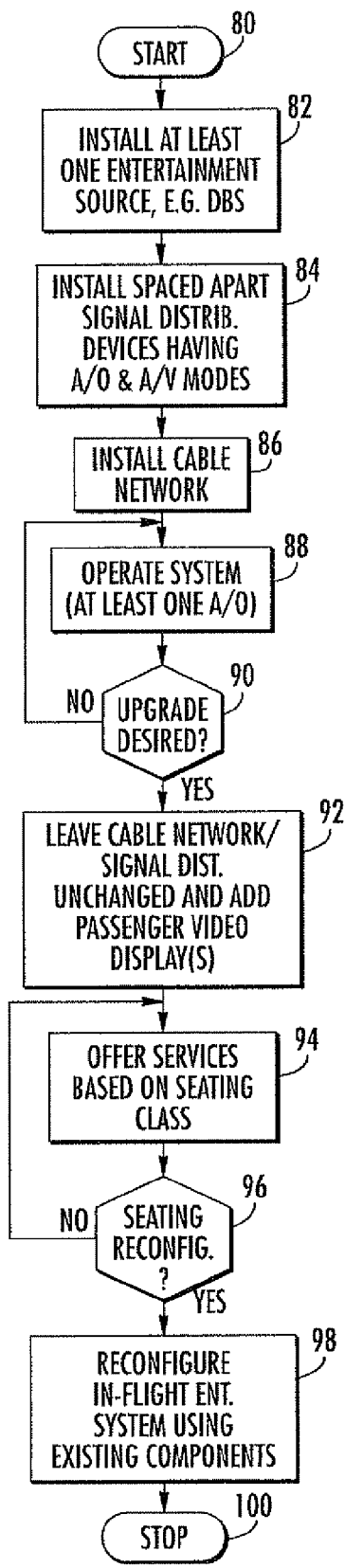
FIG. 4 is a flowchart for a first method aspect relating to the in-flight entertainment system of the invention.

Referring now additionally to the flow chart of FIG. 4, a method for installing and operating an aircraft in-flight entertainment system in accordance with the invention is now described. After the start (Block 80), the method preferably comprises installing at least one entertainment source on the aircraft at Block 82. The entertainment source may include a satellite TV source, such as provided by the DBS antenna system 35 and MRMs 40 described above. The method at Block 84 also preferably includes installing a plurality of spaced apart signal distribution devices, each generating audio signals for at least one passenger in an audio-only mode, and generating audio and video signals to at least one passenger in an audio/video mode. These devices may be the SEBs 45 described above as will be readily appreciated by those skilled in the art. The SEBs 45 include the capability for both audio and video when initially installed to thereby provide the flexibility for upgrading.

At Block 86 the cable network is installed on the aircraft 31 connecting the at least one entertainment source to the signal distribution devices. In other words, the MRMs 40 are connected to the SEBs 45 in the various equipped zones throughout the aircraft 31. Operating the aircraft in-flight entertainment system 30 at Block 88 with at least one predetermined signal distribution device in the audio-only mode, permits initial weight and cost savings since the VDUs 68, for example, may not need to be initially installed for all passengers as will be appreciated by those skilled in the art. For example, a carrier may initially decide to equip first class passengers with both video and audio entertainment options, while coach passengers are initially limited to audio only. Hence, the cost of the VDUs 68 for the coach passengers is initially deferred.

Installing the cabling 41 and SEBs 45 at one time will result in substantial time and labor savings as compared to a piecemeal approach to adding these components at a later time as needed. Accordingly, should an upgrade be desired at Block 90, this may be readily accomplished by connecting at least one VDU 68 to the at least one predetermined signal distribution device, or SEB 45, to operate in the audio/video mode and while leaving the cable network unchanged (Block 92). Accordingly, the downtime experienced by air carrier is greatly reduced over other systems which require significant recabling and other difficult equipment installation operations for upgrading. The method is particularly advantageous for a single-aisle narrow-body aircraft 31 as shown in the illustrated embodiment, where cost effectiveness and low weight are especially important.

As noted above, the entertainment source may preferably comprise a DBS receiver. The step of later upgrading may further comprise leaving the at least one predetermined signal distribution device, such as the SEB 45, unchanged. The step of installing the cable network 41 may comprise installing coaxial cable, power cable and data cable throughout the aircraft as also described above. The step of later upgrading may include installing at least one VDU 68 in the aircraft 31, such as on backs of passenger seats 66.

Of course, the aircraft 31 in some embodiments may include different seating classes as will be appreciated by those skilled in the art. Accordingly, another important aspect of the invention relates to offering different entertainment services based upon the different seating classes at Block 94. In addition, the different seating classes may be reconfigurable, and the step of reconfiguring offered entertainment services may then be based upon reconfiguring of the seating classes. The offering of different entertainment services may comprise offering different packages of television channels, for example. In addition, the step of offering different entertainment services may comprise offering audio-only and audio/video modes of operation based upon seating classes.

Yet another aspect of the invention relates to a method for operating an aircraft in-flight entertainment system 30 for an aircraft 31 when seating classes are reconfigured. Continuing down the flowchart of FIG. 4, this aspect of the method preferably comprises determining whether a reconfiguration is desired at Block 96, and reconfiguring offered entertainment services based upon reconfiguring of the seating classes at Block 98 before stopping at Block 100. For example, the step of offering different entertainment services may include offering different packages of television channels. Alternatively, the step of offering different entertainment services may comprise offering audio-only and audio/video modes of operation based upon seating classes. In either case, the reconfiguring can be readily accomplished using the existing cable distribution network 41 and distribution devices, that is, SEBs 45 as will be appreciated by those skilled in the art.

The various upgrading and reconfiguring aspects of the in-flight entertainment system 30 can be performed in a reverse sequence than that illustrated in FIG. 4 and described above. Of course, the upgrade steps may be practiced without the later reconfiguring steps as will be appreciated by those skilled in the art.

Figure 5:
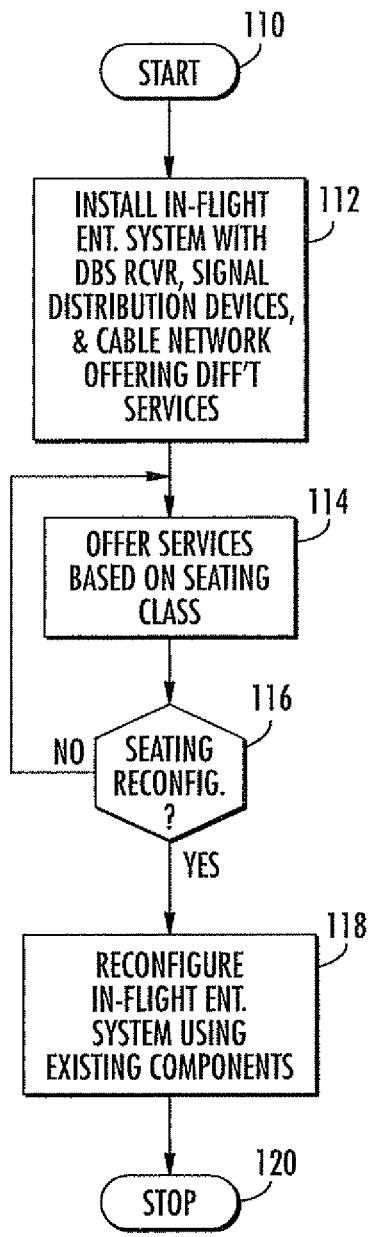
FIG. 5 is a flowchart for a second method aspect relating to the in-flight entertainment system of the invention.

To further illustrate the method aspects, the flowchart of FIG. 5 is directed to the subset of offering different services and later reconfiguring those services based upon reconfiguring seating. More particularly, from the start (Block 110), the in-flight entertainment system 30 is installed at Block 112 and operated (Block 114) offering different services based upon seating class, such as offering video to first class passengers, and offering only audio to non-first class passengers. If it is determined that the seating should be reconfigured at Block 116, then the in-flight entertainment system 30 can be readily reconfigured at Block 118 before stopping (Block 120).

Figure 6:
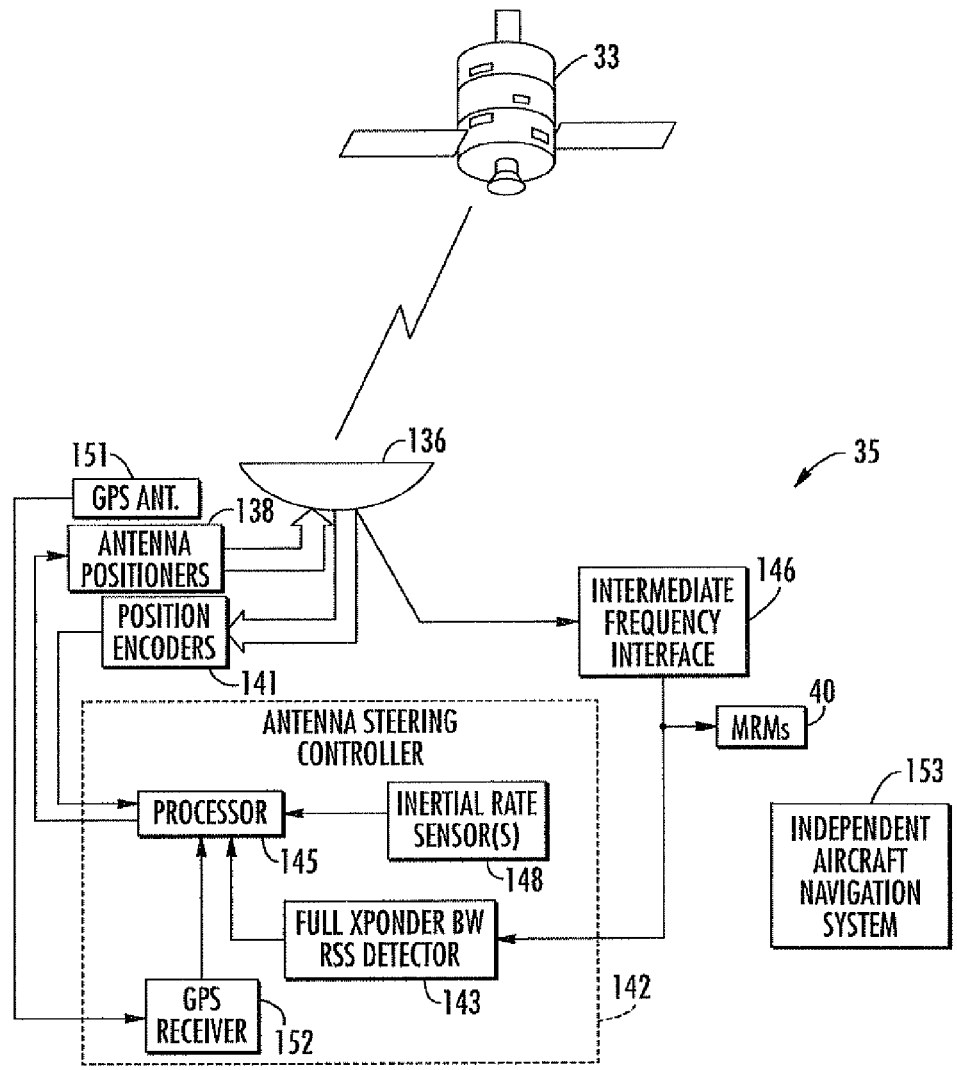
FIG. 6 is a more detailed schematic block diagram of a first embodiment of an antenna-related portion of the in-flight entertainment system of the invention.
Figure 7:
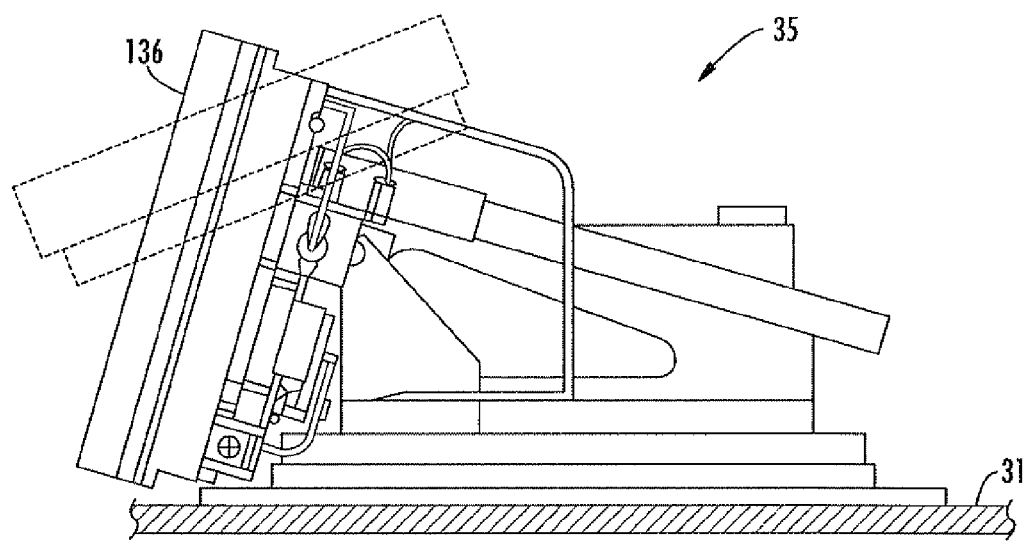
FIG. 7 is a side elevational view of the antenna mounted on the aircraft of the in-flight entertainment system of the invention.

Turning now additionally to FIGS. 6 and 7, advantages and features of the antenna system 35 are now described in greater detail. The antenna system 35 includes an antenna 136 which may be positioned or steered by one or more antenna positioners 138 as will be appreciated by those skilled in the art. In addition, one or more position encoders 141 may also be associated with the antenna 136 to steer the antenna to thereby track the DBS satellite or satellites 33. Of course, a positioning motor and associated encoder may be provided together within a common housing, as will also be appreciated by those skilled in the art. In accordance with one significant advantage of the present invention, the antenna 136 may be steered using received signals in the relatively wide bandwidth of at least one DBS transponder.

More particularly, the antenna system 35 includes an antenna steering controller 142, which, in turn, comprises the illustrated full transponder bandwidth received signal detector 143. This detector 143 generates a received signal strength feedback signal based upon signals received from the full bandwidth of a DBS transponder rather than a single demodulated programming channel, for example. Of course, in other embodiments the same principles can be employed for other classes or types of satellites than the DBS satellites described herein by way of example.

In the illustrated embodiment, the detector 143 is coupled to the output of the illustrated intermediate frequency interface (IFI) 146 which converts the received signals to one or more intermediate frequencies for further processing by the MRMs 40 as described above and as will be readily appreciated by those skilled in the art. In other embodiments, signal processing circuitry, other than that in the IFI 146 may also be used to couple the received signal from one or more full satellite transponders to the received signal strength detector 143 as will also be appreciated by those skilled in the art.

A processor 145 is illustratively connected to the received signal strength detector 143 for controlling the antenna steering positioners 138 during aircraft flight and based upon the received signal strength feedback signal. Accordingly, tracking of the satellite or satellites 33 is enhanced and signal service reliability is also enhanced.

The antenna steering controller 142 may further comprise at least one inertial rate sensor 148 as shown in the illustrated embodiment, such as for roll, pitch or yaw as will be appreciated by those skilled in the art. The rate sensor 148 may be provided by one or more solid state gyroscopes, for example. The processor 145 may calibrate the rate sensor 148 based upon the received signal strength feedback signal.

The illustrated antenna system 35 also includes a global positioning system (GPS) antenna 151 to be carried by the aircraft fuselage 32. This may preferably be provided as part of an antenna assembly package to be mounted on the upper portion of the fuselage. The antenna assembly may also include a suitable radome, not shown, as will be appreciated by those skilled in the art. The antenna steering controller 142 also illustratively includes a GPS receiver 152 connected to the processor 145. The processor 145 may further calibrate the rate sensor 148 based upon signals from the GPS receiver as will be appreciated by those skilled in the art.

As will also be appreciated by those skilled in the art, the processor 145 may be a commercially available microprocessor operating under stored program control. Alternatively, discrete logic and other signal processing circuits may be used for the processor 145. This is also the case for the other portions or circuit components described as a processor herein as will be appreciated by those skilled in the art. The advantageous feature of this aspect of the invention is that the full or substantially full bandwidth of the satellite transponder signal is processed for determining the received signal strength, and this provides greater reliability and accuracy for steering the antenna 136.

Another advantage of the antenna system 35 is that it may operate independently of the aircraft navigation system 153 which is schematically illustrated in the lower righthand portion of FIG. 6. In other words, the aircraft 31 may include an aircraft navigation system 153, and the antenna steering controller 142 may operate independently of this aircraft navigation system. Thus, the antenna steering may operate faster and without potential unwanted effects on the aircraft navigation system 153 as will be appreciated by those skilled in the art. In addition, the antenna system 35 is also particularly advantageous for a single-aisle narrow-body aircraft 31 where cost effectiveness and low weight are especially important.

Figure 8:
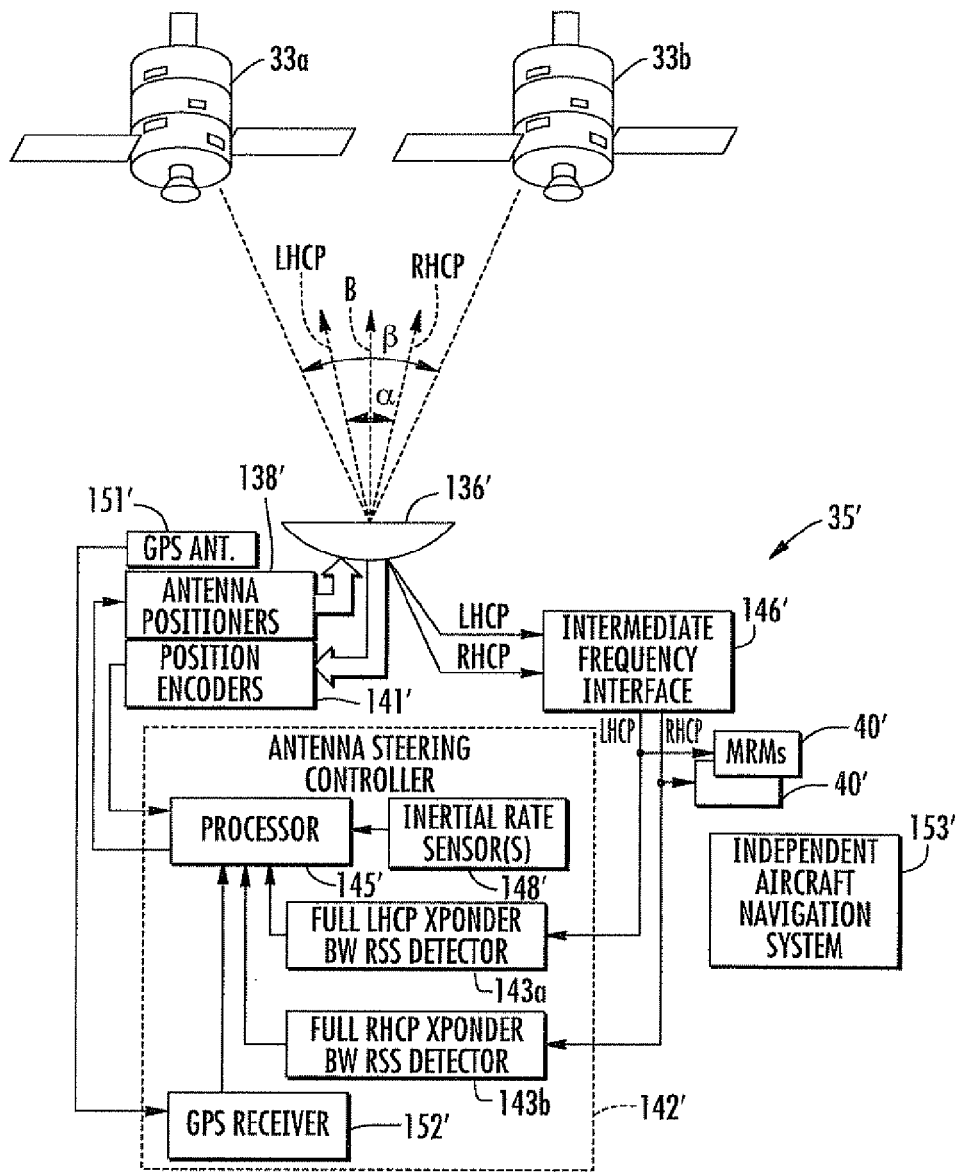
FIG. 8 is a more detailed schematic block diagram of a second embodiment of an antenna-related portion of the in-flight entertainment system of the invention.

Turning now additionally to FIG. 8, another embodiment of the antenna system 35' is now described which includes yet further advantageous features. This embodiment is directed to functioning in conjunction with the three essentially collocated geostationary satellites for the DIRECTV® DBS service, although the invention is applicable in other situations as well. For example, the DIRECTV® satellites may be positioned above the earth at 101 degrees west longitude and spaced 0.5 degrees from each other. Of course, these DIRECTV® satellites may also be moved from these example locations, and more than three satellites may be so collocated. Considered in somewhat broader terms, these features of the invention are directed to two or more essentially collocated geostationary satellites. Different circular polarizations are implemented for reused frequencies as will be appreciated by those skilled in the art.

In this illustrated embodiment, the antenna 136' is a multi-beam antenna having an antenna boresight (indicated by reference B), and also defining right-hand circularly polarized (RHCP) and left-hand circularly polarized (LHCP) beams (designated RHCP and LHCP in FIG. 8) which are offset from the antenna boresight. Moreover, the beams RHCP, LHCP are offset from one another by a beam offset angle $\alpha$ which is greatly exaggerated in the figure for clarity. This beam offset angle $\alpha$ is less than the angle $\beta$ defined by the spacing defined by the satellites 33a, 33b. The transponder or satellite spacing angle $\beta$ is about 0.5 degrees, and the beam offset angle $\alpha$ is preferably less than 0.5 degrees, and may be about 0.2 degrees, for example.

The beam offset angle provides a squinting effect and which allows the antenna 136' to be made longer and thinner than would otherwise be required, and the resulting shape is highly desirable for aircraft mounting as will be appreciated by those skilled in the art. The squinting also allows the antenna to be constructed to have additional signal margin when operating in rain, for example, as will also be appreciated by those skilled in the art.

The multi-beam antenna 136' may be readily constructed in a phased array form or in a mechanical form as will be appreciated by those skilled in the art without requiring further discussion herein. Aspects of similar antennas are disclosed in U.S. Pat. No. 4,604,624 to Amitay et al.; U.S. Pat. No. 5,617,108 to Silinsky et al.; and U.S. Pat. No. 4,413,263 also to Amitay et al.; the entire disclosures of which are incorporated herein by reference.

The processor 145' preferably steers the antenna 136' based upon received signals from at least one of the RHCP and LHCP beams which are processed via the IFI 146' and input into respective received signal strength detectors 143a, 143b of the antenna steering controller 142'. In one embodiment, the processor 145' steers the multi-beam antenna 136' based on a selected master one of the RHCP and LHCP beams and slaves the other beam therefrom.

In another embodiment, the processor 145' steers the multi-beam antenna 136' based on a predetermined contribution from each of the RHCP and LHCP beams. For example, the contribution may be the same for each beam. In other words, the steering or tracking may such as to average the received signal strengths from each beam as will be appreciated by those skilled in the art. As will also be appreciated by those skilled in the art, other fractions or percentages can also be used. Of course, the advantage of receiving signals from two different satellites 33a, 33b is that more programming channels may then be made available to the passengers.

The antenna system 35' may also advantageously operate independent of the aircraft navigation system 153'. The other elements of FIG. 8 are indicated by prime notation and are similar to those described above with respect to FIG. 6. Accordingly, these similar elements need no further discussion.

Another aspect of the invention relates to the inclusion of adaptive polarization techniques that may be used to avoid interference from other satellites. In particular, low earth orbit satellites (LEOS) are planned which may periodically be in position to cause interference with the signal reception by the in-flight entertainment system 30. Adaptive polarization techniques would also be desirable should assigned orbital slots for satellites be moved closer together.

Accordingly, the processor 145' may preferably be configured to perform adaptive polarization techniques to avoid or reduce the impact of such potential interference. Other adaptive polarization techniques may also be used. Suitable adaptive polarization techniques are disclosed, for example, in U.S. Pat. No. 5,027,124 to Fitzsimmons et al; U.S. Pat. No. 5,649,318 to Lusignan; and U.S. Pat. No. 5,309,167 to Cluniat et al. The entire disclosures of each of these patents is incorporated herein by reference. Those of skill in the art will readily appreciate the implementation of such adaptive polarization techniques with the in-flight entertainment system 30 in accordance with the present invention without further discussion.

Figure 10:
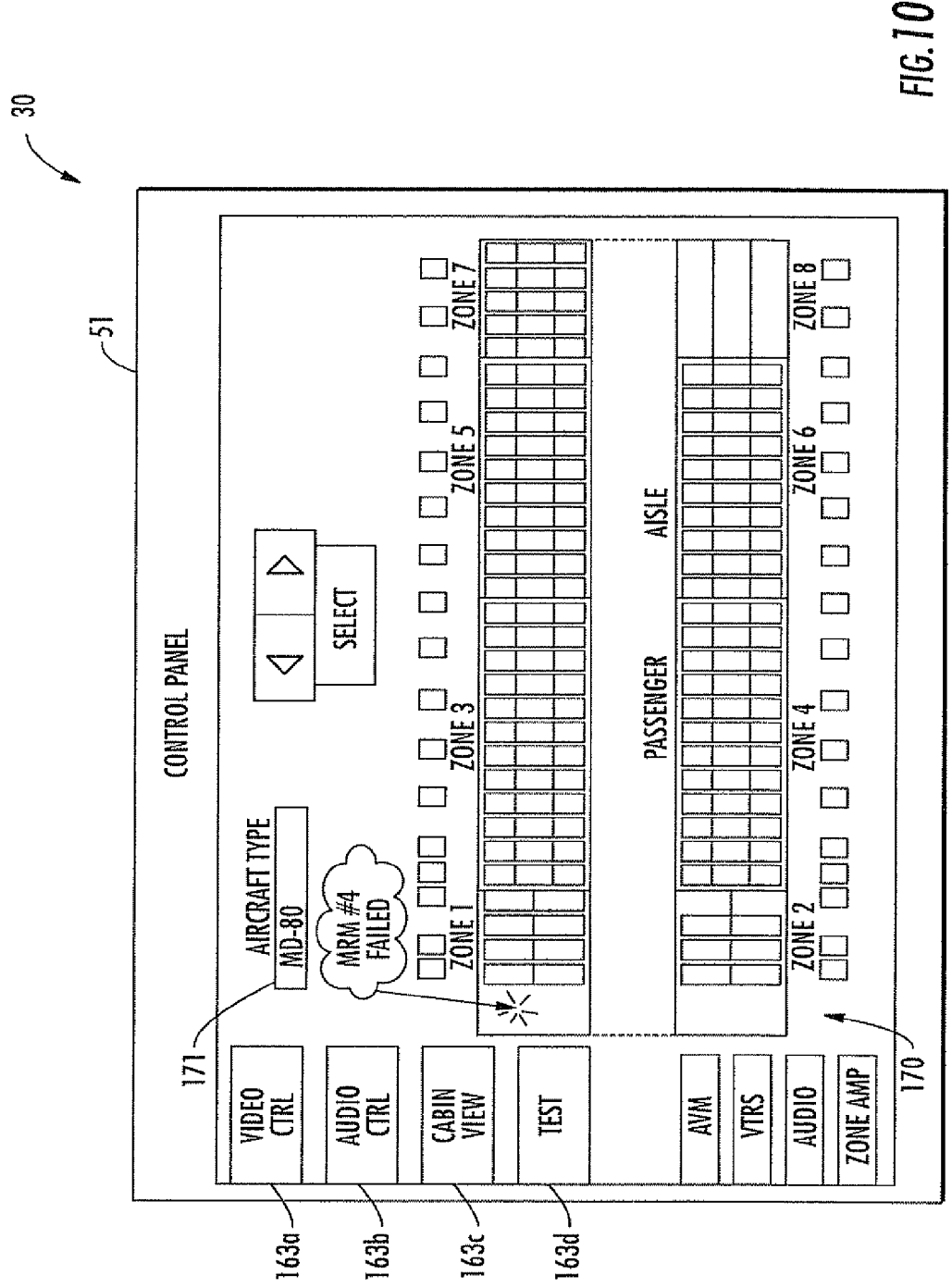
Figure 11:
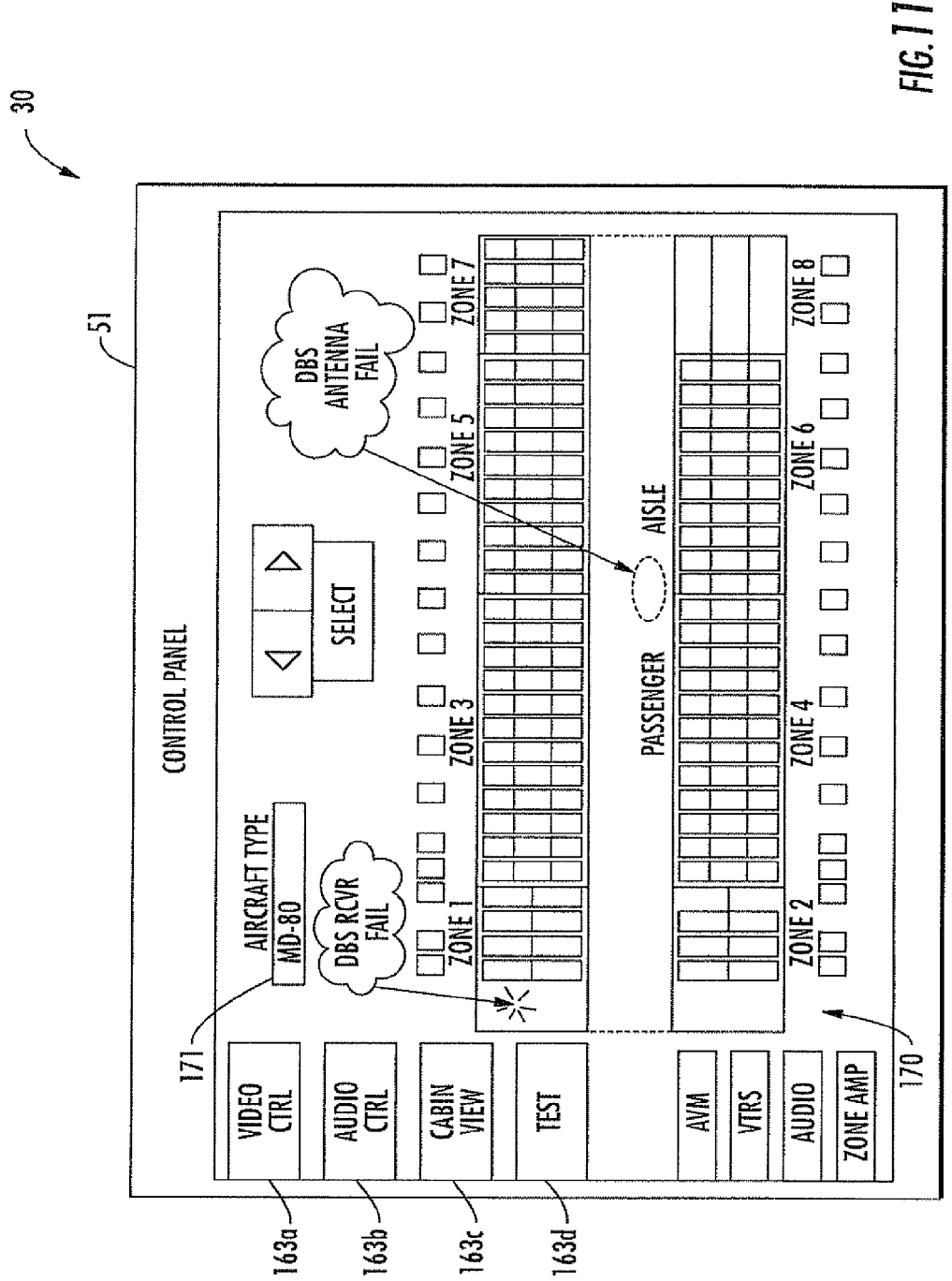

Other aspects and advantages of the in-flight entertainment system 30 of the present invention are now explained with reference to FIGS. 9-11. The system 30 advantageously incorporates a number of self-test or maintenance features. As will be appreciated by those skilled in the art, the maintenance costs to operate such a system 30 could be significantly greater than the original purchase price. Accordingly, the system 30 includes test and diagnostic routines to pinpoint defective equipment. In particular, the system 30 provides the graphical representation of the aircraft seating arrangement to indicate class of service, equipment locations, and failures of any of the various components to aid in maintenance.

Figure 9:
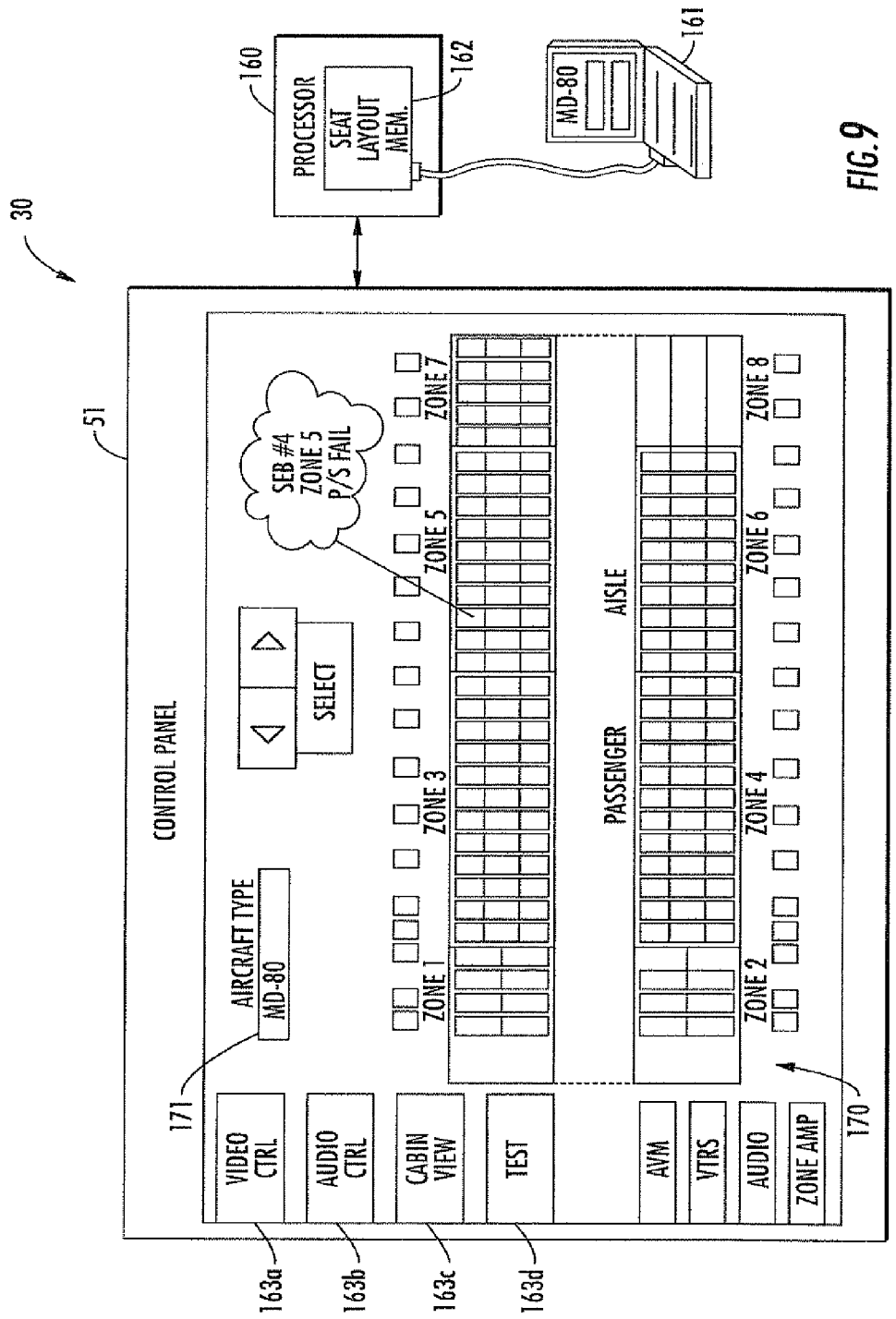
FIGS. 9-11 are simulated control panel displays for the in-flight entertainment system of the invention.

As shown in FIG. 9, the system 30 includes a control panel display 51, and a processor 160 connected to the control panel display. The control panel display 51 and processor 160 may be part of the AVM 50 (FIG. 1), but could be part of one or more of the MRMs 40 (FIG. 1), or part of another monitoring device as will be appreciated by those skilled in the art. The control panel display 51 may be touch screen type display including designated touch screen input areas 163a-163d to also accept user inputs as would also be appreciated by those skilled in the art.

More particularly, the processor 160 generates a seating layout image 170 of the aircraft on the control panel display 51 with locations of the signal distribution devices located on the seating layout image. These locations need not be exact, but should be sufficient to direct the service technician to the correct left or right side of the passenger aisle, and locate the seatgroup and/or seat location for the defective or failed component. In addition, the locations need not be constantly displayed; rather, the location of the component may only be displayed when service is required, for example.

The processor 160 also preferably generates information relating to operation of the signal distribution devices on the display. The signal distribution devices, for example, may comprise demodulators (SEBs 45), modulators (MRMs 40), or the video passenger displays (VDUs 68), for example. Accordingly, a user or technician can readily determine a faulty component and identify its location in the aircraft.

As shown in the illustrated embodiment of FIG. 9, the representative information is a failed power supply module of the #4 SEB of zone 5. In FIG. 10, the information is for a failed #4 MRM. This information is illustratively displayed in text with an indicator pointing to the location of the device. In other embodiments, a flashing icon or change of color could be used to indicate the component or signal distribution device requiring service as will be appreciated by those skilled in the art.

This component mapping and service needed feature of the invention can be extended to other components of the system 30 as will be readily appreciated by those skilled in the art. For example, the processor 160 may further generate information relating to operation of the entertainment source, such as the DBS receiver, or its antenna as shown in FIG. 11. Again, the technician may be guided to the location of the failed component from the seat image layout 170.

Returning again briefly to FIG. 9, another aspect of the invention relates to display of the correct seating layout 170 for the corresponding aircraft 31. As shown, the display 51 may also include an aircraft-type field 171 that identifies the particular aircraft, such as an MD-80. The corresponding seating layout data can be downloaded to the memory 162 or the processor 160 by a suitable downloading device, such as the illustrated laptop computer 161. In other embodiments, the processor 160 may be connected to a disk drive or other data downloading device to receive the seat layout data.

The seat layout data would also typically include the data for the corresponding locations of the devices installed as part of the in-flight entertainment system 30 on the aircraft as will be appreciated by those skilled in the art. Accordingly, upgrades or changes in the system 30 configuration may thus be readily accommodated.

Another aspect of the invention relates to a soft failure mode and is explained with reference to FIGS. 12 and 13. A typical DBS system provides a default text message along the lines "searching for satellite" based upon a weak or missing signal from the satellite. Of course, an air traveler may become disconcerted by such a message, since such raises possible questions about the proper operation of the aircraft. In other systems, a weak received signal may cause the displayed image to become broken up, which may also be disconcerting to the air traveler.

Figure 12:
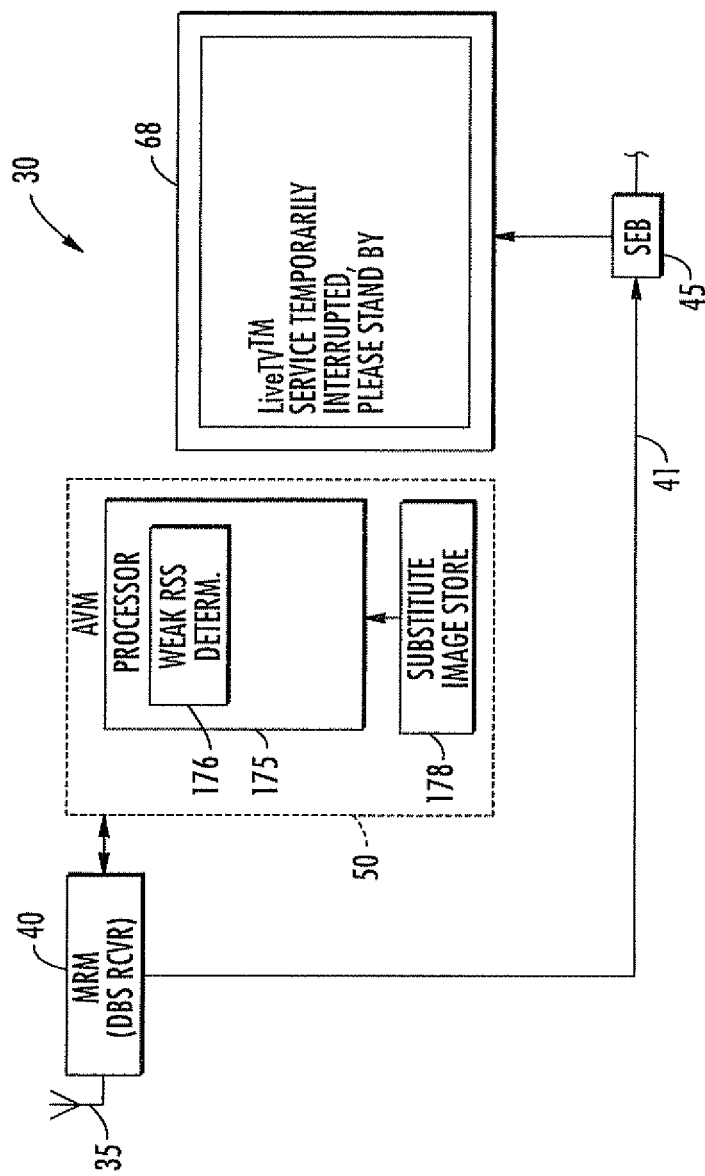
FIG. 12 is a schematic diagram of a portion of the in-flight entertainment system of the invention illustrating a soft-fail feature according to a first embodiment.
Figure 13:
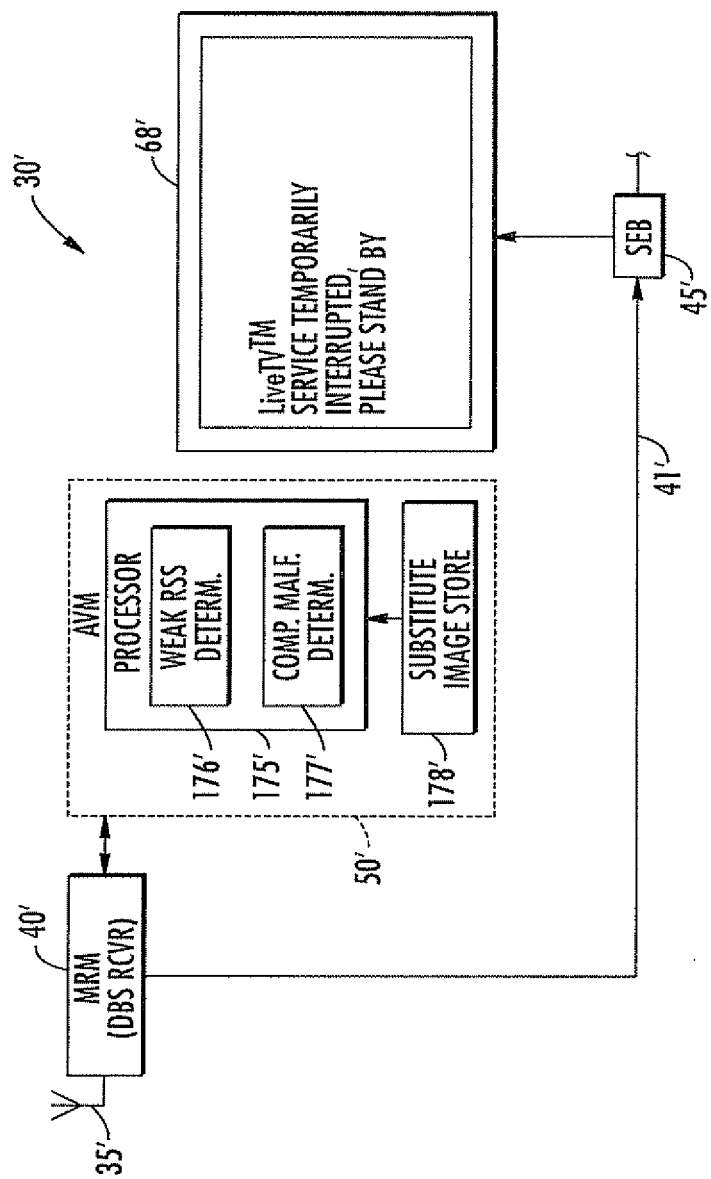
FIG. 13 is a schematic diagram of a portion of the in-flight entertainment system of the invention illustrating a soft-fail feature according to a second embodiment.

The system 30 as shown in FIG. 12 of the present invention includes a processor 175 which may detect the undesired condition in the form of a weak or absent received signal strength, and cause the passenger video display 68 to display a substitute image. More particularly, the processor 175 may be part of the AVM 50 as described above, could be part of another device, such as the MRM 40, or could be a separate device.

The processor 175 illustratively includes a circuit or portion 176 for determining a weak received signal strength as will be appreciated by those skilled in the art. Suitable circuit constructions for the weak received signal strength determining portion or circuit 176 will be readily appreciated by those skilled in the art, and require no further discussion herein. The threshold for the weak received signal strength determining portion or circuit 176 can preferably be set so as to trigger the substitute image before substantial degradation occurs, or before a text default message would otherwise be triggered, depending on the satellite service provider, as would be appreciated by those skilled in the art. In addition, the substitute image could be triggered for a single programming channel upon a weakness or loss of only that single programming channel, or may be generated across the board for all programming channels as will be readily appreciated by those skilled in the art.

In the illustrated system 30 of FIG. 12, a substitute image storage device 178 is coupled to the processor 175. This device 178 may be a digital storage device or a video tape player, for example, for causing the passenger video display 68 to show a substitute image. For example, the image could be a text message, such as "LiveTV™ Service Temporarily Unavailable, Please Stand By". Of course, other similar messages or images are also contemplated by the invention, and which tend to be helpful to the passenger in understanding a loss of programming service has occurred, but without raising unnecessary concern for the proper operation of the aircraft 31 to the passenger.

This concept of a soft failure mode, may also be carried forward or applied to a component malfunction, for example. As shown in the system 30' of FIG. 13, a component malfunctioning determining portion or circuit 177' is added to the processor 175' and can be used in combination with the weak received signal strength determining portion 176'. Of course, in other embodiments the malfunction determining circuit portion 177' could be used by itself. Again, rather than have a disconcerting image appear on the passenger's video display 68', a substitute image may be provided. Those of skill in the art will appreciate that the weak received signal strength and component malfunction are representative of types of undesired conditions that the present system 30 may determine and provide a soft failure mode for. The other elements of FIG. 13 are indicated by prime notation and are similar to those described above with respect to FIG. 12. Accordingly, these similar elements need no further discussion.

Figure 14:
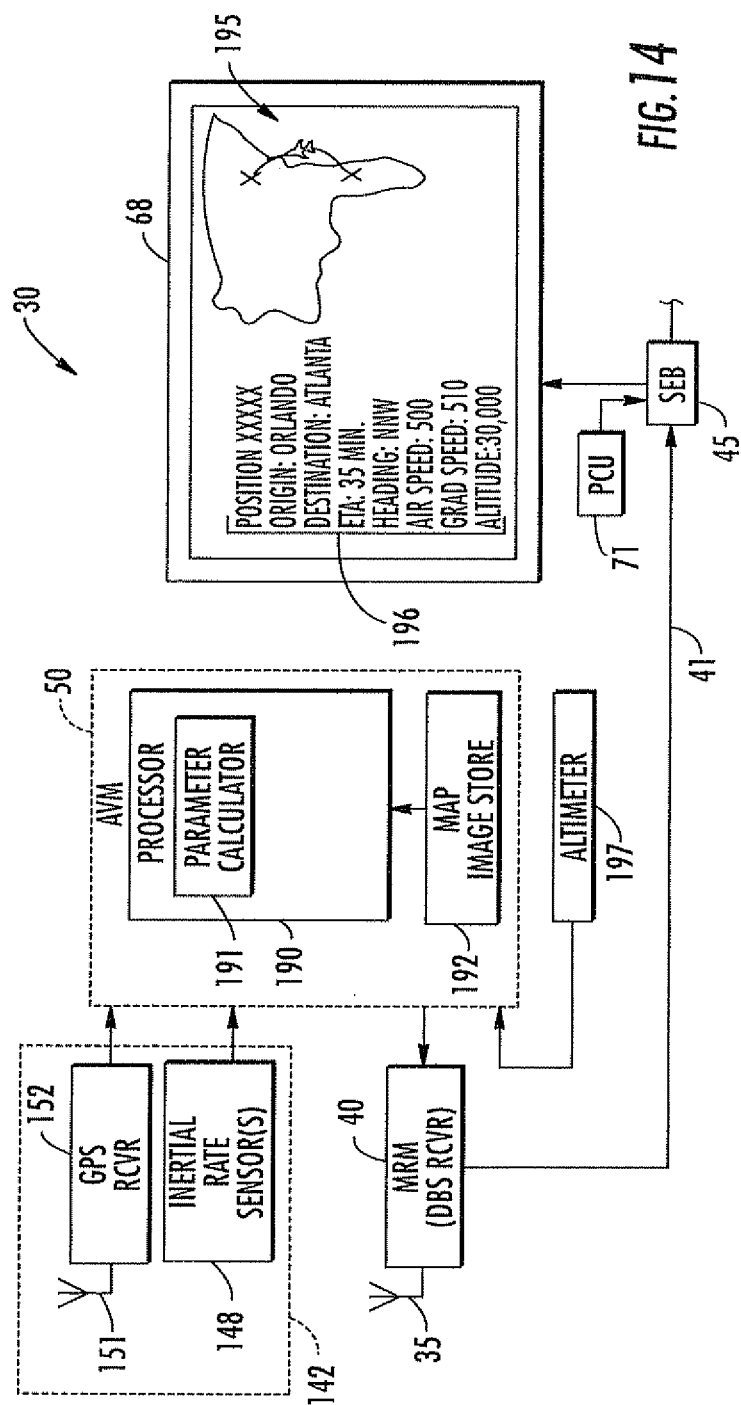
FIG. 14 is a schematic diagram of a portion of the in-flight entertainment system of the invention illustrating a moving map feature according to a first embodiment.

Yet another advantageous feature of the invention is now explained with reference to FIG. 14. Some commercial aircraft provide, on a common cabin display or overhead monitor, a simulated image of the aircraft as it moves across a map between its origin and destination. The image may also include superimposed data, such as aircraft position, speed, heading, altitude, etc. as will be appreciated by those skilled in the art.

The in-flight entertainment system 30 of the invention determines or receives the aircraft position during flight and generates a moving map image 195 of the aircraft as a flight information video channel. Various flight parameters 196 can also be displayed along with the moving map image 195. This flight information channel is offered along with the DBS programming channels during aircraft flight. In the illustrated embodiment, the passenger may select the flight information channel to be displayed on the passenger video display 68 using the passenger control unit (PCU) 71 which is typically mounted in the armrest as described above. In other words, the flight information channel is integrated along with the entertainment programming channels from the DBS system.

As shown in the illustrated embodiment, the moving map image 195 including other related text, such as the flight parameters 196, may be generated by the illustrated AVM 50 and delivered through the signal distribution network 41 to the SEB 45. Since the antenna steering controller 142 (FIG. 6) includes circuitry for determining the aircraft position, etc., these devices may be used in some embodiments for generating the moving map image as will be appreciated by those skilled in the art.

For example, the GPS receiver 152 and its antenna 151 can be used to determine the aircraft position. The GPS receiver 152 is also used to steer the antenna in this embodiment. In other embodiments a separate GPS receiver may be used as will be appreciated by those skilled in the art. As will also be appreciated by those skilled in the art, the inertial rate sensor (s) 148 of the antenna steering controller 142 may also be used in some embodiments for generating flight information.

The processor 190 illustratively includes a parameter calculator 191 for calculating the various displayed flight parameters 196 from the position signal inputs as will be appreciated by those skilled in the art. For example, the parameter calculator 191 of the processor 190 may determine at least one of an aircraft direction, aircraft speed and aircraft altitude for display with the map image. Information may also be acquired from other aircraft systems, such as an altimeter 197, for example, as will be appreciated by those skilled in the art. Also, the illustrated embodiment includes a map image storage device 192 which may include the various geographic maps used for the moving map image 195.

Weather information may also be added for display along with the moving map image 195. Further details on the generation and display of moving map images may be found in U.S. Pat. No. 5,884,219 to Curtwright et al. and U.S. Pat. No. 5,992,882 to Simpson et al., the entire disclosures of which are incorporated herein by reference.

Figure 15:
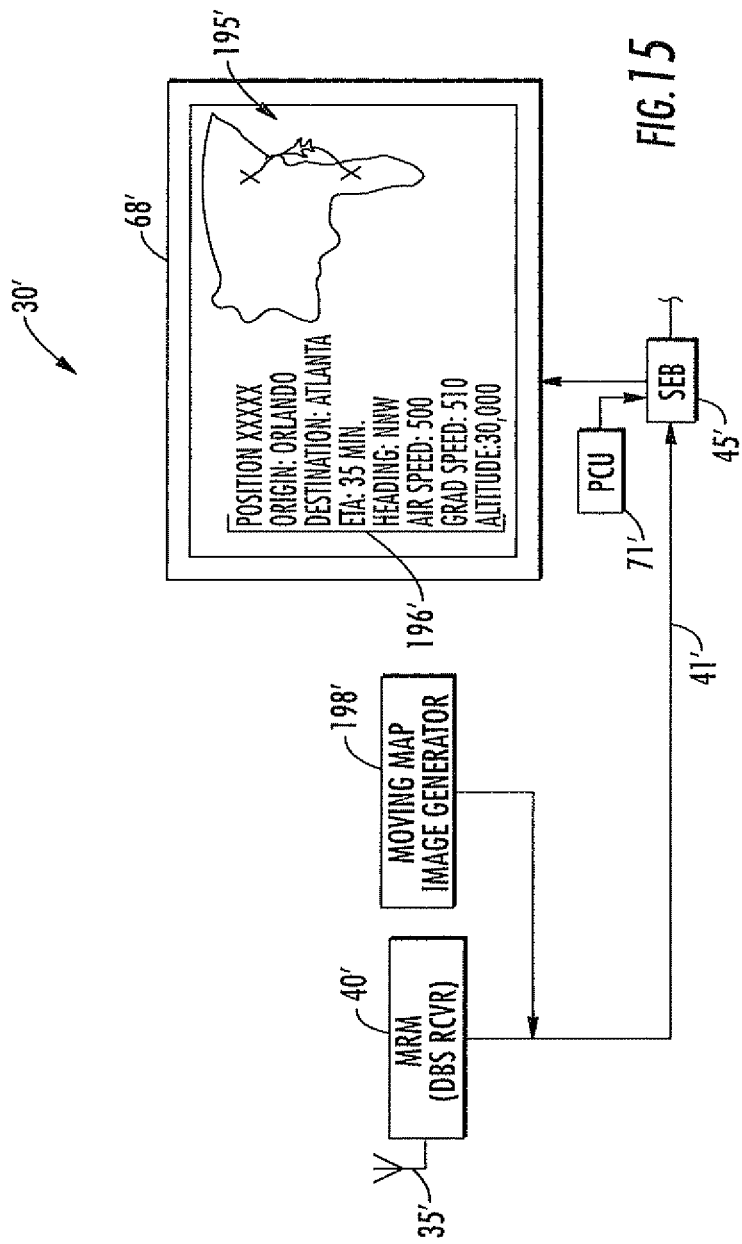
FIG. 15 is a schematic diagram of a portion of the in-flight entertainment system of the invention illustrating a moving map feature according to a second embodiment.

Referring now briefly additionally to FIG. 15, another embodiment of the system 30' including the capability to display a flight information channel among the offered DBS or satellite TV channels is now described. In this embodiment, a moving map image generator 198' is added as a separate device. In other words, in this embodiment, the flight channel signal is only carried through the distribution cable network 41' and delivered via the SEB 45' to the passenger video display 68', and there is no interface to the components of the antenna steering controller 142 as in the embodiment described with reference to FIG. 14. In this embodiment, the moving map image generator 198' may include its own position determining devices, such as a GPS receiver. Alternatively, the moving map image generator 198' may also receive the position data or even the image signal from a satellite or terrestrial transmitter.

Figure 16:
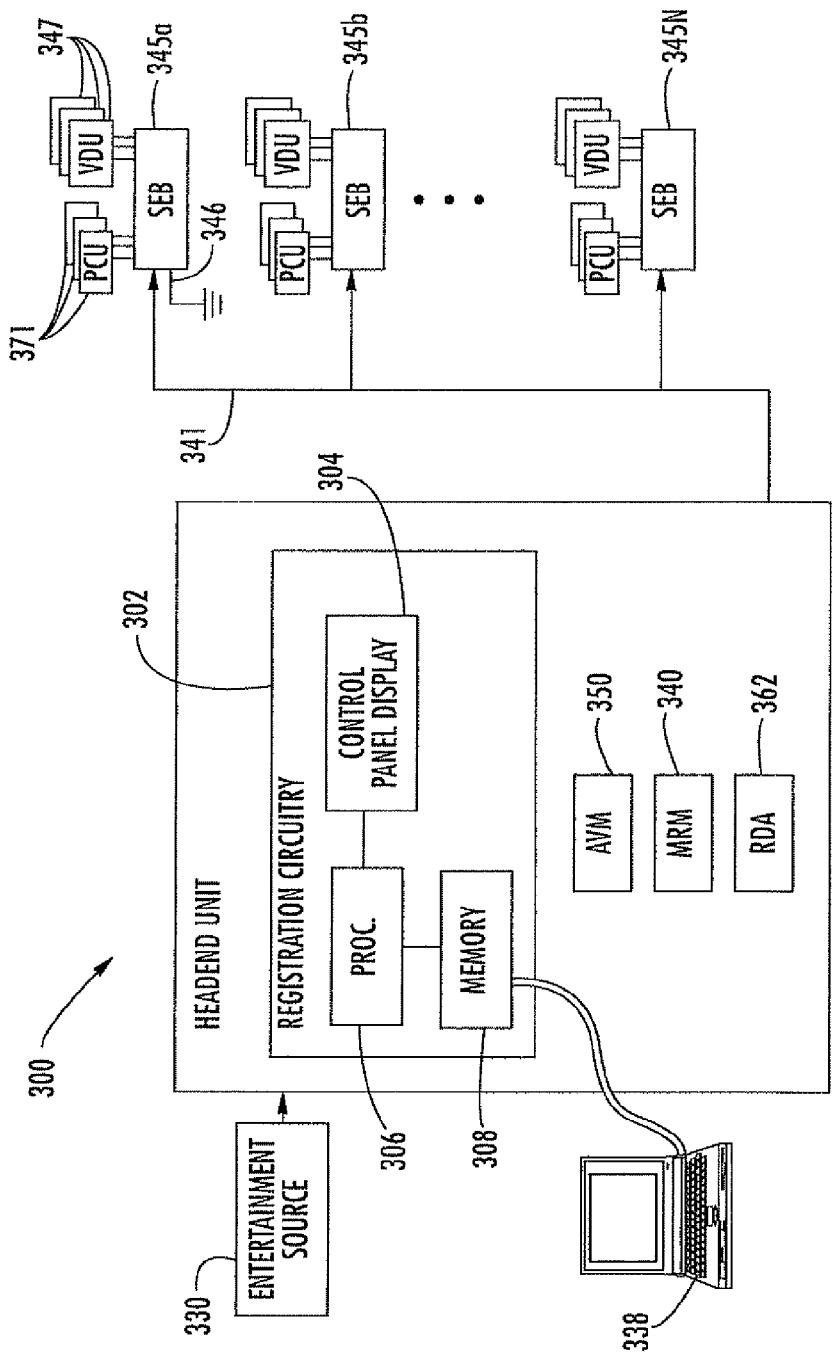
FIG. 16 is a schematic diagram of a portion of the in-flight entertainment system illustrating registration circuitry in accordance with the invention.

Another aspect of the invention relates to an in-flight entertainment (IFE) system 300 comprising registration circuitry 302 for identifying a location of each SEB 345a-345n within the aircraft, as illustrated in FIG. 16. The IFE system 300 comprises a plurality of seat electronic boxes (SEBs) 345a-345n spaced throughout the aircraft, with each SEB being configurable for passing a registration token along to an adjacent SEB. The SEBs are arranged from a first SEB 345a to a last SEB 345n. Cabling 341 connects the SEBs 345a-345n together in a daisy chain configuration. In addition, video display units (VDUs) 347 and passenger control units (PCUs) 371 for the passengers are connected to the SEBs 345a-345n. In the illustrated embodiment, each SEB supports three passengers.

The registration circuitry 302 is carried by a headend unit 320, and is connected to the cabling 341 for identifying a location of each SEB 345a-345n based upon passing of the registration token among the plurality of SEBs. The registration circuitry 302 includes a control panel display 304, a processor 306 connected to the control panel display, and a memory 308 connected to the processor.

The registration circuitry 302 may be a standalone unit, or it may be part of the other electronic equipment on-board the aircraft. For instance, the illustrated headend unit 320 may also include an audio/video modulator (AVM) 350, at least one multi-channel receiver/modulator (MRM) 340 and an RF distribution assembly (RDA) 362 as discussed above. This electronic equipment interfaces between an entertainment source 330 and the cabling 341. Instead of a standalone unit, the registration circuitry 302 may be part of the AVM 350, the MRM 340 or the RDA 362 as will be appreciated by those skilled in the art.

The processor 306 displays on the control panel display 304 the seating layout image of the aircraft with respective locations of each SEB 345a-345n, and generates information relating to registration of the SEBs. Data related to the seating layout image of the aircraft is stored in the memory 308, which may be separate from the processor 306. Alternatively, the memory 308 may be embedded within the processor 306. The corresponding seating layout data can be downloaded to the memory 308 by a suitable downloading device, such as a laptop computer 338. The locations of the SEBs 345a-345n need not be exact, but should be sufficient to communicate to the service technician where on the aircraft each registration SEB is located, i.e., on the left or right side of the passenger aisle, and the seat group and/or seat location of each registered SEB.

In the control panel display 304, the locations of the registered SEBs 345a-345n need not be constantly displayed. The location of the SEBs 345a-345n need only be displayed when registration is being performed. Information relating to registration of the SEBs 345a-345n may be in tabular form in lieu of a seating layout image of the aircraft, as will also be appreciated by those skilled in the art.

Figure 17:
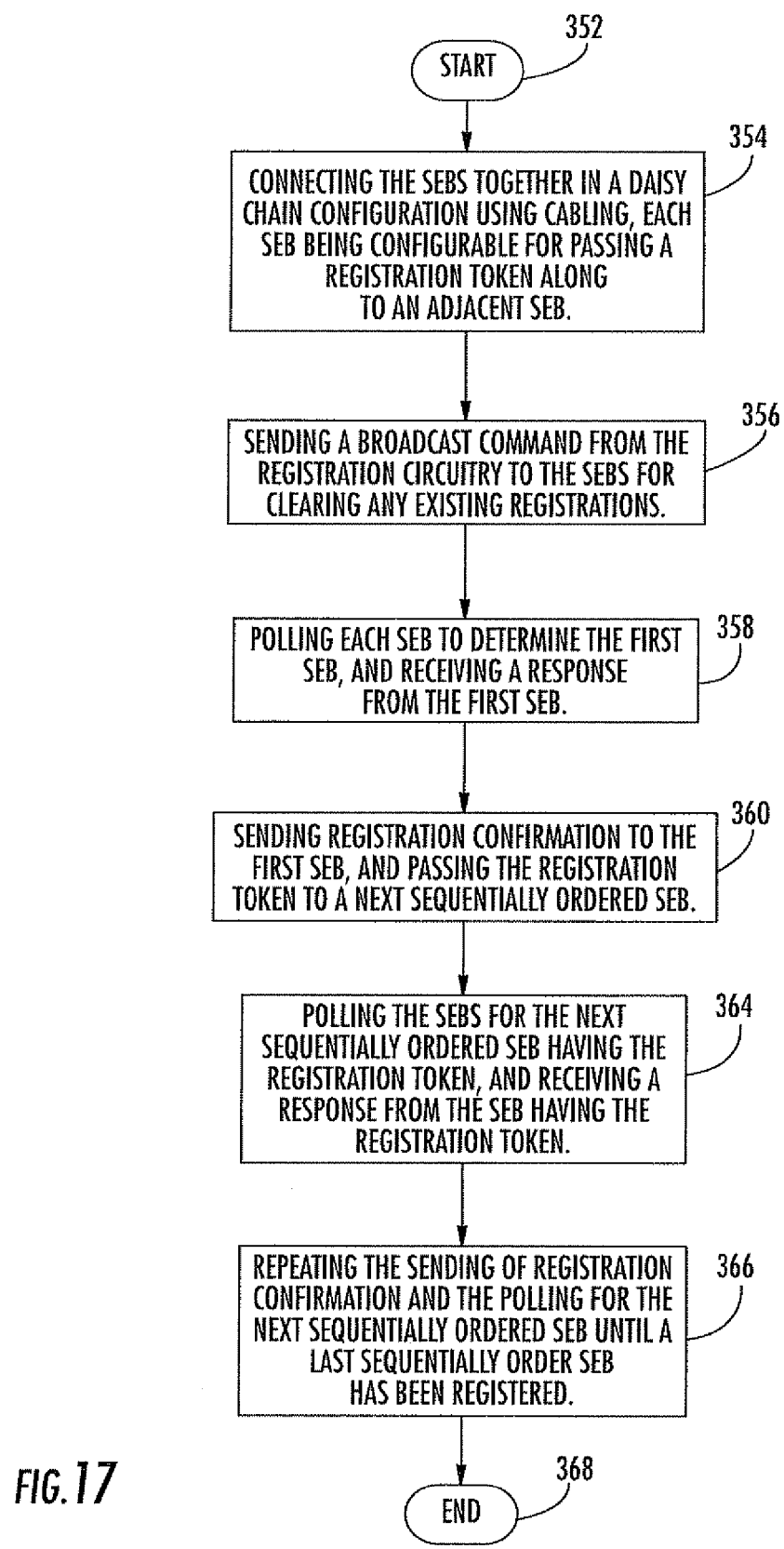
FIG. 17 is a flowchart of a method for registering seat electronic boxes for an in-flight entertainment system in accordance with the invention.

Referring now additionally to the flowchart of FIG. 17, a method for registering the plurality of SEBs 345a-345n for the aircraft IFE system 300 will be discussed. From the start (Block 352), the method initially comprises connecting the plurality of SEBs 345a-345n together in a daisy chain configuration using cabling 341 at Block 354, with each SEB being configurable for passing a registration token along to an adjacent SEE.

A broadcast command is sent at Block 356 from the registration circuitry 302 to the SEBs 345a-345n for clearing any existing registrations. The processor 306 then polls each SEE 345a-345n at Block 358 to determine the first SEB 345a, and a response is received from the first SEB. It is necessary to determine the first SEB 345a within the sequence of the SEBs as defined by the daisy chain configuration. The first SEB 345a thus becomes a known point of reference for continuing the registration process.

In other words, the processor 306 matches the known point of reference with respect to the seating layout image of the aircraft stored within the memory 308. For example, the first SEB 345a may be located in the first row on the left hand side of the passenger aisle. Alternatively, the first SEB 345a may be located in the last row on the right hand side of the passenger aisle, for example.

When the SEES 345a-345n are polled at Block 358 to determine the first SEE 345a, a serial protocol may be used. The serial protocol may be an RS-485 serial protocol, for example. Of course, other protocols may be used. For instance, an Ethernet network may be used as readily appreciated by those skilled in the art. The registration token is active within the first SEE 345a via a ground pin 346 connected to ground. The ground pin 346 may be connected to the ground associated with the cabling 341.

As part of the polling process, the registration circuitry 302 sends a broadcast "electronic registration token" request command to all of the SEBs 345a-345n. The SEB having the registration token responds with a "registration token acknowledgement" response that contains its corresponding serial number. The electronic registration token is an electronic flag that provides a way of identifying the physical location of the SEE being interrogated. When active, the electronic registration flag or token signal indicates that any SEB is the next sequentially ordered SEB in the chain to be registered by the registration circuitry 302.

Since any previous registrations of the SEBs 345a-345n have been cleared in Block 356, the first active registration token signal to be detected is associated with the first SEB, which in the illustrated example is SEE 345a. This SEB 345a is the first SEE because it is the only one with an active token signal due to its ground pin 346 being grounded to the cabling 341. The registration circuitry 302 determines the corresponding row number and aircraft side based on the fact that the location of the first SEB is predetermined.

Once the registration circuitry 302 receives a response from the first SEB 345a, the registration circuitry sends registration confirmation to the first SEB and the electronic registration token is passed to the next sequentially ordered SEB 345b in the daisy chain in the direction from the first SEB to the last SEB 345n at Block 360. At Block 364, the SEBs 345a-345n are polled for the next sequentially ordered SEB having the registration token, and a response is received from the SEB having the registration token. The sending of registration confirmation and the polling for the next sequentially ordered SEB are repeated at Block 366 until a last sequentially ordered SEE 345n has been registered. Once the last SEB 345n has been registered, the method ends at Block 368.

During the registration process, all SEBs 345a-345n without the registration token ignore the polling command, i.e., they do not respond. Registration includes adding the serial number, row number, and aircraft side of each SEB to a database stored in the memory 308. The registration circuitry 302 determines the row number and aircraft side of the responding SEB based on the known location of the first SEB 345a, and from which the responding SEB received the token signal.

As described above, a ground or selection pin 346 is used in the automatic registration sequence as a way for the registration circuitry 302 to electronically locate the first SEB 345a and begin the automatic registration sequence. The SEBs 345a-345n are typically divided into zones, with each zone including a set of SEBs. In an alternative embodiment, each set of SEBs (within a zone) has its own first SEB. Consequently, the first SEB in each zone has a plurality of pins associated therewith, and the plurality of pins are grounded to represent a distinct number for identifying a first SEB in one zone from a first SEB in a different zone. The registration token is still passed within each zone, as well as being passed from zone to zone as part of the registration process. In addition, a ground pin may be used to identify which side of the aircraft the equipment is on.

In another embodiment, the ground pin 346 may be eliminated. In this embodiment, the controls of a corresponding PCU 371 may be manually activated to allow the registration circuitry 302 to electronically locate the first SEB 345a and begin the automatic registration sequence.

As noted above, manual and semi-automated processes for registering the SEBs 345a-345n require maintenance personnel to operate the corresponding PCUs 371 in sequence during the registration process. Operation of several PCUs 371 may be a time-intensive and complex process. Registration of SEBs 345a-345n in accordance with the present invention advantageously eliminates the need for maintenance personnel to operate the PCUs 371, and thus simplifies the registration process.

As a result of the reduced time necessary for registering all of the SEBs 345a-345n, individual SEBs and other components of IFE system 300 can be repaired and/or replaced quickly during short aircraft layovers, thereby reducing the time necessary to service the IFE system. This reduced repair time helps to increase both the availability and the reliability of the IFE system 300.

Figure 18:
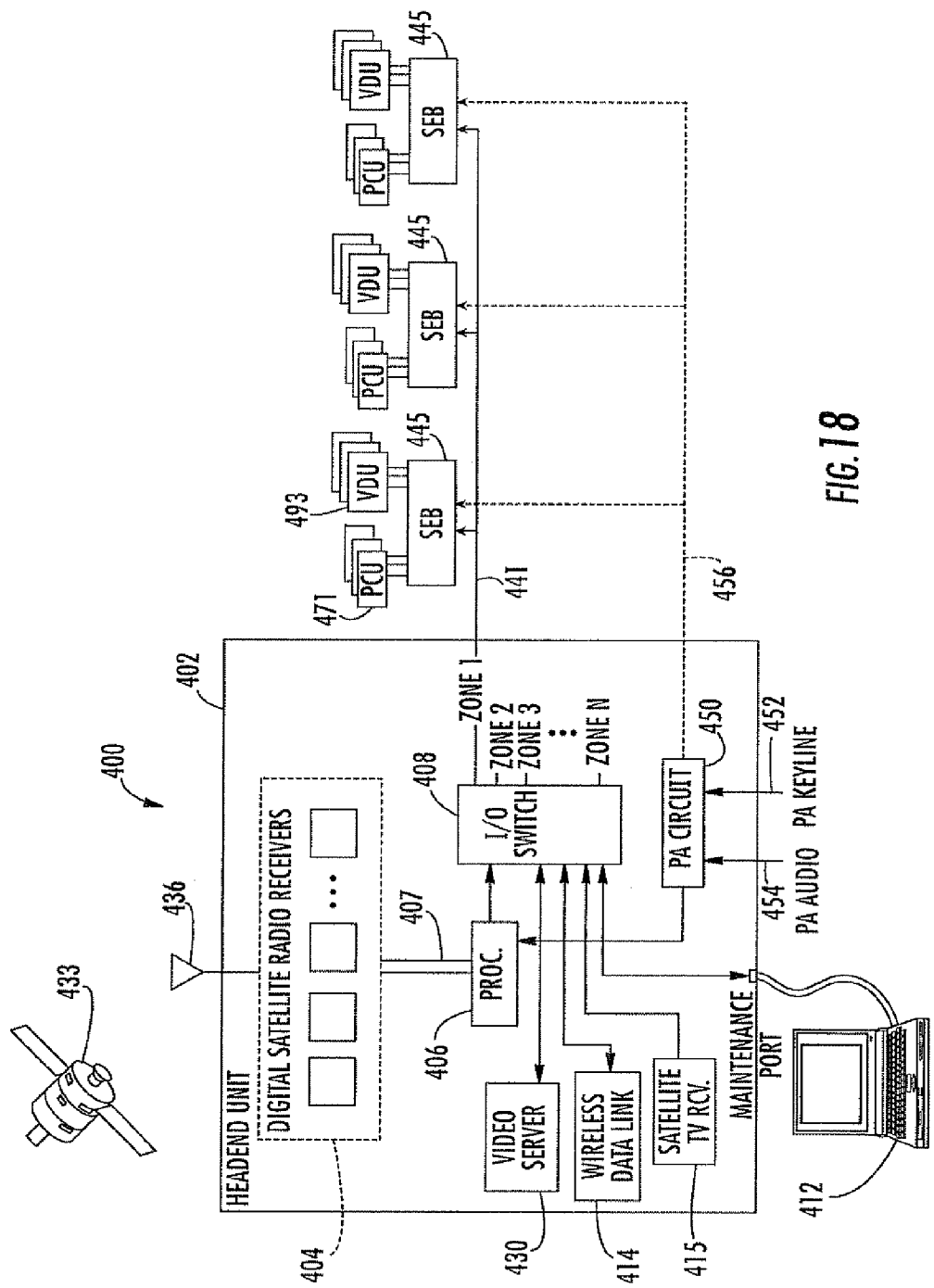
FIG. 18 is a schematic diagram of a portion of the in-flight entertainment system including digital radio receivers at the headend unit in accordance with the invention.

Turning now additionally to FIG. 18, another feature of the present invention is directed to an in-flight entertainment (IFE) system 400 receiving live audio broadcasts from a satellite 433. The IFE system 400 includes a headend unit 402 and a plurality of seat electronic boxes (SEBs) 445 spaced throughout the aircraft. The headend unit 402 comprises a plurality of digital satellite radio receivers 404. A local area network (LAN) 441 connects the digital satellite radio receivers 404 to the plurality of SEBs 445 for providing digital satellite radio signals thereto. Instead of a plurality of digital satellite radio receivers 404 in the headend unit 402, there may be one digital satellite radio receiver for providing the desired channels.

In lieu of an aircraft, the entertainment system receiving live audio broadcasts from a satellite 433 is also applicable to an area other than an aircraft. The area, which may be a building or office complex for example, may be divided into a plurality of zones and each electronic box is within a respective zone.

Figure 19:
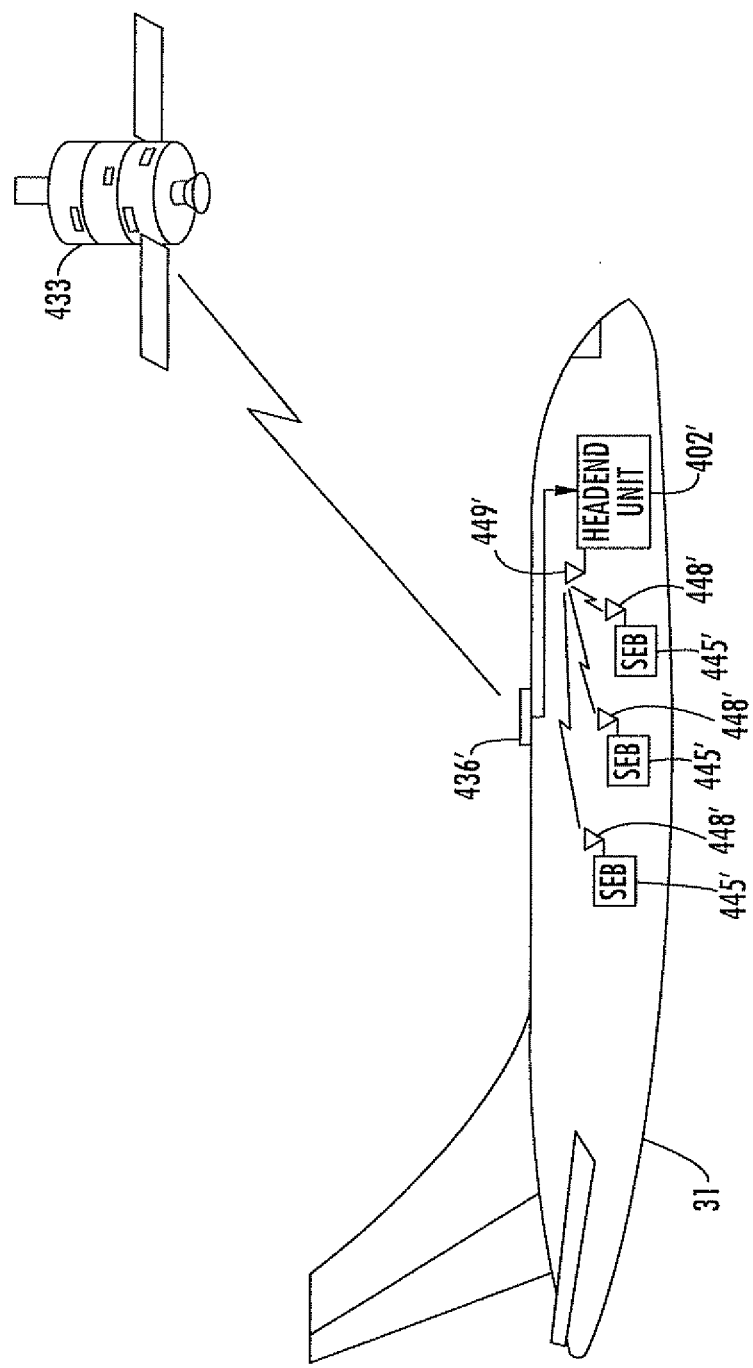
FIG. 19 is a schematic diagram of an aircraft illustrating another embodiment of the in-flight entertainment system illustrated in FIG. 18.

The LAN 441 preferably comprises an Ethernet network, which may be configured by a twisted pair wire, a coaxial cable or a fiber optic cable. The LAN 441 may be a wired LAN as illustrated, or a wireless LAN as illustrated in FIG. 19, or a combined wired/wireless interface. In the wireless LAN, the headend unit 402' includes a radio module and an antenna 449' connected thereto for providing the digital satellite radio signals to the SEBs 445'. Each SEB 445' has an antenna 448' associated therewith for receiving the digital satellite radio signals. The wireless LAN is based upon the 802.11 protocol, for example, and each SEB 445' has a different address associated therewith, as readily understood by those skilled in the art.

The digital satellite radio receivers 402 are connected to an antenna 436 receiving the digital satellite radio signals, and are compatible with at least one of a variety of digital satellite radio satellites 433, such as a Sirius radio satellite, an XM radio satellite or a WorldSpace satellite, for example. For purposes of illustrating the present invention, the XM radio satellite will be used as an example. The XM radio satellite transmits 101 channels of digital satellite radio signals within the frequency range of 2.33 to 2.34 GHz. Since each digital satellite radio receiver 404 supports 4 to 6 channels, the IFE system 400 typically comprises between 17 to 25 digital satellite radio receivers. The digital satellite radio receivers 404 may be implemented as a chip set, as readily appreciated by those skilled in the art.

The headend unit 402 further comprises a processor 406 for receiving the digital satellite radio signals from the digital satellite radio receivers 404. The digital satellite radio signals are provided to the processor 406 via a bus 407. The processor 406 outputs the digital satellite radio signals to the LAN 441.

Transmission of the digital satellite radio signals on the LAN 441 is based upon a uniform data protocol (UDP). Other protocol types may be used, but the UDP format advantageously allows the processor 406 to broadcast the digital satellite radio signals to the SEBs 445 without having to receive acknowledgments therefrom. Consequently, the headend unit 402 may be considered a dumb terminal.

In addition, the headend unit 402 further comprises a video server 430 for providing streaming video to the LAN 441. The streaming video is also based upon the UDP format. The streaming video advantageously permits passengers to view movies over the LAN 441, as will be discussed in greater detail below.

Depending on the size of the aircraft, passenger seating is preferably divided into passenger seating zones, and each SEB 445 is within a respective passenger seating zone. For example, a narrow-body aircraft may be divided into 8 passenger seating zones. To support the 8 passenger seating zones, a multi-port input/output (I/O) switch 408 interfaces between the processor 406 and the LAN 441.

The multi-port I/O switch 408 may be a 16 port switch, for example, with each port being a dual input/output (I/O) port. The output of the processor 406 providing the digital satellite radio signals is connected to one of the 16 I/O ports. Within the switch 408, the digital satellite radio signals are routed to 8 other I/O ports, with each I/O port supporting a respective passenger seating zone. If necessary, the remaining ports may be used to support additional passenger seating zones on larger aircraft.

In addition, the output of the video server 430 is also connected to a different one of the 16 I/O ports. Within the I/O switch 408, the streaming video is provided to each of the 8 I/O ports all ready receiving the digital satellite radio signals. Consequently, the LAN 441 provides both the streaming video and the digital satellite radio signals to the SEBs 445 associated therewith.

Moreover, another one of the I/O ports may be used as a maintenance port for downloading data to the IFE system 400. For example, movies may be downloaded to the video server 430 via the maintenance port. A suitable downloading device, such as the illustrated laptop computer 412, may be used. The maintenance port may also be used for uploading data from the IFE system 400, such as system diagnostic data or data associated with the video server 430. Alternatively, one of the I/O ports may be connected to a wireless data link 414, which may also be used for uploading/downloading data. The wireless data link 414 provides a wireless communications link between the IFE system 400 and a central control network on the ground. The link may use a standard 802.11 protocol or any other suitable protocol.

Figure 20:
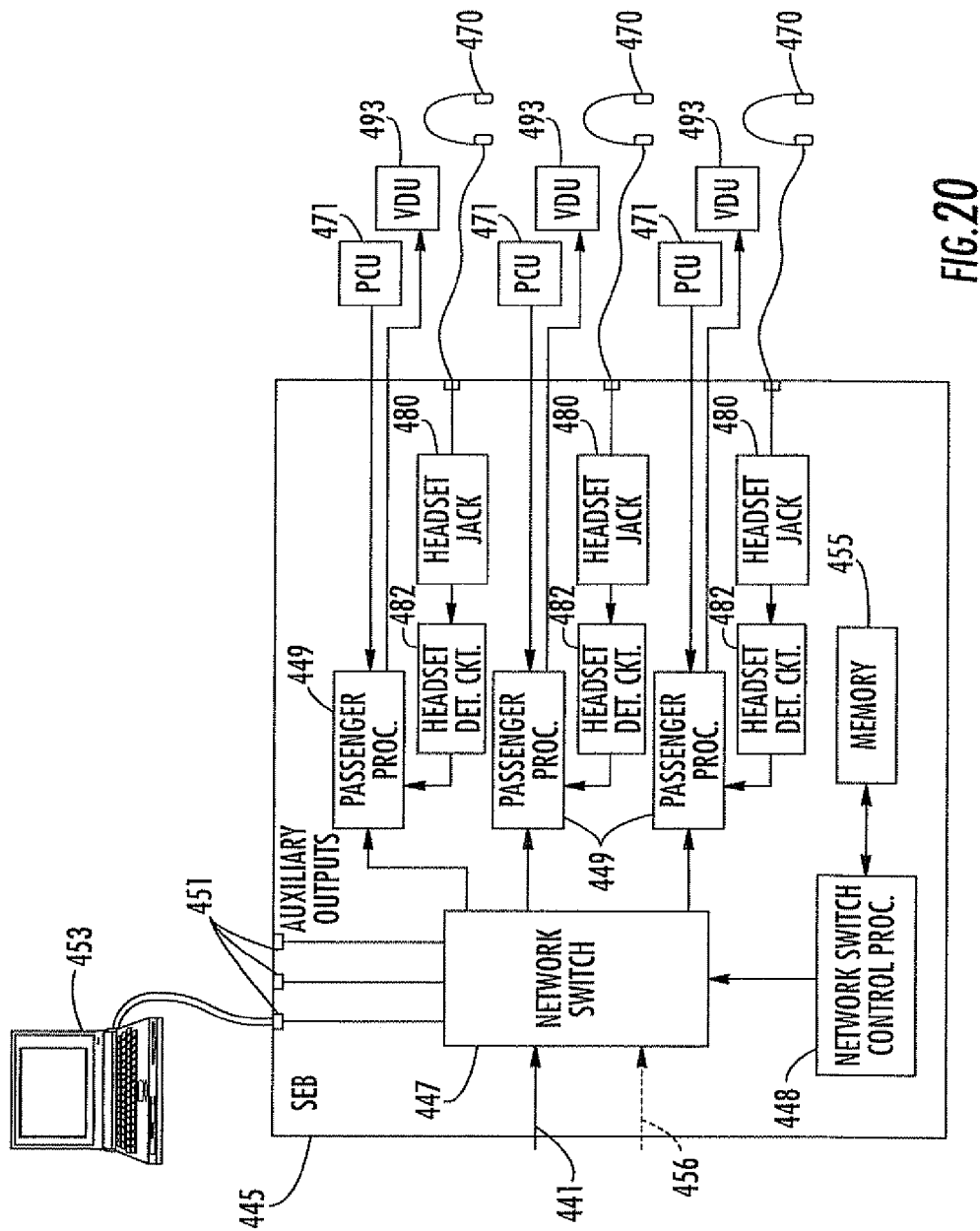
FIG. 20 is a more detailed block diagram of a seat electronic box illustrated in FIG. 18.

In the illustrated embodiment of an SEB 445 provided in FIG. 20, three passengers are supported. More passengers may be supported depending on the size of the aircraft. In particular, the SEB 445 includes a network switch 447 that interfaces with the LAN 441. The network switch 447 advantageously permits the three passengers to simultaneously access the LAN 441. Alternatively, the network switch 447 may be a router, as readily appreciated by those skilled in the art.

A network switch control processor 448 is connected to the network switch 447 for control thereof. The network switch 447 is considered a smart switch in the sense that it can prevent a passenger from "hacking" onto the LAN 441.

For instance, each passenger has the option of connecting a laptop computer 453 (for viewing the streaming video provided by the video sever 430) to an auxiliary output 451 on the SEB 445. The network switch 447 prevents a passenger from flooding the LAN 441 with an excessive amount of data resulting in the other passengers not being able to receive the digital satellite radio signals or the streaming video. The network switch 447 thus makes the IFE system 400 more secure as compared to the use of a huh or router.

In the aircraft, the auxiliary outputs 451 extend to the respective armrests of the passenger seating supported by the SEB 445. The auxiliary output 451 provides an RJ-45 connector for interfacing with the laptop computer 453. Processing of the streaming video is based upon the laptop computer 453 executing the appropriate media player software, as readily appreciated by those skilled in the art.

Since each SEB 445 supports three passengers, there are three passenger processors 449. Each passenger processor 449 is used for decoding the digital satellite radio signals. A respective passenger control unit (PCU) 471 is connected to each passenger processor 449, and permits passenger selection of the digital satellite radio signals to be decoded.

Figure 21:
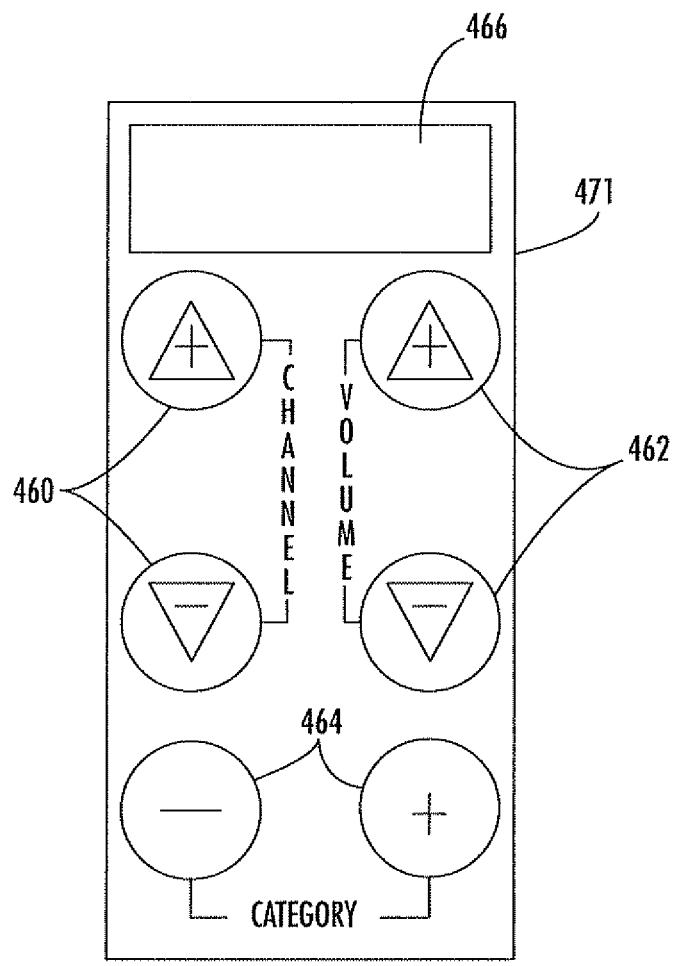
FIG. 21 is a more detailed block diagram of a passenger control unit illustrated in FIG. 18.
Figure 22:
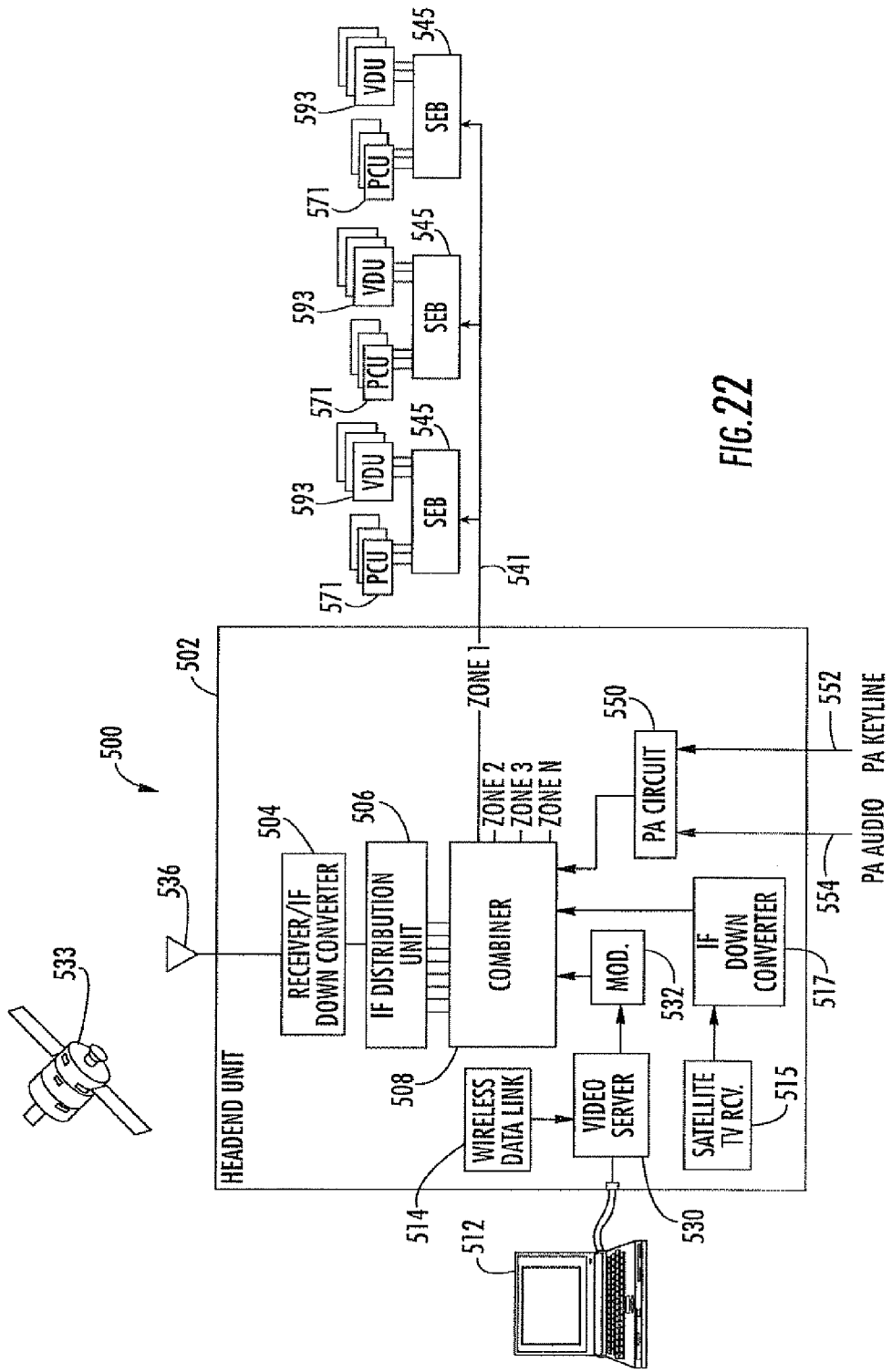
FIG. 22 is a schematic diagram of a portion of the in-flight entertainment system including digital radio receivers at the seat electronic boxes in accordance with the invention.

Each PCU 471 includes a set of control buttons, such as channel select buttons 460, volume select buttons 462 and category select buttons 464, as illustrated in FIG. 21. The PCU 471 also includes an alpha-numeric display 466 for displaying a limited amount of text to the passenger. The display 466 may be an LCD, for example.

The category select buttons 464 allow the passenger to scroll up or down through all available music categories provided by the digital satellite radio satellite 433. These categories relate known entertainment categories such as rock, news, jazz, classical, country or decades. Text relating to these categories is displayed to the passenger via the LCD 466. Alternatively, text may be displayed on a video display unit (VDU) 493 or on a laptop computer 453 connected to an auxiliary output 451.

Once the passenger selects a category, multiple channels relating to the selected category are provided from which the passenger may choose via the channel select buttons 460. The channel select buttons 460 allow the passenger to scroll up or down through all available audio channels. The volume select buttons 462 allow the passenger to adjust the volume at the headset 470. In the aircraft, the headset jacks 480 extend to the respective armrests of the passenger seating supported by the SEB 445.

As noted above, the LCD 466 displays a limited amount of text that is initially transmitted as part of the digital satellite radio signals. Additional or supplemental data may be stored in a memory 455 within each SEB 445. This supplemental data is used to provide enhanced graphics for certain audio channels. For example, if the passenger selects via the PCU 471 a sporting event, such as a football game, then the supplemental data may be a football field showing the names of the two teams in their respective end zones. A football icon may also be displayed on the football field to illustrate who has the ball, and what yard line they are on. In addition, player statistics are provided, and these statistics are updated as the game progresses.

To display the supplemental graphical data, a video display unit (VDU) 493 other than the display 466 of the PCU 471 may be used. In this embodiment of the invention, each passenger has a respective seatback video display unit 493 in front of them. The video display unit 493 is also connected to the passenger processor 449 (along with the corresponding PCU 471) in the SEB 445.

The IFE system 400 may also include other entertainment sources. For example, the IFE system 400 may include a satellite television (TV) receiver 415 for generating a plurality of TV programming channels. Additional electronic equipment may be necessary for providing the TV programming channels to the LAN 441, as readily understood by those skilled in the art.

Each SEB 445 also comprises a headphone detection circuit 482 connected to a corresponding headphone jack 480 and to a respective passenger processor 449. The headphone detection circuit 482 sets an audio volume of the digital satellite radio signals to a predefined level when removal of the headphones 470 has been detected. This feature of the invention advantageously prevents a new passenger from damaging their hearing when first listening to the digital satellite radio signals if a previous passenger had the volume turned up to loud. In addition, the headphone detection circuit 482 may be used to detect a failure of the headphones 470.

The headend unit 402 further comprises a public address (PA) circuit 450 so that the pilot and/or the flight attendants can address the passengers. The PA circuit 450 has a keyline input 452 for activating the PA circuit, and an audio input 454. The PA circuit 450 is connected to the processor 406. When addressing the passengers, it is necessary for the PA circuit 450 to mute the audio signals being output to the SEBs 445. Consequently, the audio signals are muted within the I/O switch 408 in response to the keyline input 452 being selected.

The audio output from the PA circuit 450 is provided to the SEBs via a path 456 that is separate from the LAN 441. This configuration requires the passengers to have their headphones 470 plugged-in. Alternatively, the separate path may be connected to an overhead cabin speaker system instead of to the SEBs 445. Yet another approach for providing the audio to the passengers is to transmit the audio over the LAN 441.

The digital satellite radio signals may also be organized into channel maps defining available audio channels to be selected by each respective PCU 471. In other words, channel maps may be used to block certain channels. For instance, selected premium channels may be blocked until a payment is made by the passenger. The desired channel maps may be downloaded to the IFE system 400 via the maintenance port of the I/O switch 408 in the headend unit 402. The memory 455 in each SEB 445 stores the channel maps.

The above discussion of the IFE system 400 receiving live audio broadcasts from a satellite 433 is based upon the digital satellite radio receivers 404 being collocated in the headend unit 402. Another embodiment of the IFE system 500 will now be discussed with reference to FIGS. 24-26. This particular embodiment is based upon the digital satellite radio receivers 502 being located in the SEBs 545. In other words, the digital satellite radio signals are down converted to a baseband signal at the SEBs 545 instead of at the headend unit 502.

The IFE system 500 comprises an antenna 536 for receiving the digital satellite radio signals, a receiver/intermediate frequency (IF) down converter 504 is connected to the antenna 536 for down converting the digital satellite radio signals to an intermediate frequency, and a plurality of SEBs 545 are spaced throughout the aircraft. Each SEB 545 comprises at least one IF tuner 520. Cabling 541 connects the receiver/IF down converter 504 to the plurality of SEBs 545 for providing the digital satellite radio signals at the intermediate frequency to each IF tuner 520. The cabling 541 comprises a coaxial cable, for example.

For purposes of illustrating this embodiment of the invention, the antenna 536 receives the digital satellite radio signals from an XM radio satellite 533 within the frequency range of 2.33 to 2.34 GHz. The digital satellite radio signals are passed to a first stage RF receiver, i.e., the receiver/IF down converter 504, for outputting the digital satellite radio signals at an IF of 2.0 MHz, for example. The digital satellite radio signals at the 2.0 MHz IF are passed to an IF distribution unit 506.

The aircraft is divided into passenger seating zones and each IF tuner 520 is within a respective passenger seating zone. The IF distribution unit 506 includes a plurality of outputs for outputting the digital satellite radio signals at the 2.0 MHz IF to the IF tuners 520 within a respective passenger seating zone. The IF distribution unit 506 also amplifiers the digital satellite radio signals for maintaining acceptable signal strength.

The illustrated IFE system 500 also includes a video server 530 for providing video channels. The output of the video server 530 is connected to a modulator 532 for modulating the video channels to an intermediate frequency for transmission over the cabling 541. In lieu of the video server 530 or in addition to it, a satellite TV receiver 515 may be included to receive live TV programming channels. The output of the satellite TV receiver 515 is also connected to an IF down converter 517 so that the programming channels can be transmitted over the cabling 541.

A combiner 508 is used for sending the digital satellite radio signals, the video channels and the programming channels over the cabling 541. The combiner 508 has a first input for receiving the digital satellite radio signals at the intermediate frequency from the IF distribution unit 506, and a second input for receiving the video channels from the video server 530, and a third input for receiving the programming channels from the satellite TV receiver 515. The combiner 508 has a plurality of outputs connected to the cabling 541 associated with the different passenger seating zones.

To down load movies to the video server 530, a suitable downloading device, such as the illustrated laptop computer 512, may be used. The laptop computer 512 may also be used for uploading data from the IFE system 500, such as system diagnostic data or data associated with the video server 530. Alternatively, a wireless data link 514 may also be used for uploading/downloading data.

The headend unit 502 further comprises a public address (PA) circuit 550 so that the pilot and/or the flight attendants can address the passengers. The PA circuit 550 has a PA keyline input 552 for activating the PA circuit, and a PA audio input 554. The PA circuit 550 is connected to the combiner 508. When addressing the passengers, it is necessary for the PA circuit 550 to mute the audio signals being output to the SEBs 545. The audio output from the PA circuit 550 may be provided to the SEBs 545 via the cabling 541 or via a separate path, such as an overhead speaker system, for example.

Figure 23:
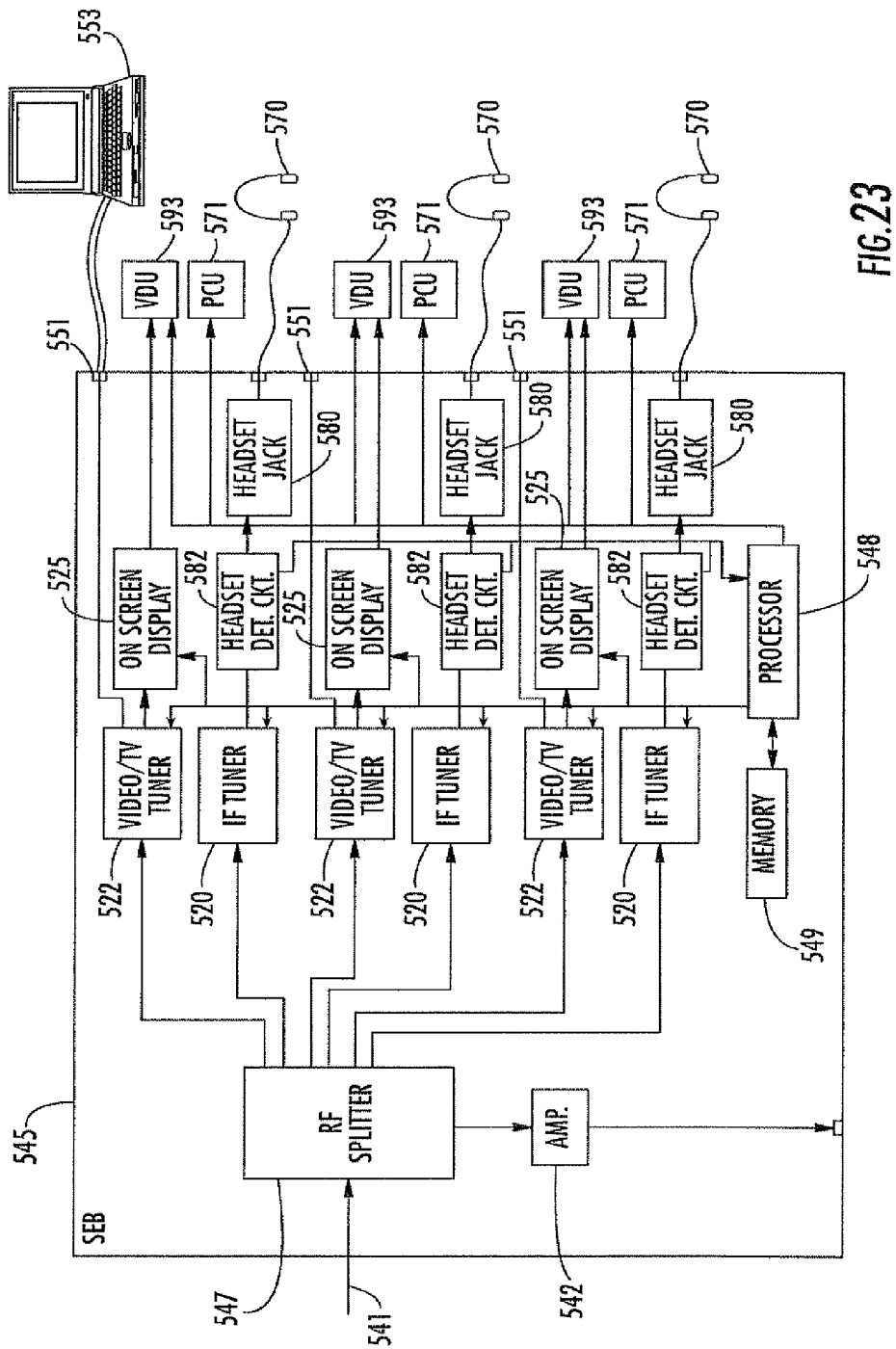
FIG. 23 is a more detailed block diagram of the seat electronic box illustrated in FIG. 22.

In the illustrated embodiment of an SEB 545 provided in FIG. 23, the SEB supports three passengers. In particular, the SEB 545 includes an RF splitter 547 connected to the cabling 541. The illustrated RF splitter 547 includes 7 outputs. Of the 7 outputs, 3 outputs provide the video channels/programming channels to the respective video/TV tuners 522, and 3 outputs provide the digital satellite radio signals at the 2.0 MHz IF to the respective IF tuners 520.

The remaining output of the splitter 547 provides the combined video/programming channels and digital satellite radio signals at the 2.0 MHz IF (i.e., they are not split) to an amplifier 542. The amplifier 542 amplifies the signals before passing them to an RF splitter 547 in an adjacent SEB 545 within the same passenger seating zone. Alternatively, each RF splitter 547 may be directly connected to the cabling 541.

A video display unit (VDU) 593 is connected to each video/TV tuner 522. The VDU 593 may be a seatback video display unit 493 in front of the passenger. A respective on-screen display device 525 is between each video/TV tuner 522 and a corresponding VDU 593. The on-screen display device 525 is under the control of the processor 548 in the SEB 545, and generates text messages so that they may appear on the corresponding VDU 593. The text messages may be generated by each on-screen display device 525 in lieu of the output of the video/TV tuner 522 or may be overlaid upon the output of the associated tuner.

The processor 548 handles communication to and tuning of the video/TV tuners 522 and the IF tuners 520. The processor 548 also handles operation of the control buttons on the PCUs 571 and the output text to the VDUs 593 via the on-screen display units 525. A memory 549 is connected to each processor 548, and serves as a local storage for information specifically relating to its associated SEB 545. This information may include hardware status information pertaining to each specific PCU 571 and VDU 593 connected to the processor 548, and the channel map generated by the headend unit 502.

Each PCU 571 is a dual use device because it can operate in a video mode for controlling the video/TV tuner 522 and in an audio mode for controlling the IF tuner 520. Each SEB 545 also comprises at least one auxiliary output 551 for providing the video channels to at least one external display. The external display may be a laptop computer 553, for example.

The output of each IF tuner 520 performs a D/A conversion for converting the digital output of the tuners to an analog signal suitable for driving a standard headset 570. There is a corresponding headphone detection circuit 582 connected between an IF tuner 520 and its associated headset jack 580. The headphone detection circuit 582 allows the processor 548 to set an audio volume of the audio signals to a predefined level when removal of the headphones 570 has been detected.

Figure 24:
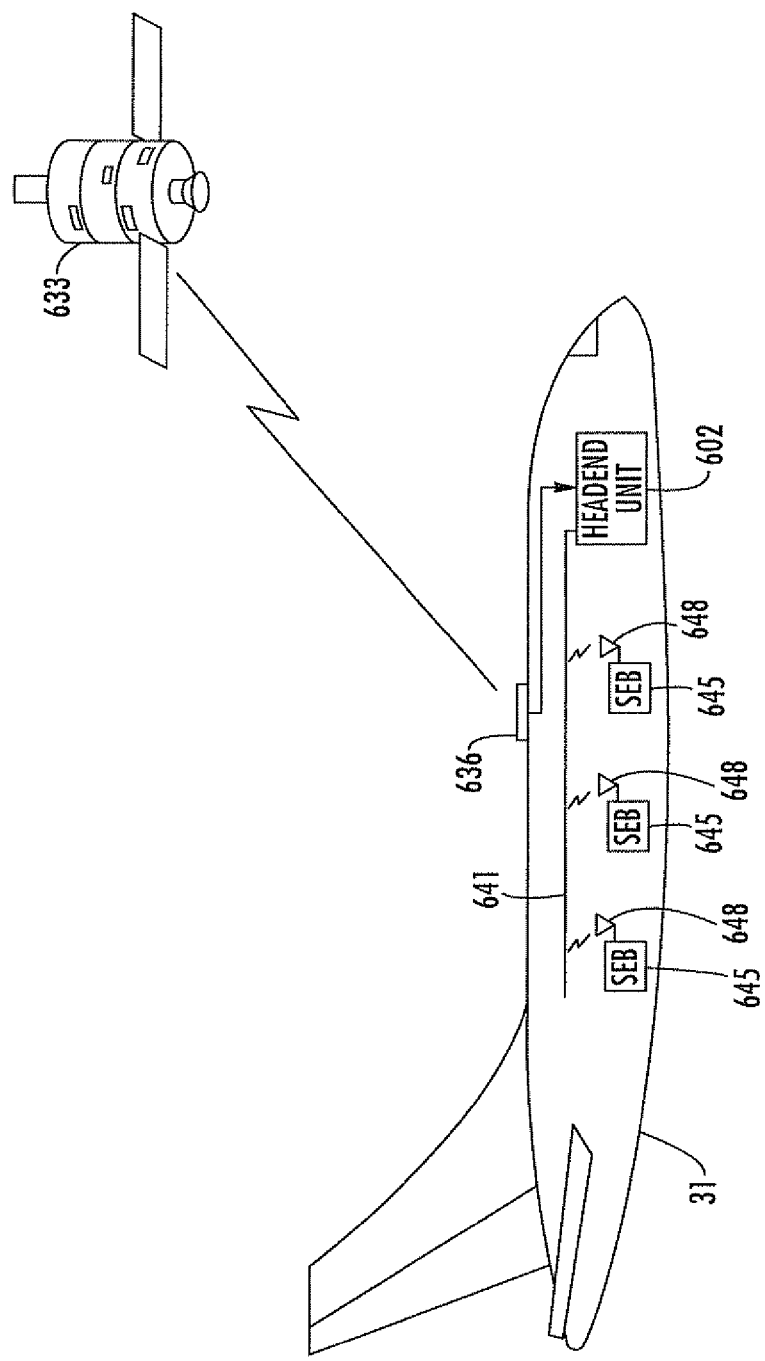
FIG. 24 is a schematic diagram of an aircraft illustrating another embodiment of the in-flight entertainment system illustrated in FIG. 22.
Figure 25:
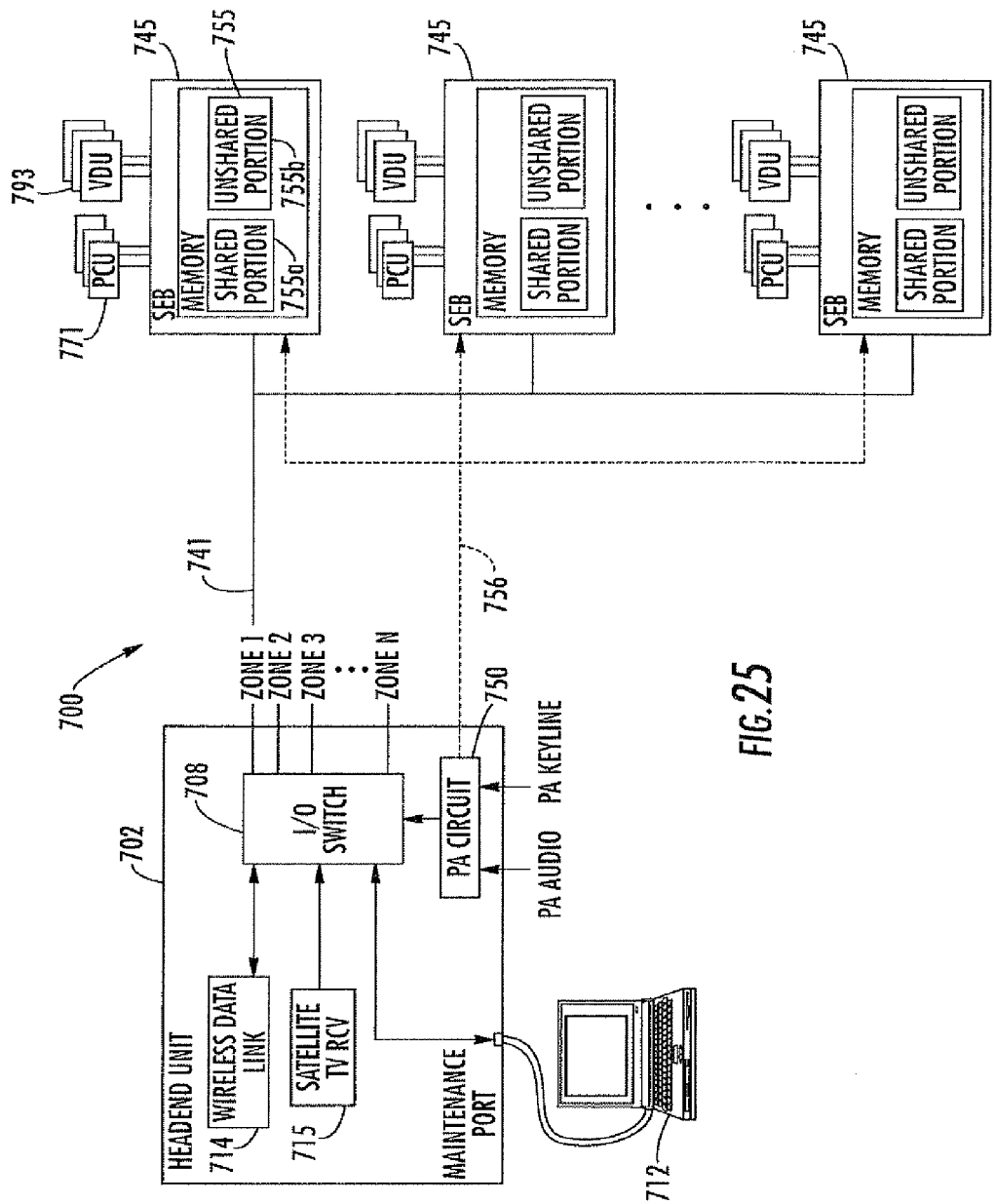
FIG. 25 is a schematic diagram of a portion of the in-flight entertainment system illustrating a distributed memory in accordance with the invention.

Referring now to FIG. 24, another embodiment of the digital satellite radio receivers being located in the SEBs will be discussed. The headend unit 602 is connected to an antenna 636 for receiving the digital satellite radio signals from an XM radio satellite 633. Instead of transmitting the digital satellite radio signals at the intermediate frequency being transmitted over a cable connected to the SEBs 645, a leaky coaxial cable 641 is used. A leaky coaxial cable 641 is slotted on its outer conductor for allowing functioning as a signal transmission line and antenna of electromagnetic waves, as readily understood by those skilled in the art.

The leaky coaxial cable 641 is connected to the output of the combiner and extends through the aircraft 31. Each SEB 645 has an antenna 648 connected thereto for receiving transmissions from the leaky coaxial cable 641. Depending on the bandwidth of the signals that can be transmitted from the leaky coaxial cable 641 to the respective SEBs 645, the video channels/programming channels may also be provided via the leaky coaxial cable 641. Alternatively, the combiner 508 may be connected to an RF module and a corresponding antenna(s) for providing the entertainment related data to the SEBs 545 as readily understood by those skilled in the art.

Figure 27:
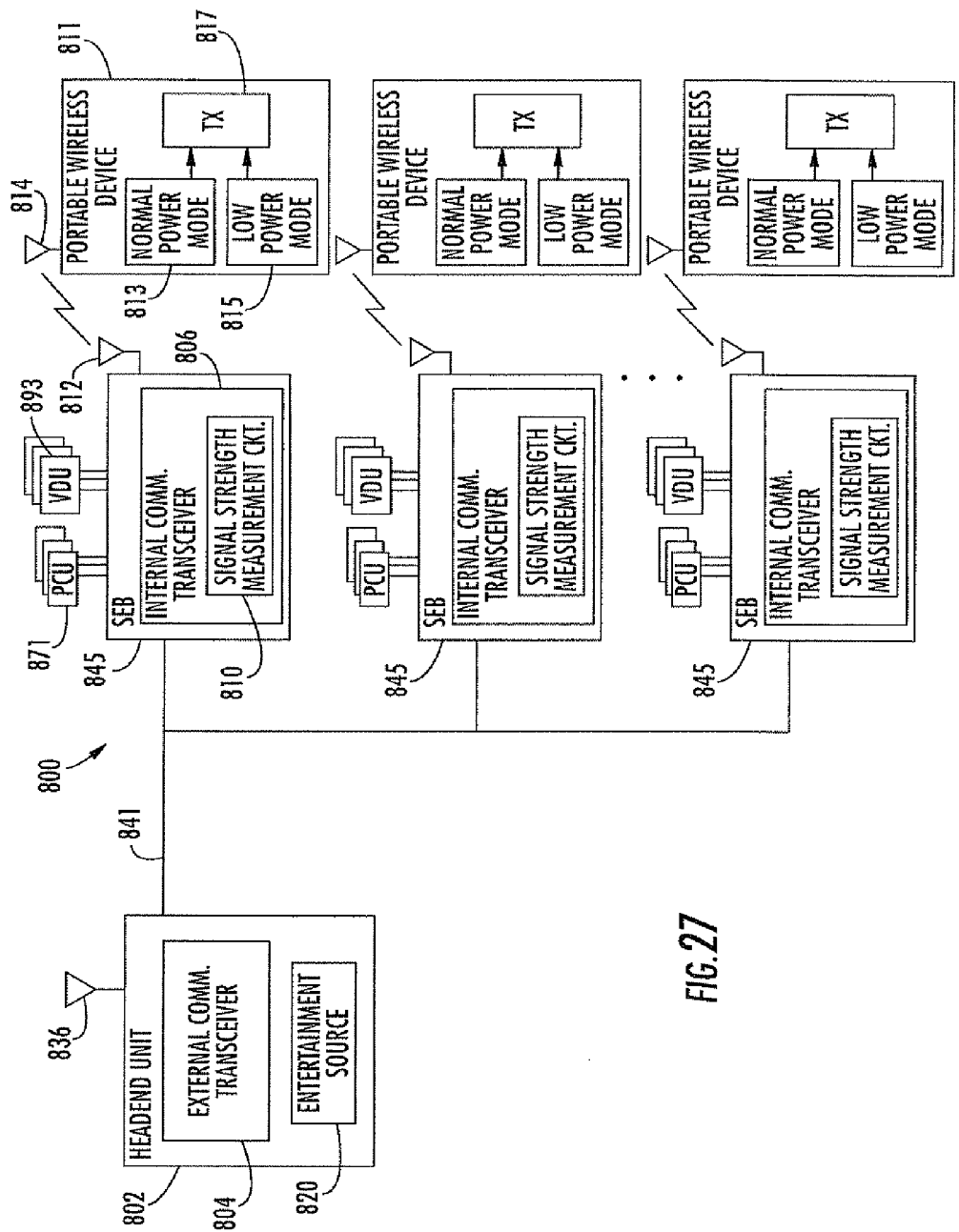
FIG. 27 is a schematic block diagram of a portion of the in-flight entertainment system illustrating operation of a portable wireless device with an aircraft in-flight entertainment system in accordance with the invention.
Figure 28:
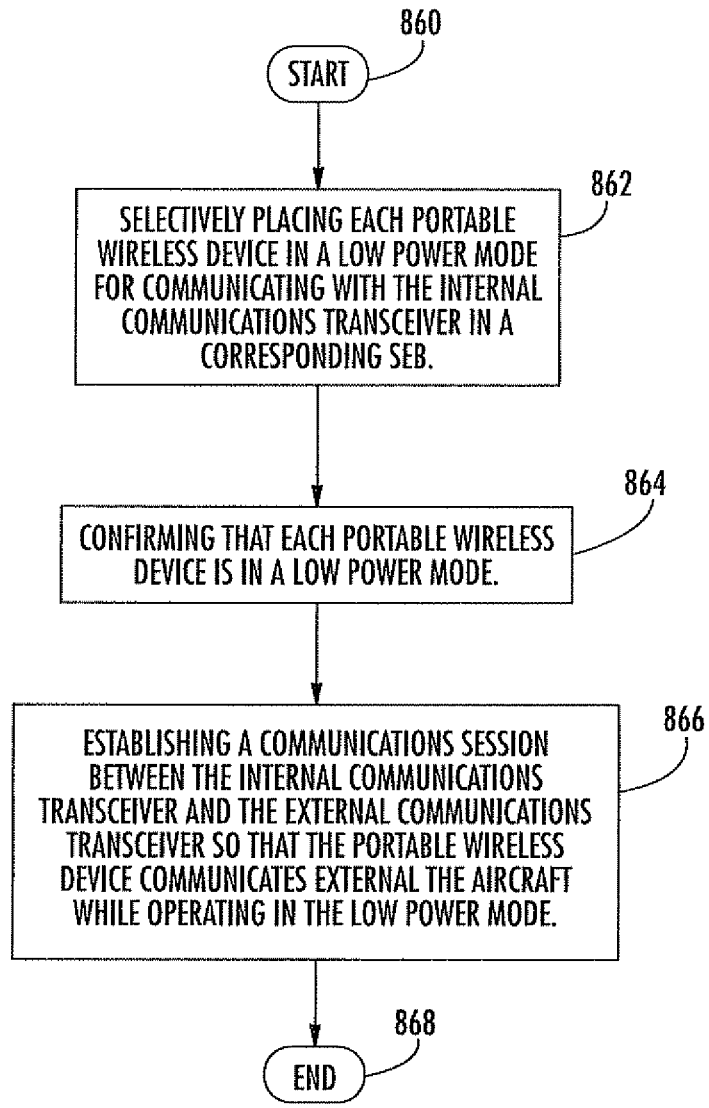
FIG. 28 is a flowchart of a method for operating a portable wireless device with an aircraft in-flight entertainment system in accordance with the invention.

Another feature of the present invention is directed to an in-flight entertainment (IFE) system where available space is limited and weight is a concern, as is typical for narrow-body aircraft. Referring now to FIGS. 27 and 28, an aircraft IFE system 700 comprising a plurality of SEBs 745 are spaced throughout the aircraft, with each SEB comprising a memory 755 including a shared memory portion 755a for storing entertainment related data and an unshared memory portion 755b. Cabling 741 connects the plurality of SEBs 745 together so that the entertainment related data in the shared memory portion 755a of each SEB 745 is available for at least one other SEB.

The cabling 741 connects the plurality of SEBs 745 together in a daisy chain configuration. The shared memory portion 755a of each SEB 745 may be connected together in a local area network (LAN). The LAN may comprise an Ethernet network, which may be configured by a twisted pair wire, a coaxial cable or a fiber optic cable.

The entertainment related data includes a plurality of video programming channels and music (i.e., MP3 files), for example. Instead of having a video server in the headend unit 702 storing the entertainment related data, the data is advantageously stored throughout the aircraft in the shared memory portions 755a in each SEB 745.

The entertainment related data in each shared memory portion 755a may comprise at least a portion of a video program and/or a plurality of MP3 files. In other words, each video program may be a different movie, for example, and a size of the shared memory portion 755a in each SEB 745 may not be sufficient to store the entire movie. Consequently, the movie is divided into sections, and each section is stored in a different SEB 745. Depending on the size of the shared memory portions 755a, 3 to 6 movies may be stored throughout the SEBs 745. When a passenger selects a particular video program, retrieval of the different sections of the movie is transparent to the passenger.

The shared memory portions 755a in each of the SEBs 745 advantageously provides entertainment related data to the passengers without requiring a dedicated video server. Such a video server would increase the weight of the aircraft, and moreover, would require installation space that may not be available in the headend unit 702.

In fact, one embodiment of the IFE system 700 may be provided without a headend unit 702. In this particular embodiment, one of the SEBs 745 would function as a master SEB, and the entertainment related data would be loaded through this master SEB to the other SEBs.

The size of the memory 755 varies depending on the amount of entertainment related data being stored. For instance, if the entertainment related data includes 3 to 6 movies, a size of the shared memory portion 755a may be 100 Mb, for example. The unshared memory portion 755b is sized to store data specific to its SEB 745. Examples of specific data include graphics to be displayed, and an operating system associated with the entertainment related data being shared as network files. An example size of the unshared memory portion 755b is 30 Mb. Moreover, the shared and unshared memory portions 755a, 755b may be configured as separate memories or as a single memory as readily appreciated by those skilled in the art.

In another embodiment of the IFE system 700, the IFE system may include a headend unit 702. The headend unit 702 includes an input/output (I/O) switch 708 connected to the cabling 741. The I/O switch 708 includes a maintenance port for downloading the entertainment related data to the IFE system 700. A suitable downloading device, such as the illustrated laptop computer 712, may be used. The maintenance port may also be used for uploading data from the IFE system 700, such as system diagnostic data. Alternatively, one of the I/O ports may be connected to a wireless data link 714, which may also be used for uploading/downloading data. The wireless data link 714 provides a wireless communications link between the IFE system 700 and a central control network on the ground. The link may use a standard 802.11 protocol or any other suitable protocol.

Figure 26:
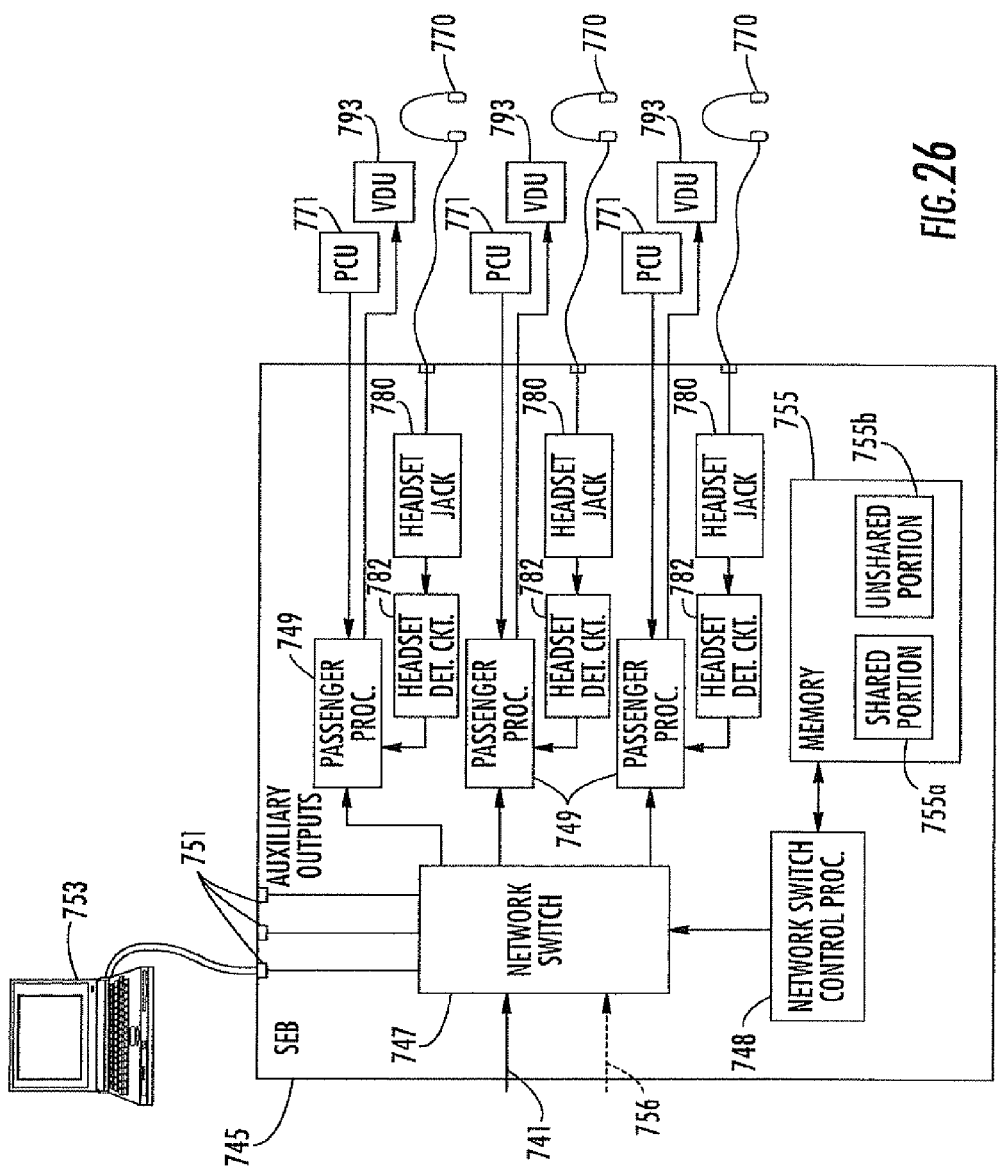
FIG. 26 is a more detailed block diagram of the seat electronic box illustrated in FIG. 25.

In the illustrated embodiment of an SEB 745 provided in FIG. 26, three passengers are supported. More passengers may be supported depending on the size of the aircraft. In particular, the SEB 745 includes a network switch 747 that interfaces with the cabling 741. The network switch 747 advantageously permits the three passengers to simultaneously access the entertainment related data.

A network switch control processor 748 is connected to the network switch 747 for control thereof. The network switch 747 is considered a smart switch in the sense that it can prevent a passenger from "hacking" onto the LAN 741. The memory 755 is connected to the network switch control processor 748.

Each passenger has the option of connecting a laptop computer 753 to an auxiliary output 751 on the SEB 745 for viewing the video programming channels. The network switch 747 prevents a passenger from flooding the LAN 741 with an excessive amount of data resulting in the other passengers not being able to receive the video programming channels. The network switch 747 thus makes the IFE system 700 more secure as compared to the use of a hub or router.

In the aircraft, the auxiliary outputs 751 extend to the respective armrests of the passenger seating supported by the SEB 745. The auxiliary output 751 provides an RJ-45 connector for interfacing with the laptop computer 753. Processing of the video programming channels is based upon the laptop computer 753 executing the appropriate media player software, as readily appreciated by those skilled in the art.

Since each SEE 745 supports three passengers, there are three passenger processors 749. Each passenger processor 749 is used for decoding the video programming channels. A respective passenger control unit (PCU) 771 is connected to each passenger processor 749, and permits passenger selection of the entertainment related data to be decoded.

Each PCU 771 includes a set of control buttons, such as channel select buttons and volume select buttons. The PCU 771 may also include an alpha-numeric display for displaying a limited amount of text to the passenger. The display may be an LCD, for example. Volume select buttons allow the passenger to adjust the volume at the headset 770. In the aircraft, the headset jacks 780 extend to the respective armrests of the passenger seating supported by the SEE 745.

The IFE system 700 may also include other entertainment sources. For example, the illustrated IFE system 700 includes a satellite television (TV) receiver 715 for generating a plurality of TV programming channels. Consequently, other electronic equipment (not shown) is necessary for providing the programming channels to the cabling 741, as readily understood by those skilled in the art.

Each SEE 745 also comprises a headphone detection circuit 782 connected to a corresponding headphone jack 780 and to a respective passenger processor 749. The headphone detection circuit 782 sets an audio volume of the entertainment related data to a predefined level when removal of the headphones 770 has been detected.

The headend unit 702 further comprises a public address (PA) circuit 750 so that the pilot and/or the flight attendants can address the passengers. The PA circuit 750 has a PA keyline input 752 for activating the PA circuit, and a PA audio input 754. The PA circuit 750 is connected to one of the ports of the I/O switch 708. When addressing the passengers, it is necessary for the PA circuit 750 to mute the audio signals being output to the SEBs 745. Consequently, the audio signals are muted within the I/O switch 708 in response to the PA keyline input 752 being selected.

The audio output from the PA circuit 750 is provided to the SEBs 745 via a path 756 that is separate from the cabling 741. Alternatively, the separate path may be connected to an overhead cabin speaker system instead of to the SEBs 745. Yet another approach for providing the audio to the passengers is to transmit the audio over the cabling 741.

Figure 29:
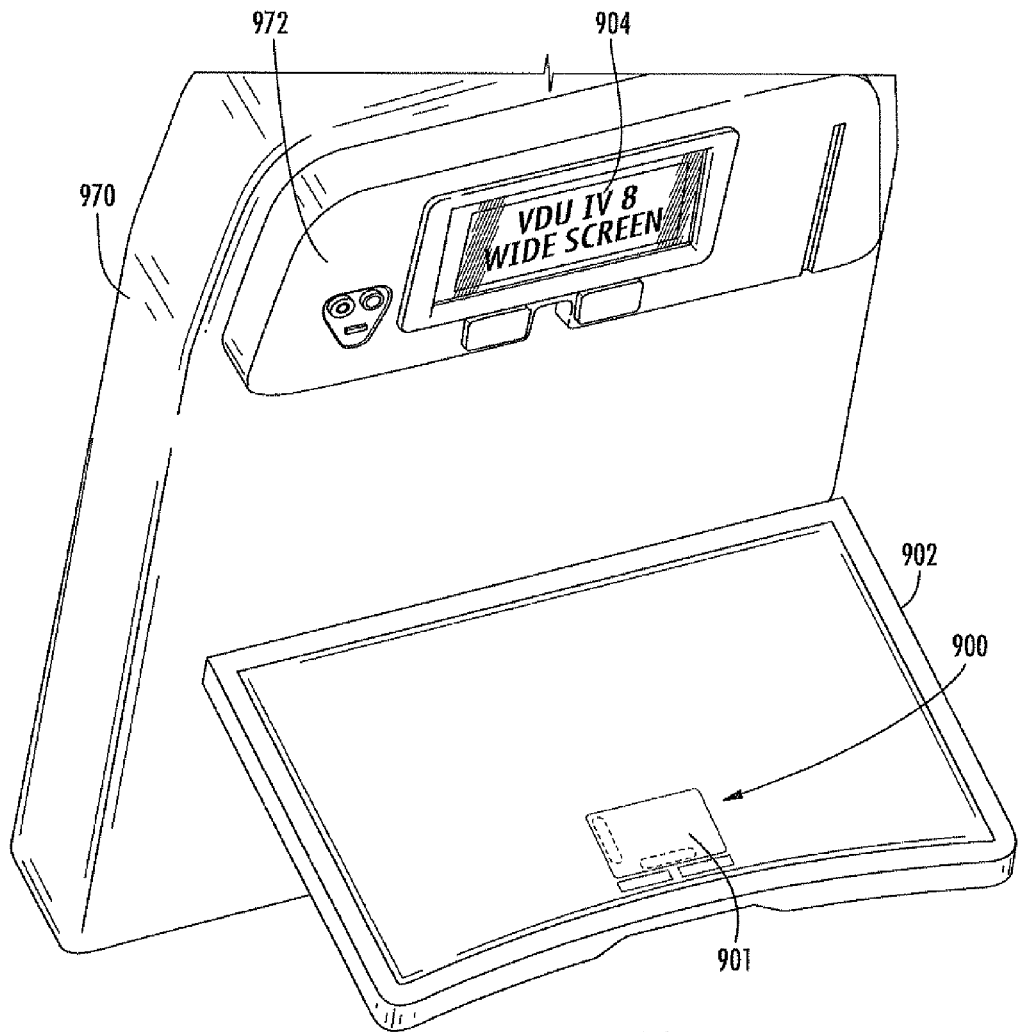
FIG. 29 is a perspective view of a touchpad PCU input device integrated on the topside the seatback tray in accordance with the present invention.
Figure 30:
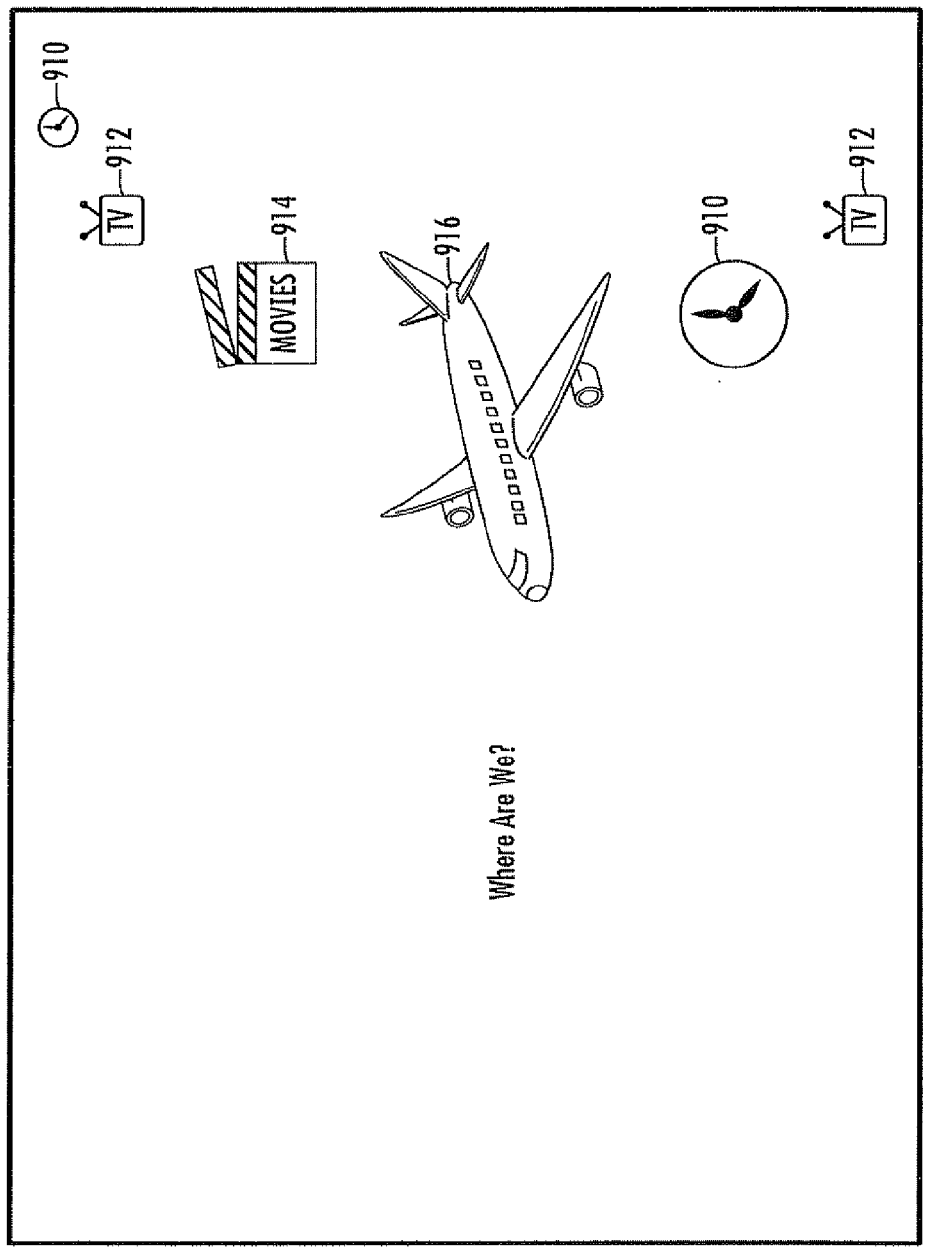
FIGS. 30-33 are displays on the VDU illustrating the available categories for passenger selection in accordance with the present invention.
Figure 31:
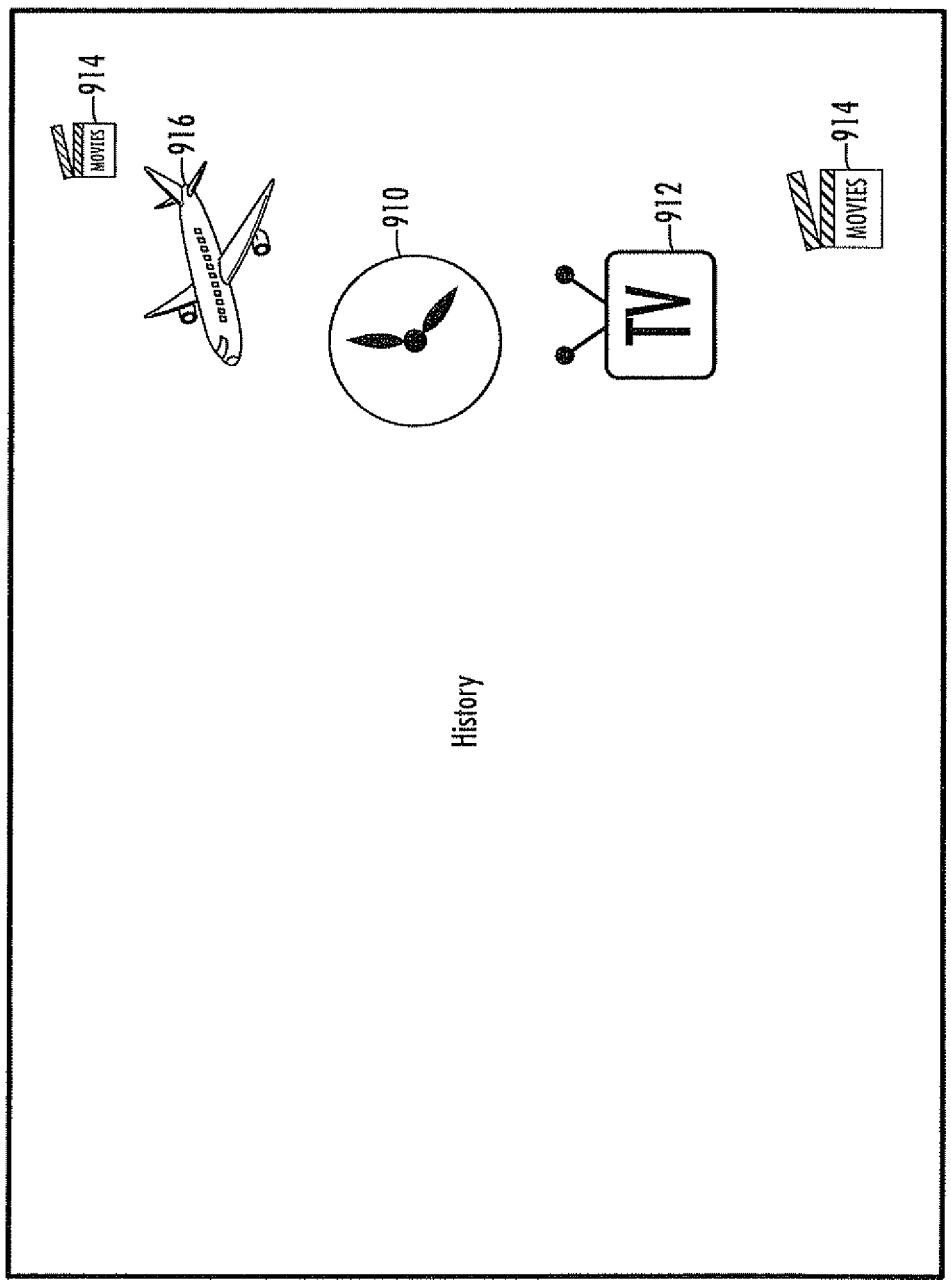
Figure 32:
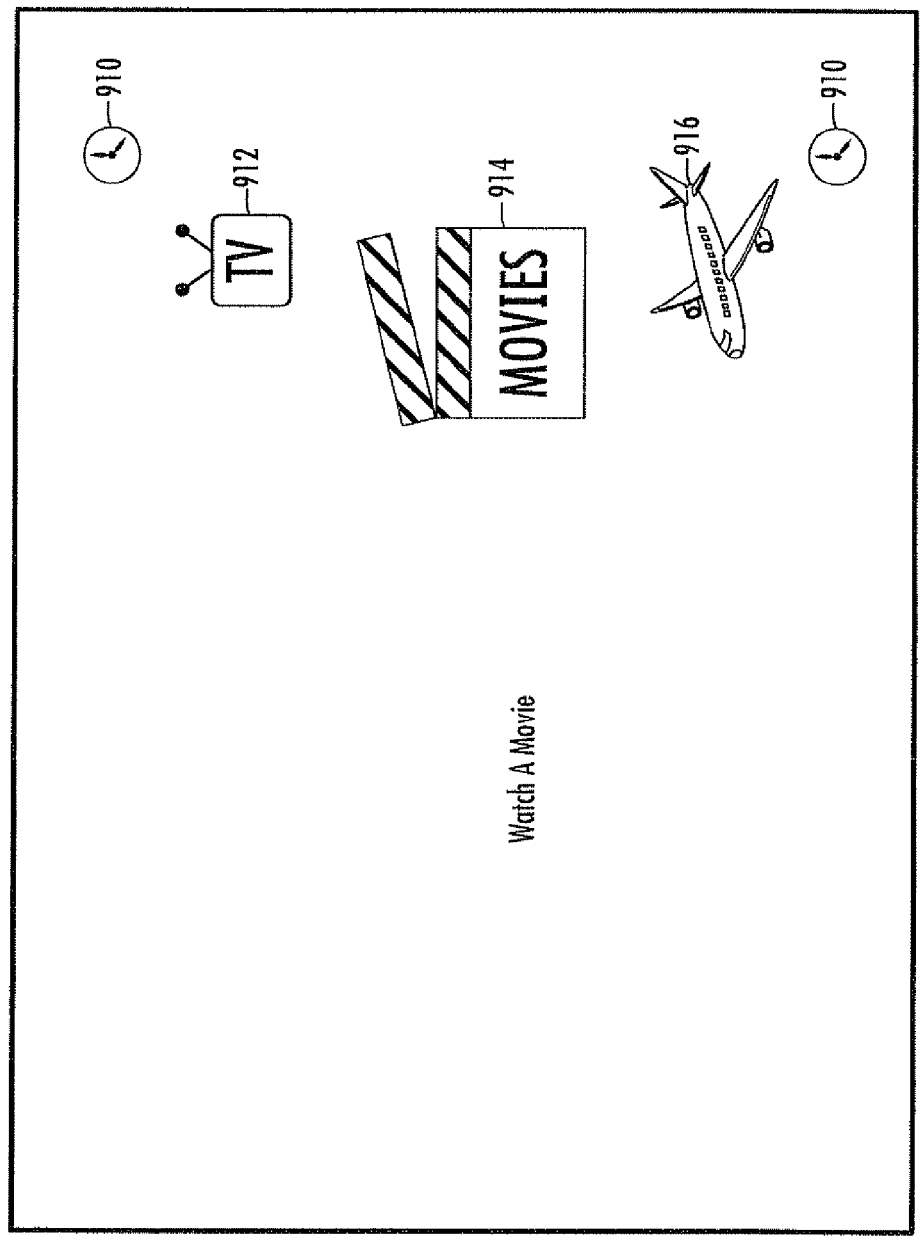
Figure 33:
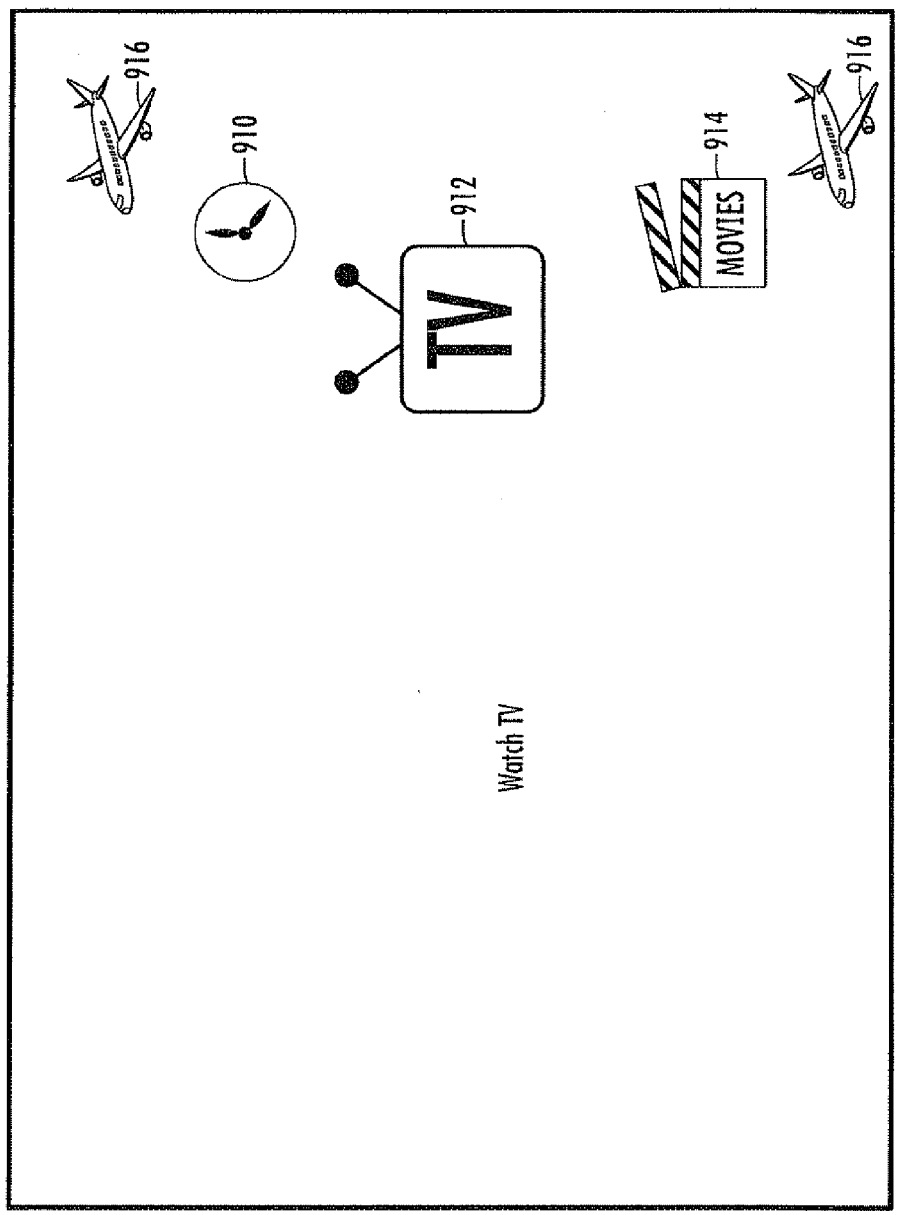

Referring now to FIGS. 29 and 30, yet another feature of the present invention is directed to an in-flight entertainment (IFE) system 800 in which portable wireless devices 811 are permitted to operate while the aircraft is in flight. Portable wireless devices 811 include cellular telephones, pagers and personal data assistants that receive e-mail messages, for example. The cellular telephones may operate according to GSM, TDMA, CDMA, FDMA, AMPS or other standard or proprietary communications protocol.

The aircraft IFE system 800 comprises an antenna 836, an external communications transceiver 804 connected to the antenna for communicating external the aircraft, and a plurality of seat electronic boxes (SEBs) 845 spaced throughout the aircraft. At least one of the SEBs 845 comprises an internal communications transceiver 806 for communicating with a portable wireless device 811 carried by a passenger.

Each portable wireless device 811 is selectively operable in a normal power mode and a low power mode, with the low power mode being selected for communicating with the internal communications transceiver 806. Cabling 841 connects the external communications transceiver 804 to the plurality of SEBs 845 so that the portable wireless devices 811 communicate external the aircraft while operating in the low power mode.

The low power mode of each portable wireless device 811 may be selected by the passenger, or by the internal communications transceiver 806. The illustrated portable wireless devices 811 include a normal power mode module 813 and a low power mode module 815 for controlling the transmit power of the transmitter 817. For example, the transmit power for a cellular telephone operating in a normal power mode may be 600 watts, whereas the transmit power for a cellular telephone operating in a low power mode may be 200 watts. Of course, the actual transmit power in the low power mode will be selected ahead of time so that operation of the cellular telephone will not interfere with the aircraft electronics.

The internal communications transceiver 806 in each SEB 845 may be considered an access point, and is able to communicate with more than one portable wireless device 811 at a same time. Communications between the external communications transceiver 804 and the internal communications transceiver 806 is based upon the Ethernet. Wireless communications between the internal communications transceiver 806 and the portable wireless device 811 is based upon the 802.11 protocol, whereas the wired communications between the external and internal communications transceivers 804, 806 is based upon the 802.3 protocol. Of course, other acceptable protocols may be used, as readily appreciated by those skilled in the art. For instance, the internal communications transceiver 806 may comprise an infrared transceiver for communicating with the portable wireless device 811.

Each internal communications transceiver 806 is connected to an antenna 812. Likewise, each portable wireless device 811 includes an antenna 814. The internal communications transceiver 806 communications with each portable wireless device 811 based upon a temporary address. To establish a communications channel with a portable wireless device 811, the internal communications transceiver 806 may broadcast a low power mode signal for placing any portable wireless devices 811 within range in the low power mode. This broadcast may be continuous or intermittent throughout the flight.

If the portable wireless devices 811 cannot be placed in the low power mode, then the internal communications transceiver 806 will not establish communications with the portable wireless device 811. Confirmation that the portable wireless device 811 is operating in the low power mode may be confirmed by the internal communications transceiver 806 or confirmation may be provided by the portable wireless device 811 itself.

The internal communications transceiver 806 includes a signal strength measurement circuit 810 for measuring the strength of the signals transmitted from a portable wireless device 811 operating in close proximity. Even if the portable wireless device 811 provides confirmation that it is operating in the low power mode, the signal strength measurement circuit 810 may still measure the strength of the transmitted signal as a precaution to insure that the aircraft electronics will not be affected. This measurement may be periodically performed throughout the communications session.

The illustrated external communications transceiver 804 is carried by a headend unit 802. The headend unit 802 further carries an entertainment source 820 connected to the cabling 841 for providing entertainment related data to the passengers. If the entertainment related data is in a digital format, then the same cabling 841 is used. Otherwise, a separate cable is necessary if the entertainment related data is in an analog format. At least one video display unit (VDU) 893 is connected to each SEB 845, and a respective passenger control unit (PCU) 871 is associated with each of the VDUs. The entertainment source 820 may comprise a direct broadcast satellite (DBS) receiver, a terrestrial television (TV) receiver, or a satellite radio receiver for receiving radio signals, for example.

As readily appreciated by those skilled in the art, the present invention may also be directed to an aircraft communication system that does not provide entertainment related data. In other words, such an aircraft communications system comprises an antenna 836, and an external communications transceiver 804 connected to the antenna for communicating external the aircraft. At least one internal communications transceiver 806 establishes a communications link between the external communications transceiver 804 and a portable wireless device 811 carried by a passenger internal to the aircraft. In this embodiment, the internal communications transceiver 806 commands the portable wireless device 811 into a low power mode.

A method for operating portable wireless devices 811 with an aircraft IFE system 800 is provided by the flow chart illustrated in FIG. 28. As discussed above, each portable wireless device is selectively operable in a normal power mode and a low power mode. The IFE system comprises an antenna 836, an external communications transceiver 804 connected to the antenna for communicating external the aircraft, and a plurality of SEBs 845 spaced throughout the aircraft. Each SEE 845 comprises an internal communications transceiver 806, and cabling 841 connecting the external communications transceiver 804 to the plurality of SEBs.

From the start (Block 860), the method comprises selectively placing each portable wireless device 811 in the low power mode in Block 862 for communicating with the internal communications transceiver 806 in a corresponding SEB 845. The internal communications transceiver 806 confirms that the portable wireless device 811 is in the low power mode at Block 864. A communications session is established over the cabling 841 at Block 866 between the internal communications transceiver 806 and the external communications transceiver 804 so that the portable wireless device 811 communicates external the aircraft while operating in the low power mode. The method ends at Block 868.

Figure 38:
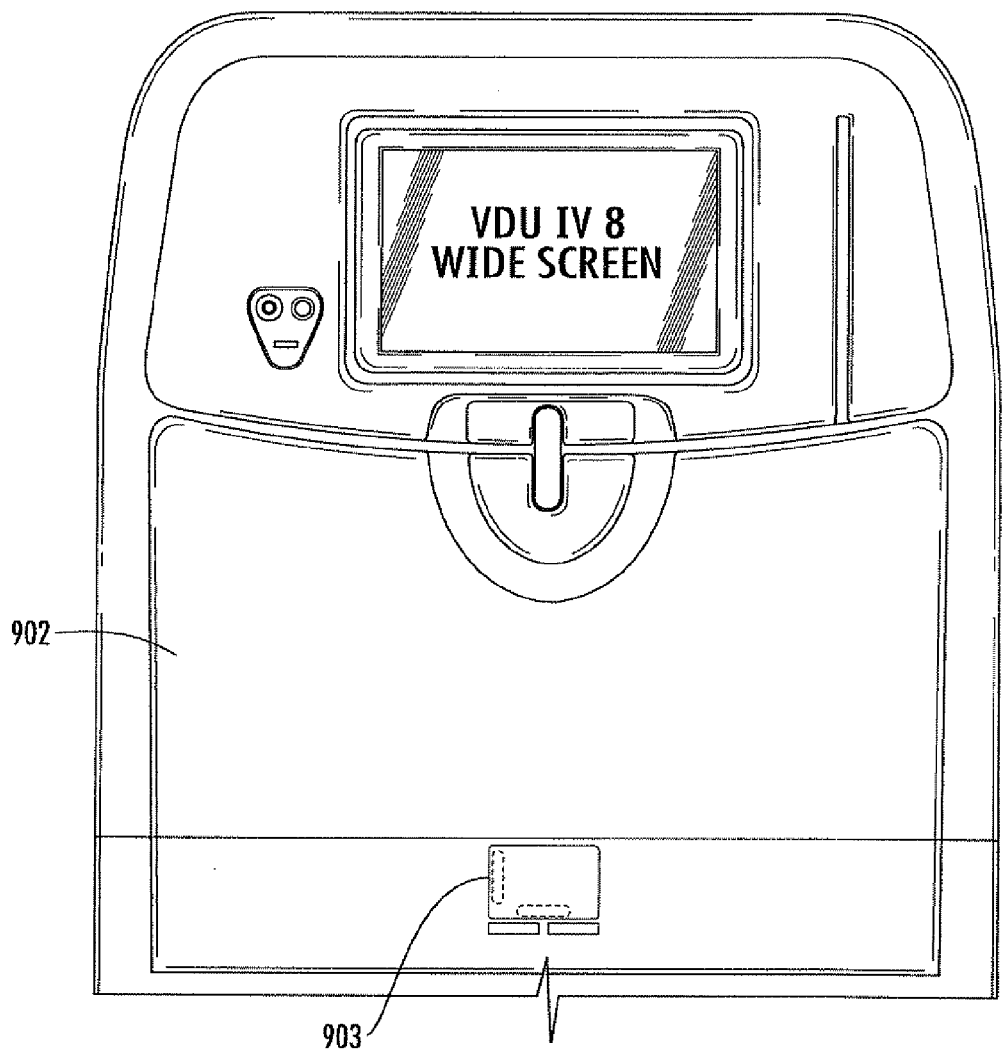
FIG. 38 is a view of a passenger seatback illustrating a touchpad PCU input device integrated on an underside of the seatback tray in accordance with the present invention.

Another aspect of the invention is directed to a passenger control unit (PCU) integrated as part of the seatback tray. The PCU 900 is configured to include a topside touchpad PCU input device 901 with multi-touch functionality, as illustrated in FIG. 29, and an underside touchpad PCU input device 903 with multi-touch functionality, as illustrated in FIG. 38.

Multi-touch functionality is also known as gestering, as readily appreciated by those skilled in the art. Multi-touch functionality is essentially a set of interaction techniques that allows the passenger to control the IFE system with their fingers. The topside and underside touchpad PCU input devices 901, 903 recognizes multiple simultaneous touch points, whereas a touchpad on a laptop or notebook computer normally recognizes a single touch point. Even though the discussion With the seatback tray 902 in the down position, the passenger taps on the topside touchpad PCU input device 901 with their finger to begin operating the IFE system. Similarly, with the seatback tray 902 in the stored position, the passenger taps on the underside touchpad PCU input device 903 with their finger to begin operating the IFE system.

On the visual display unit (VDU) 904, available entertainment categories 910-916 are presented to the passenger, as shown in FIG. 30. These categories 910-916 are overlaid or superimposed on the VDU 904 so that the currently displayed image can still be seen.

The passenger scrolls through the categories 910-916 by moving their fingers in an up or down direction on the touchpad PCU input devices 901, 903. These categories 910-916 are for illustrative purposes only, and the actual categories will vary depending on the airline.

As illustrated in FIGS. 30-33, the categories cycle through "history" 910, "watch TV" 912, "watch a movie" 914 and "where are we?" 916. As the categories move in a vertical manner, the icon for the featured category is larger than the icon for the other categories.

Figure 34:
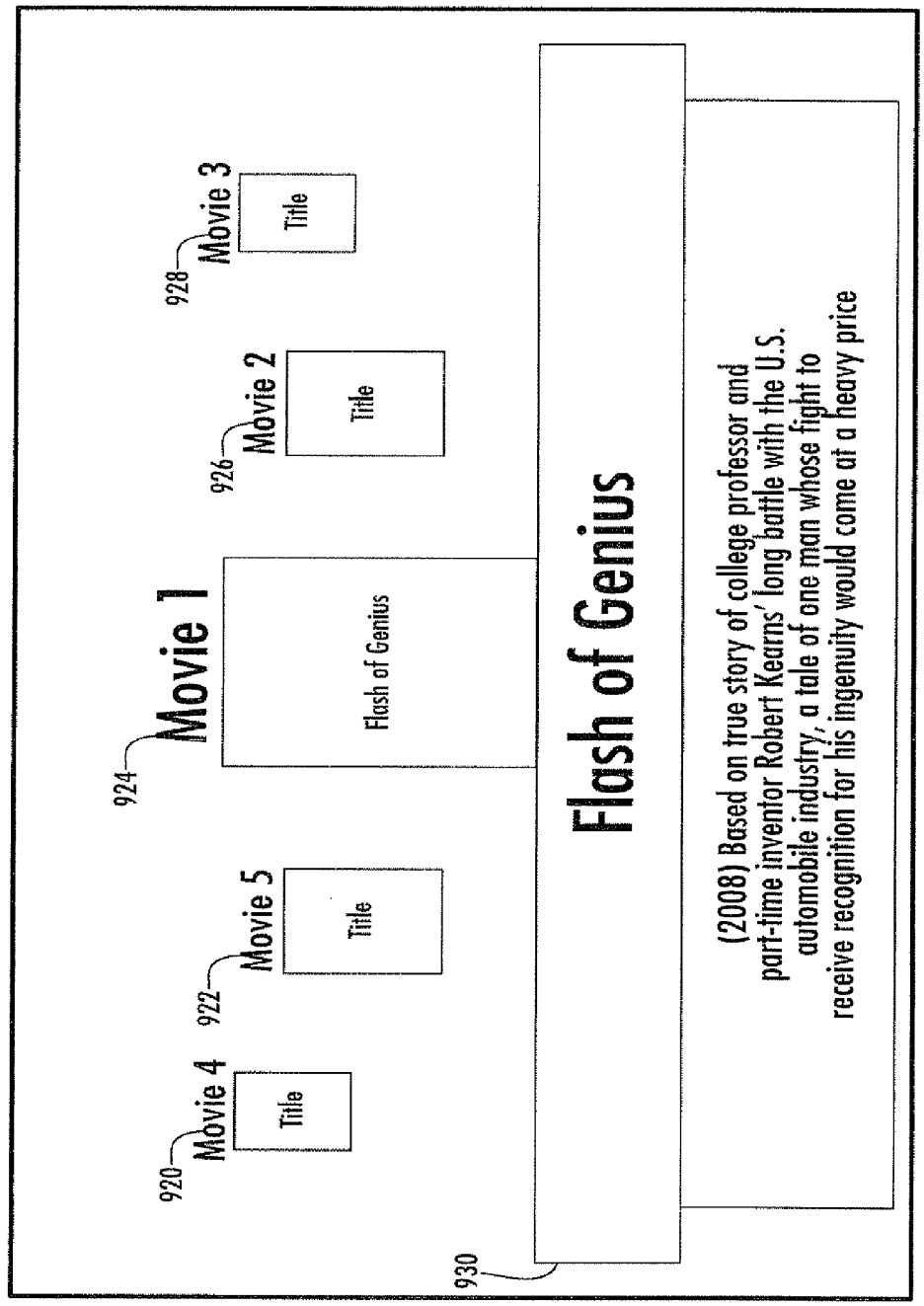
FIGS. 34-35 are displays on the VDU illustrating the available options within a selected category in accordance with the present invention.

To select a category, the passenger taps on the topside or underside touchpad PCU input device 901, 903. For example, if the passenger taps on the topside or underside touchpad PCU input device 901, 903 when the "watch a movie" category 914 is featured, then the VDU 904 provides the available movie options, as shown in FIG. 34. The passenger scrolls through the available movie options 920-928 by moving their fingers in a left or right direction on the topside or underside touchpad PCU input device 901, 903.

As the available movie options 920-928 move in a horizontal manner, the icon for the featured movie is larger than the icon for the other movie options. When the featured movie is displayed, a description of the movie is provided in a description section 930 below the featured movie. To select the featured movie titled "Flash of Genius" 924, the passenger taps on the topside or underside touchpad PCU input device 901, 903. Once selected, a new display appears on the VDU 904 to provide information about the selected movie, such as rating and length, before the movie starts.

Figure 35:
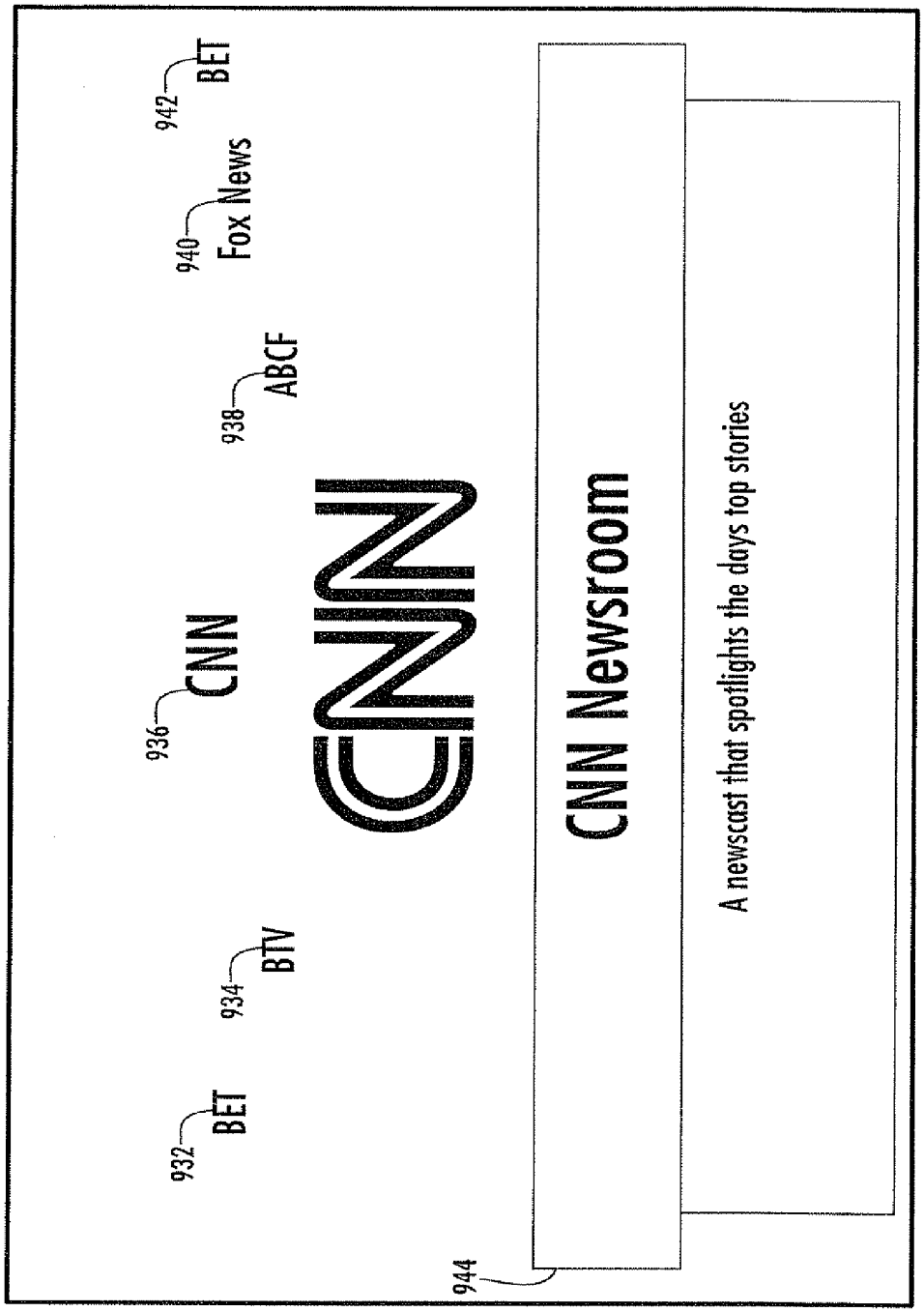

Similarly, if the passenger is back at the available categories display, and taps on the topside touchpad or underside PCU input device 901, 903 when the "watch TV" category 912 is featured, then the VDU 904 provides the available TV channel options 932-942, as shown in FIG. 35. The passenger scrolls through the available TV channels 932-942 by moving their fingers in a left or right direction. Again, to select a TV channel, such as "CNN" 936, the passenger taps on the topside or underside touchpad PCU input device 901, 903. Once selected, another display appears to provide information about the selected TV show, such as length and a more specific description, before the TV show starts.

The topside and underside touchpad PCU input devices 901, 903 advantageously allow the passenger to easily control operation of the IFE system depending on whether the seatback tray 902 is in the stored or down position. The multi-touch functionality provides another dimension of control to the passenger in addition to scroll through the categories. For example, the passenger can reduce the size of the displayed images by pinching-in their fingers on the topside or underside touchpad PCU input devices 901, 903. Similarly, the passenger can enlarge the size of the displayed images by pinching-out their fingers on the topside or underside touchpad PCU input devices 901, 903.

Figure 36:
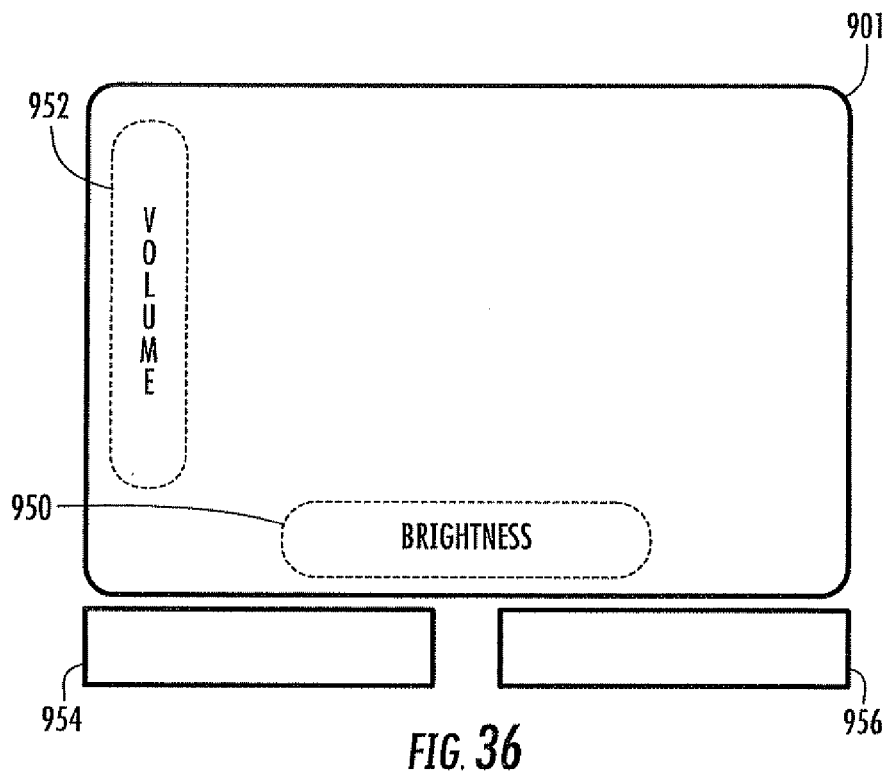
FIG. 36 is a more detailed view of the touchpad PCU input device illustrating volume and brightness controls in accordance with the present invention.

The multi-touch functionality touchpad PCU input devices includes other functions, as readily appreciated by those skilled in the art. For example, controls for the brightness of the VDU 904 and the audio volume are part of the touchpad PCU input devices. As illustrated in FIG. 36 for the underside touchpad PCU input device 901, the brightness is controlled by the passenger sliding their finger along section 950 of the topside touchpad PCU input device 901. Similarly, the volume is controlled by the passenger sliding their finger along section 952 of the topside touchpad PCU input device 901. When the brightness or volume is being adjusted, an adjustment level indicator appears on the VDU 904. After an adjustment has been made, then the adjustment level indicator disappears from the VDU 904. The topside touchpad PCU input device 901 optionally includes left and right select buttons 954, 956 that may be configured to provide menu drop down and selection features, for example.

As readily appreciated by those skilled in the art, the underside touchpad PCU input device 903 is similar in operation to the topside touchpad PCU input device 901. That is, any discussion directed to the topside touchpad PCU input device 901 is equally applicable to the underside touchpad PCU input device 903.

Figure 37:
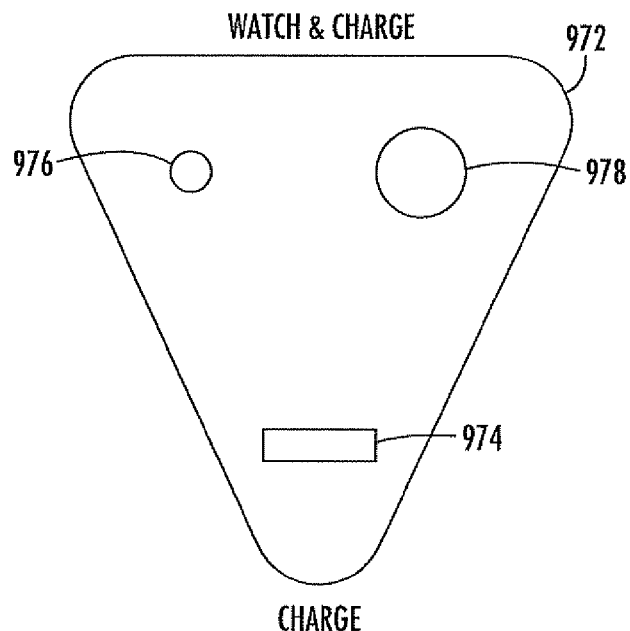
FIG. 37 is a more detailed view of the connector interface area shown in FIG. 29.

Also considered to be part of the PCU 900 is a connector interface 972, as illustrated in FIG. 29. The illustrated connector interface 972 is adjacent the VDU 904 in the seatback. Referring now to FIG. 37, the connector interface 972 allows a passenger to plug their portable device or personal electronic device (PED) to different inputs. For example, a power charging output 974 configured as a USB interface allows the passenger to charge their PED while on-board the aircraft. Inputs 976 and 978 are configured as a VGA connector and a DIN connector, respectively. These connector inputs 976, 978 allow the passenger to provide video and control signals from their PDA for viewing entertainment related data on the VDU 904. The PDA may also be charged when connected to these inputs 976 and 978.

With the touchpad PCU input devices 901, 903 integrated as part of the seatback tray 902, this avoids having to modify an armrest PCU, which can be costly due to the certification associated with modifying passenger seats. Nonetheless, a touchpad PCU input device may be placed in the armrest as an alternative to the seatback tray 902 even though the available area is limited, which in turn may limit the input functions available to the passenger.

The topside and underside touchpad PCU input devices 901, 903 advantageously incorporate advanced control techniques, such as gestering, to make complex navigation of interfaces straightforward, with limitless control combinations. In addition, the topside and underside touchpad PCU input devices 901, 903 do not have any moving parts, and the technology of each touchpad input device is protected by a thick layer of commercial grade plastic. The plastic may be the same as a seatback tray 902, a seatback shroud or other plastic surfaces, for example. However, one component that is exposed to the passenger is a peel and stick overlay of a durable material, such as polycarbonate, for example. Should the overlay become damaged, it is simply peeled off and replaced with a fresh one. Electronics of the touchpad PCU input devices 901, 903 are not exposed, and are protected from damage that may result from liquid spills.

In order for the PCU 900 to be low maintenance, it should be "pick proof" by positioning the topside and underside touchpad PCU input devices 901, 903 within recessed surface areas in the seatback tray 902. Alternatively or in addition, the topside and underside touchpad PCU input devices 901, 903 may have a protective ring around its edges.

Figure 39:
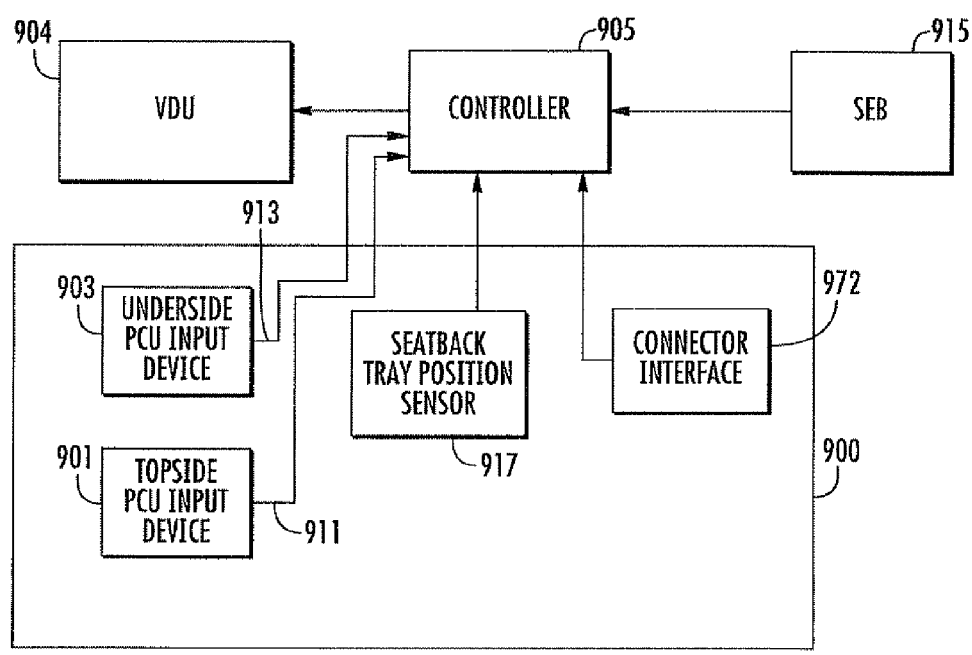
FIG. 39 is a block diagram of a portion of the IFE system showing a PCU interfacing with a VDU in accordance with the present invention.

Referring now to FIG. 39, a block diagram of the PCU 900 interfacing with the VDU 904 will be discussed. The VDU 904 includes a controller or processor 905 for control thereof. The controller 905 in turn interfaces with the SEB 915. The controller 905 also interfaces with the PCU 900. Alternatively, the controller 905 or a subset of the controller may be included within the PCU 900 itself.

The topside touchpad PCU input device 901 includes a cable 911 that connects to the controller 905. The cable 911 is also integrated within the seatback tray 902 and interfaces with the seatback 970 along a hinge area therebetween. The cable 911 may be a USB cable with a USB connector, for example.

Similarly, the underside touchpad PCU input device 903 includes a cable 913 that connects to the controller 905. The cable 913 is also integrated within the seatback tray 902 and interfaces with the seatback 970 along a hinge area therebetween. The cable 913 may be a USB cable with a USB connector, for example.

The interface between the topside or underside touchpad PCU input device 901, 903 and the controller 905 may be an industry standard mouse or pointing device interface that uses associated software and drivers, as readily appreciated by those skilled in the art. For example, the topside and underside touchpad PCU input devices 901, 903 may operate with Windows XP® and other currently available operating systems.

Associated with the PCU 900 is a seatback tray position sensor 917, such as in the form of an accelerometer, that generates a position signal based on position of the seatback tray 902. When the seatback tray 902 is in the down position, the topside touchpad PCU input device 901 is operational based on the position signal. When the seatback tray 902 is in the stored position, the underside touchpad PCU input device 903 is operational based on the position signal. Alternatively, the tray position sensor 917 is disabled or simply not included so that both of the topside and underside touchpad PCU input devices 901, 903 are operational at the same time regardless of the position of the seatback tray 902.

Figure 40:
FIG. 40 is a view of a passenger seatback illustrating a touchpad PCU input device integrated therein in accordance with the present invention.

Another aspect of the invention is to place the touchpad PCU input device 901' on the passenger seatback 970 adjacent the VDU 904, as shown in FIG. 40. Operation of the touchpad PCU input device 901' is similar to the topside and underside touchpad input devices 901, 903 discussed above.

Figure 41:
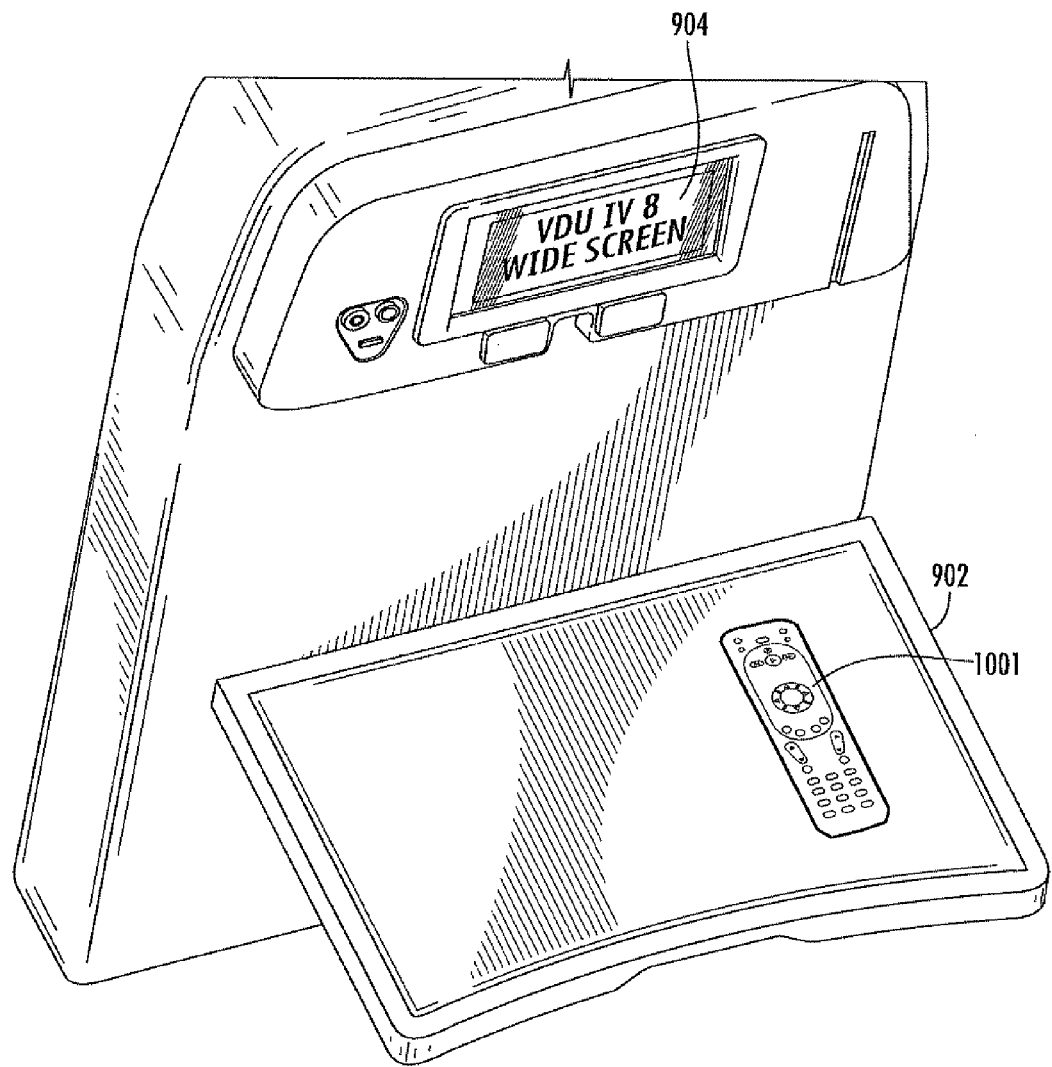
FIG. 41 is a perspective view of a seatback illustrating a membrane switch PCU input device integrated on a topside the seatback tray in accordance with the present invention.
Figure 42:
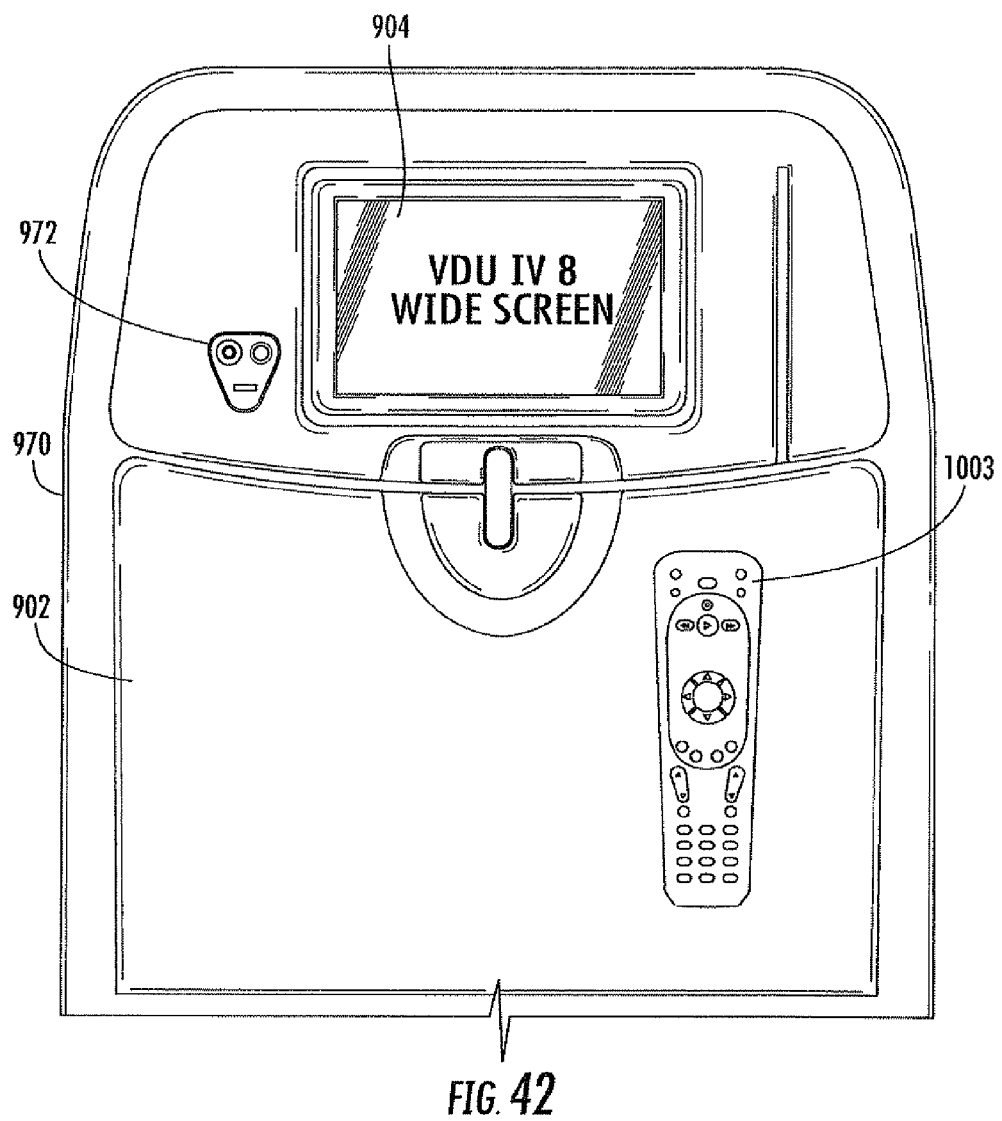
FIG. 42 is a view of a seatback illustrating a membrane switch PCU integrated on an underside the seatback tray in accordance with the present invention.

In lieu of the topside and underside PCU input devices 901, 903 being configured as touchpads, they may be configured as a plurality of memory switches. For example, FIG. 41 illustrates an underside memory switch PCU input device 1001, and FIG. 42 illustrates a topside memory switch PCU input device 1003. However, the memory switches do not allow for the scrolling of the available categories, and options within each category, on the VDU 904. Instead, predetermined buttons on the input devices 1001, 1003 will be used to provide the corresponding scrolling feature.

Each membrane switch PCU input device 1001, 1003 includes a plurality of discrete switches, where each switch corresponds to a specific function. The switch contacts are on, or made of, a flexible substrate. For a typical ohmic contact membrane unit, the poles of each switch need to make physical contact. In other variations, the poles can be a non-contact type, such as a capacitive, ferrite core, or hall effect switch.

The membrane switch may be suitable for low voltage, DC logic-level-signal, applications. A membrane layer may be positioned over a static layer. The membrane layer is a thin pliable layer and carries one pole, both poles or flexes during switch operation used to short both switch poles together. The static layer does not flex during switch operation but carries one pole, both poles or used to short both switch poles together.

Figure 43:
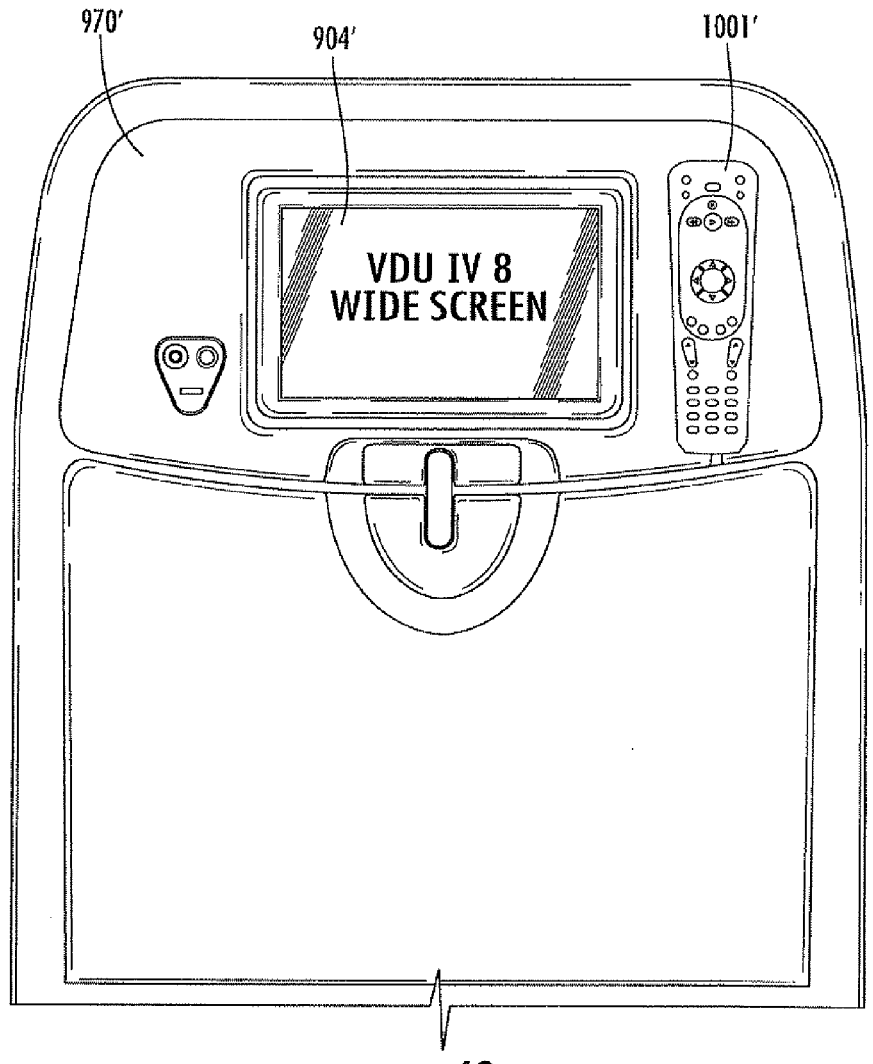
FIG. 43 is a view of a passenger seatback illustrating a membrane switch PCU input device integrated therein in accordance with the present invention.

Alternatively, a membrane switch PCU input device 1001' may be positioned on the passenger seatback 970 adjacent the VDU 904, as shown in FIG. 43. Although not illustrated, the membrane switch PCU may even be placed in the armrest.

Operation of the membrane switch PCU input device 1001 is based on the specific functions of the user-selected inputs provided on the surface of the input device, as readily appreciated by those skilled in the art. In contrast to a touchpad PCU input device, there is a one-to-one correspondence for each user-selected input. Since there is more space available in the seatback tray, more functions can be provided to the passenger.

Figure 44:
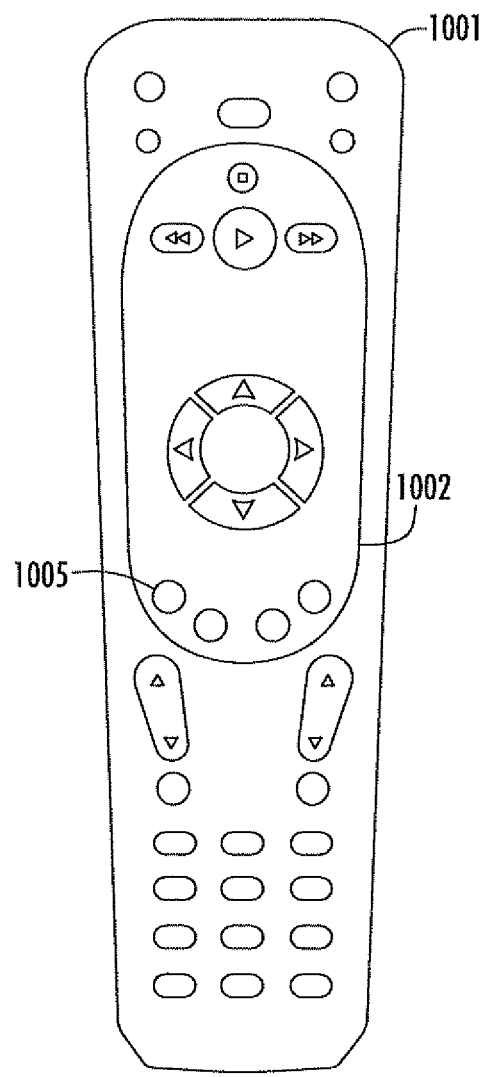
FIG. 44 is a more detailed view of the control inputs for the membrane switch PCU input device as shown in FIG. 41.

For example, in addition to standard user-selected inputs associated with entertainment related remote controls, a closed caption function may be provided via user-selected input 1002, as shown in FIG. 44. An alternate language may be provided by user-selected input 1005, for example. In addition, dedicated user-selected inputs for advanced applications may be provided as needed. For example, a full DirectTV remote control or other application specific interface may be provided.

In order for the topside and underside membrane switch PCU input devices 1001, 1003 to be low maintenance, it should be "pick proof" by positioning within a recessed surface area on the seatback tray 902. Alternatively or in addition, the topside and underside membrane switch PCU input devices 1001, 1003 may have a protective ring around its edges.

However, one component that is exposed to the passenger is a peel and stick overlay of a durable material, such as polycarbonate, for example. Should the overlay become damaged, it is simply peeled off and replaced with a fresh one. Since the electronics for the topside and underside membrane switch PCU input devices 1001, 1003 are not exposed, they are protected from damage that may result from liquid spills.

Figure 45:
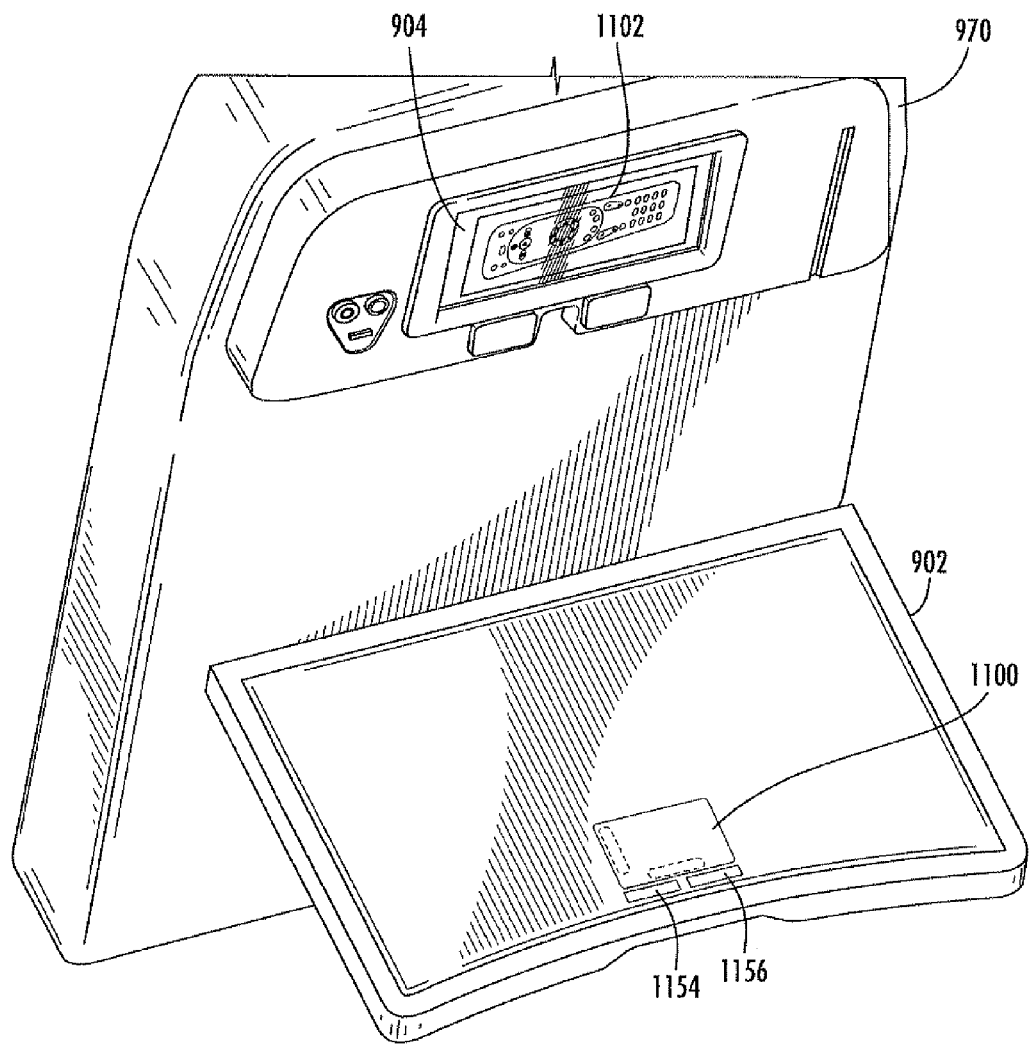
FIG. 45 is a view of a seatback illustrating a touchpad integrated on a topside of the seatback tray to control a virtual PCU input device displayed on the VDU in accordance with the present invention.

As a variation to the touchpad PCU input device controlling the scrolling of the available categories and available options within each category, a touchpad 1100 controls a virtual PCU input device 1102 displayed on the VDU 902, as illustrated in FIG. 45. The passenger slides their finger over the touchpad 1100 to move a cursor to the desired user-selected function on the virtual PCU input device 1102. When the cursor is over the desired user-selected function, the passenger selects this function by clicking on the left or right select buttons 1154, 1156.

The above discussions of the touchpad PCU input devices 901, 903 are also applicable for this embodiment. However, multi-touch functionality is optional. The user-selected functions available for the above-described membrane switch PCU input devices 1001, 1003 are also available with the virtual PCU input device 1102. The VDU 904 supports a graphical user interface for the virtual PCU input device 1102 so that it may be identical to the membrane switch PCU input devices 1001, 1003.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. An aircraft in-flight entertainment (IFE) system comprising:
    at least one entertainment source;
    a plurality of passenger seatback displays coupled to said at least one entertainment source;
    a plurality of passenger control units (PCUs), each PCU associated with a respective seatback display and comprising
        an underside PCU input device carried by an underside of a seatback tray to be accessible by a user from the underside of the seatback tray when the seatback tray is in a stored position, and
        a topside PCU input device carried by a topside of the seatback tray to be accessible by the user from a topside of the seatback tray when the seatback tray is in a down position;
        wherein each of said underside and topside PCU input devices have the same set of passenger control functions to control the respective seatback display;
        wherein the respective seatback display is fully viewable when the seatback tray is in both the stored and down position with the underside and topside PCU input devices being carried by the seatback tray;
    a respective controller coupled to each of said underside and topside PCU input devices; and
    each PCU comprising a seatback tray position sensor for generating a position signal based on position of the seatback tray so that said controller selectively enables one of said PCU input devices based on the position signal while the other PCU input device is disabled.

2. The aircraft in-flight entertainment system according to claim 1 wherein said seatback tray position sensor comprises an accelerometer.

3. The aircraft in-flight entertainment system according to claim 1 wherein each of said underside and topside PCU input devices comprises a touchpad.

4. The aircraft in-flight entertainment system according to claim 3 wherein each touchpad initiates display of different entertainment categories on the respective seatback display associated therewith, with the different entertainment categories being overlaid over a currently displayed image.

5. The aircraft in-flight entertainment system according to claim 4 wherein each touchpad permits the user to change display size of the different entertainment categories being displayed based on recognition of multiple simultaneous touch points by the user.

6. The aircraft in-flight entertainment system according to claim 1 wherein each of said underside and topside PCU input devices comprises a plurality of membrane switches.

7. The aircraft in-flight entertainment system according to claim 1 further comprising a respective connector interface associated with each passenger seatback display, and comprising an input to receive video and control signals from a user's portable device.

8. The aircraft in-flight entertainment system according to claim 7 wherein said connector interface comprises a power charging output for interfacing with the user's portable device for charging thereof.

9. The aircraft in-flight entertainment system according to claim 1 further comprising:
 a plurality of seat electronic boxes (SEBs) coupled to said plurality of passenger seatback displays; and
 a signal distribution network connecting said at least one entertainment source to said plurality of SEBs.

10. The aircraft in-flight entertainment system according to claim 1 wherein said at least one entertainment source comprises a satellite TV receiver.

11. The aircraft in-flight entertainment system according to claim 1 wherein said satellite TV receiver comprises a direct broadcast (DBS) receiver.

12. An aircraft in-flight entertainment (IFE) system comprising:
 at least one entertainment source;
 a plurality of passenger seatback displays coupled to said at least one entertainment source;
 a plurality of passenger control units (PCUs), each PCU associated with a respective seatback display and comprising
  an underside PCU input device carried by an underside of a seatback tray to be accessible by a user from the underside of the seatback tray when the seatback tray is in a stored position, and
  a topside PCU input device carried by a topside of the seatback tray to be accessible by the user from a topside of the seatback tray when the seatback tray is in a down position,
  each of said underside and topside PCU input devices comprises a touchpad configured to recognize multiple simultaneous touch points;
  wherein each of said underside and topside PCU input devices have the same set of passenger control functions to control the respective seatback display;
  wherein the respective seatback display is fully viewable when the seatback tray is in both the stored and down position with the underside and topside PCU input devices being carried by the seatback tray;
 a respective controller coupled to each of said underside and topside PCU input devices;
 each PCU comprising a seatback tray position sensor for generating a position signal based on position of the seatback tray so that said controller selectively enables one of said PCU input devices based on the position signal while the other PCU input device is disabled.

13. The aircraft in-flight entertainment system according to claim 12 wherein each touchpad initiates display of different entertainment categories on the respective seatback display associated therewith, with the different entertainment categories being overlaid over a currently displayed image.

14. The aircraft in-flight entertainment system according to claim 13 wherein each touchpad permits the user to change display size of the different entertainment categories being displayed based on of multiple simultaneous touch points by the user.

15. The aircraft in-flight entertainment system according to claim 12 further comprising a respective connector interface associated with each passenger seatback display, and comprising
 an input to receive video and control signals from a user's portable device; and
 a power charging output for interfacing with the user's portable device for charging thereof.

16. The aircraft in-flight entertainment system according to claim 12 further comprising:
 a plurality of seat electronic boxes (SEBs) coupled to said plurality of passenger seatback displays; and
 a signal distribution network connecting said at least one entertainment source to said plurality of SEBs.

17. The aircraft in-flight entertainment system according to claim 12 wherein said at least one entertainment source comprises at least one of a satellite TV receiver and a direct broadcast (DBS) receiver.

18. A method for operating an aircraft in-flight entertainment (IFE) system comprising at least one entertainment source; a plurality of passenger seatback displays coupled to the at least one entertainment source; and a plurality of passenger control units (PCUs), with each PCU associated with a respective seatback display and comprising an underside PCU input device carried by an underside of a seatback tray and a topside PCU input device carried by a topside of the seatback tray, and with each PCU comprising a seatback tray position sensor, the method comprising:
 generating a position signal based on position of the seatback tray;
 selectively enabling the underside PCU input device carried by the underside of the seatback tray based on the position signal when the seatback tray is in a stored position while the topside PCU input device is disabled; and
 selectively enabling the topside PCU input device carried by the topside of the seatback tray based on the position signal when the seatback tray is in a down position while the underside PCU input device is disabled;
 wherein each of the underside and topside PCU input devices have the same set of passenger control functions to control the respective seatback display;
 wherein the respective seatback display is fully viewable when the seatback tray is in both the stored and down position with the underside and topside PCU input devices being carried by the seatback tray.

19. The method according to claim 18 wherein each of the underside and topside PCU input devices comprises a touchpad.

20. The method according to claim 19 wherein each touchpad is configured to recognize multiple simultaneous touch points.

21. The method according to claim 20 wherein each touchpad initiates display of different entertainment categories on the respective seatback display associated therewith, with the different entertainment categories being overlaid over a currently displayed image.

22. The method according to claim 21 wherein each touchpad permits the user to change display size of the different entertainment categories being displayed based on recognition of multiple simultaneous touch points by the user.

23. The method according to claim 18 wherein each of the underside and topside PCU input devices comprises a plurality of membrane switches.

24. The method according to claim 18 wherein the aircraft in-flight entertainment system further comprises a respective connector interface associated with each passenger seatback display, and comprising an input to receive video and control signals from a user's portable device.

25. The method according to claim 24 wherein the connector interface comprises a power charging output for interfacing with the user's portable device for charging thereof.

* * * * *

UNITED STATES PATENT AND TRADEMARK OFFICE
CERTIFICATE OF CORRECTION

PATENT NO. : 9,241,137 B2  
APPLICATION NO. : 13/040436  
DATED : January 19, 2016  
INVENTOR(S) : Frisco et al.

It is certified that error appears in the above-identified patent and that said Letters Patent is hereby corrected as shown below:

In The Claims

Column 31, Line 66   Insert: --recognition-- between "on" and "of".

Signed and Sealed this  
Nineteenth Day of July, 2016

Michelle K. Lee  
*Director of the United States Patent and Trademark Office*